United States Patent [19]

Harrison

[11] 3,912,909

[45] Oct. 14, 1975

[54] RECORD READING APPARATUS

[75] Inventor: Richard A. Harrison, Centerville, Ohio

[73] Assignee: Monarch Marking Systems, Inc., Dayton, Ohio

[22] Filed: Jan. 5, 1973

[21] Appl. No.: 321,373

[52] U.S. Cl.... 235/61.11 R; 250/569; 235/61.11 E; 235/61.11 D; 209/74; 235/61.7 B; 235/61.12N; 360/131

[51] Int. Cl.$^2$. G06K 7/10; G06K 19/06; B07C 5/10; G11B 5/74

[58] Field of Search ............ 200/46; 235/61.11 R, 61.11 E, 235/61.11 D, 61.12 N, 61.12 R, 61.7 B, 61.9 R; 250/219 DC; 340/149 A; 360/2, 131; 209/74

[56] References Cited

UNITED STATES PATENTS

| | | | |
|---|---|---|---|
| 2,820,907 | 1/1958 | Silverman | 250/219 D |
| 3,316,392 | 4/1967 | Bailey | 235/61.12 N |
| 3,474,230 | 10/1969 | McMillen | 235/61.7 R |
| 3,543,007 | 11/1970 | Brinker | 235/61.11 E |
| 3,578,953 | 5/1971 | Milford | 235/61.11 R |
| 3,593,030 | 7/1971 | Jaskowsky | 250/219 DC |
| 3,602,697 | 8/1971 | Tanaka | 235/61.11 D |
| 3,617,707 | 11/1971 | Shields | 235/61.11 E |
| 3,632,995 | 1/1972 | Wilson | 235/61.12 N |
| 3,673,389 | 6/1972 | Kapsambelis | 235/61.11 R |
| 3,735,094 | 5/1973 | Dunn | 235/61.11 E |
| 3,791,516 | 2/1974 | Tramposch | 209/77 |
| 3,798,422 | 3/1974 | Foret | 235/61.11 R |

*Primary Examiner*—Daryl W. Cook
*Assistant Examiner*—Robert M. Kilgore
*Attorney, Agent, or Firm*—Mason, Kolehmainen, Rathburn & Wyss

[57] ABSTRACT

The disclosed batch ticket reader is designed for use with bar coded tickets having a complete data message or entry encoded along one edge of the ticket. The reader accepts tickets fed from storage in any of four possible different positions or orientations and detects, error checks, and forwards to a magnetic tape output unit correct data derived from the tickets supplied in any of these four positions. The reader uses two sets of decoding head pairs longitudinally spaced along the ticket feed path on opposite sides thereof. Signals derived from the heads select the one head providing correct data. The data from the selected head is detected, error checked, changed to proper form in dependence on the direction of reading the message, and is supplied to the output unit. Another circuit checks for the provision of a header record preceding a group of tickets and a trailer record following a group of tickets. These header and trailer records are diverted to a container receiving tickets from which improper data is derived so as to identify and segregate by groups all improper tickets. A keyboard unit for supplying manual data entries, a display unit for displaying manual data entries, and a programmed data message length control are also included in the reader.

26 Claims, 20 Drawing Figures

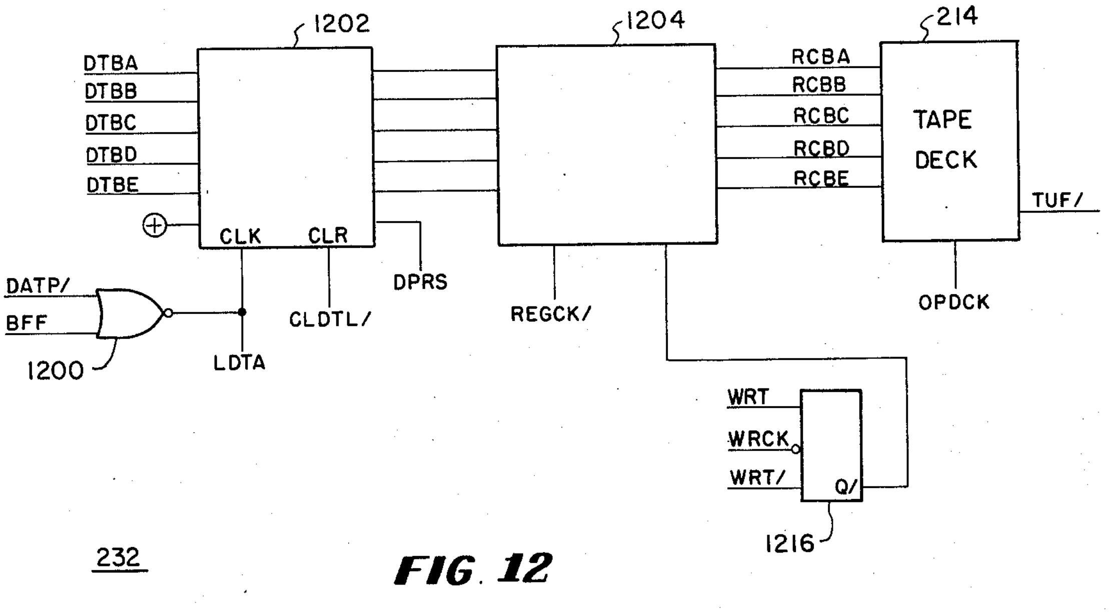
FIG. 12
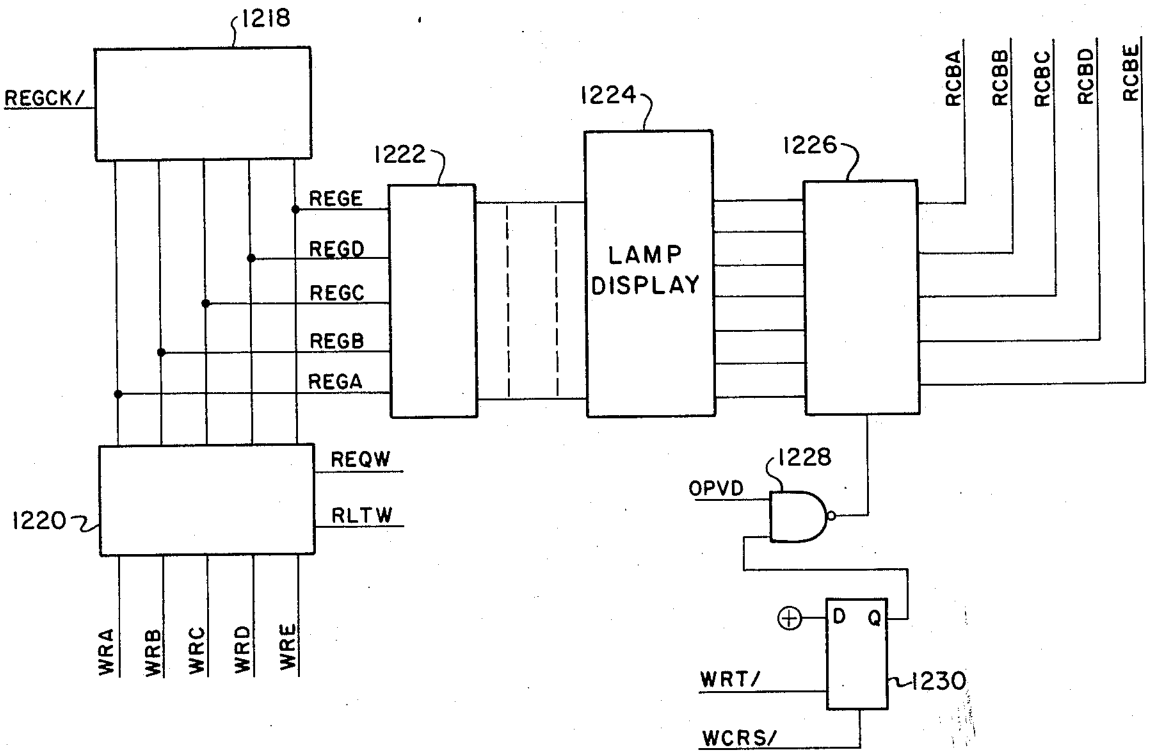

RECORD READING APPARATUS

This invention relates to a new and improved data handling system and, more particularly, to a reader for automatically reading a sequence of edge coded records disposed in random positions or orientations relative to a path over which the records are fed to a sensing means.

Coded records used, for example, in automatic vending as retail sales tickets, as identification media, or as retail pricing tags or tickets are frequently read or translated as individual records. In many applications, however, it is also desirable to automatically translate or read large numbers of these tickets in sequence to accumulate data therefrom. A number of such batch readers are now known and used. However, these known readers possess certain disadvantages in use with or cannot be used with records that are edge coded or encoded in an area offset with respect to the center of the record. An example of one such record is a price ticket having a bar code printed along an area on one side of the ticket offset from the center of the ticket.

Some apparatus such as that shown in U.S. Pat. Nos. 2,942,778 and 3,496,340 includes circuitry for automatically selecting sets from a larger number of recording heads disposed along a record feed path to provide means for compensating for skewed or misaligned feeding of the record along the path. These arrangements cannot read both sides of a record and do not read records fed along a path in an inverted or upside-down position.

An apparatus for reading either the front or the back of a record is shown in U.S. Pat. No. 3,578,953. However, this apparatus requires a manual selection between front and back reading and could not be used with batches of records that are intermixed in four different positions with respect to the record feeding path, i.e., various configurations of front and back with right-side-up and upside-down.

U.S. Pat. Nos. 3,602,697 and 3,673,389 disclose reading apparatus in which a coded record is interpreted when it passes along a feed path relative to the sensing heads in any one of the four possible positions or orientations formed by the combination of front or back and right-side-up or upside-down. However, the systems shown in these patents require some code information on both the front and back of the record when reflective codes are used or the use of an encoding technique by which code elements appear along both of the opposite edges of the record.

Accordingly, one object of the present invention is to provide a new and improved record reader.

Another object is to provide a record reader capable of reading a data entry encoded along only one edge of a record when the records are intermixed in random positions.

A further object is to provide a batch record reader having a number of reading heads and a new and improved control means for selecting a sensing head receiving proper data from a record.

Another object is to provide new and improved means for controlling the storage of encoded data read from a record in forward or reverse direction.

A further object is to provide a bulk record reader including new and improved means for identifying and separating records yielding improper data and for identifying the source of these records.

A further object is to provide a new and improved means for entering data in encoded form.

Many other objects and advantages of the present invention will become apparent from considering the following detailed description in conjunction with the drawings in which.

Figure 8:
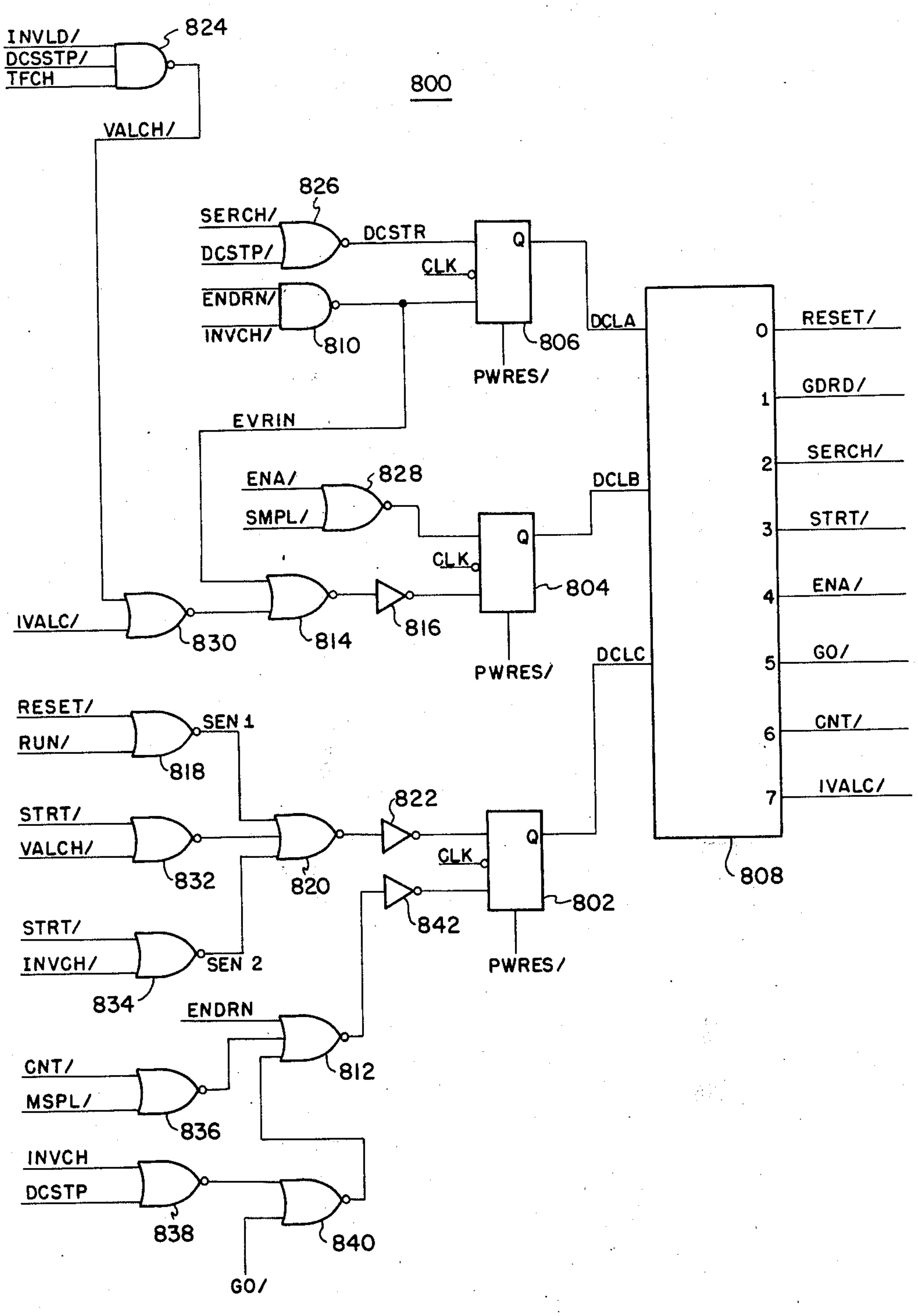
Figure 9:
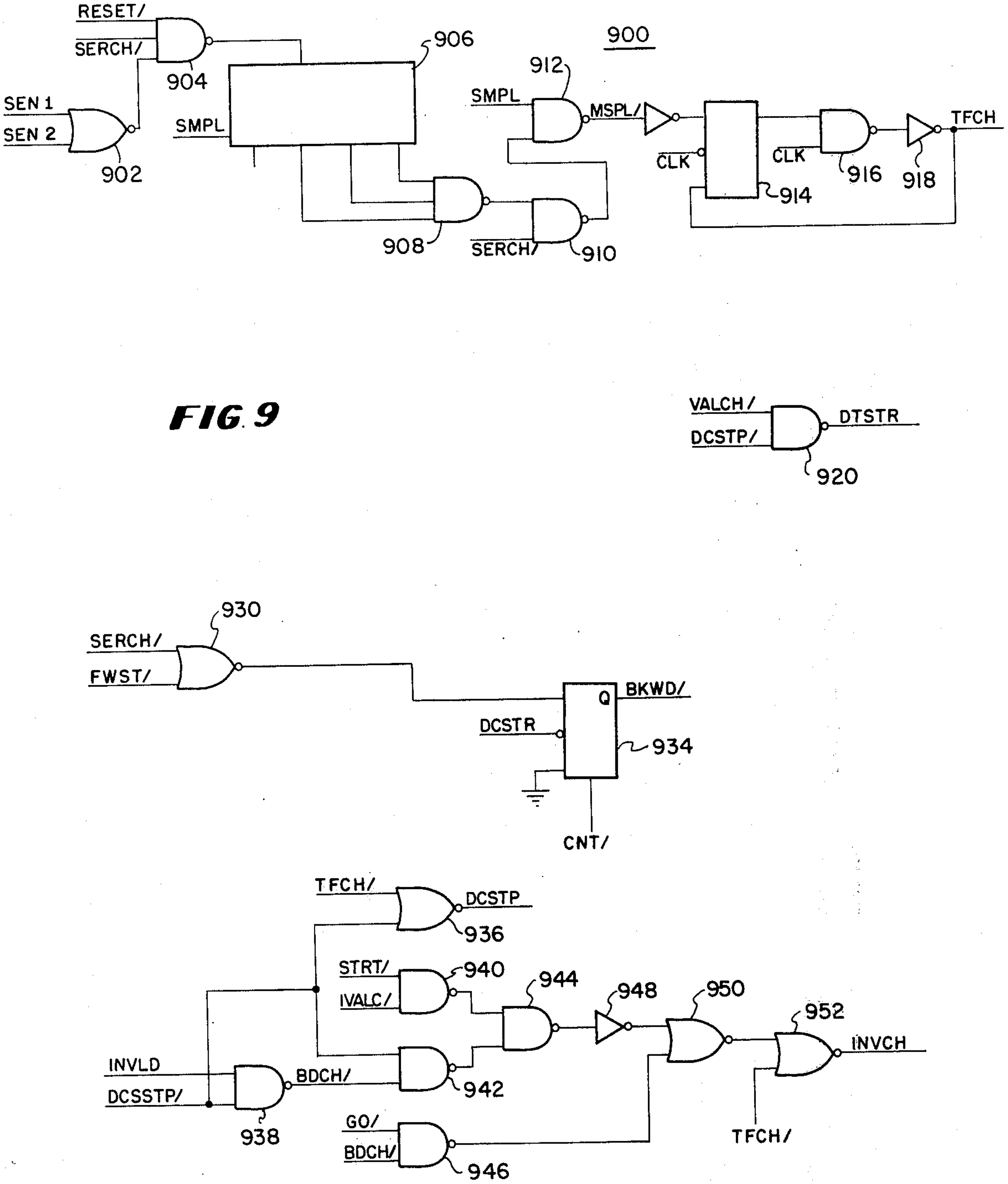
Figure 10:
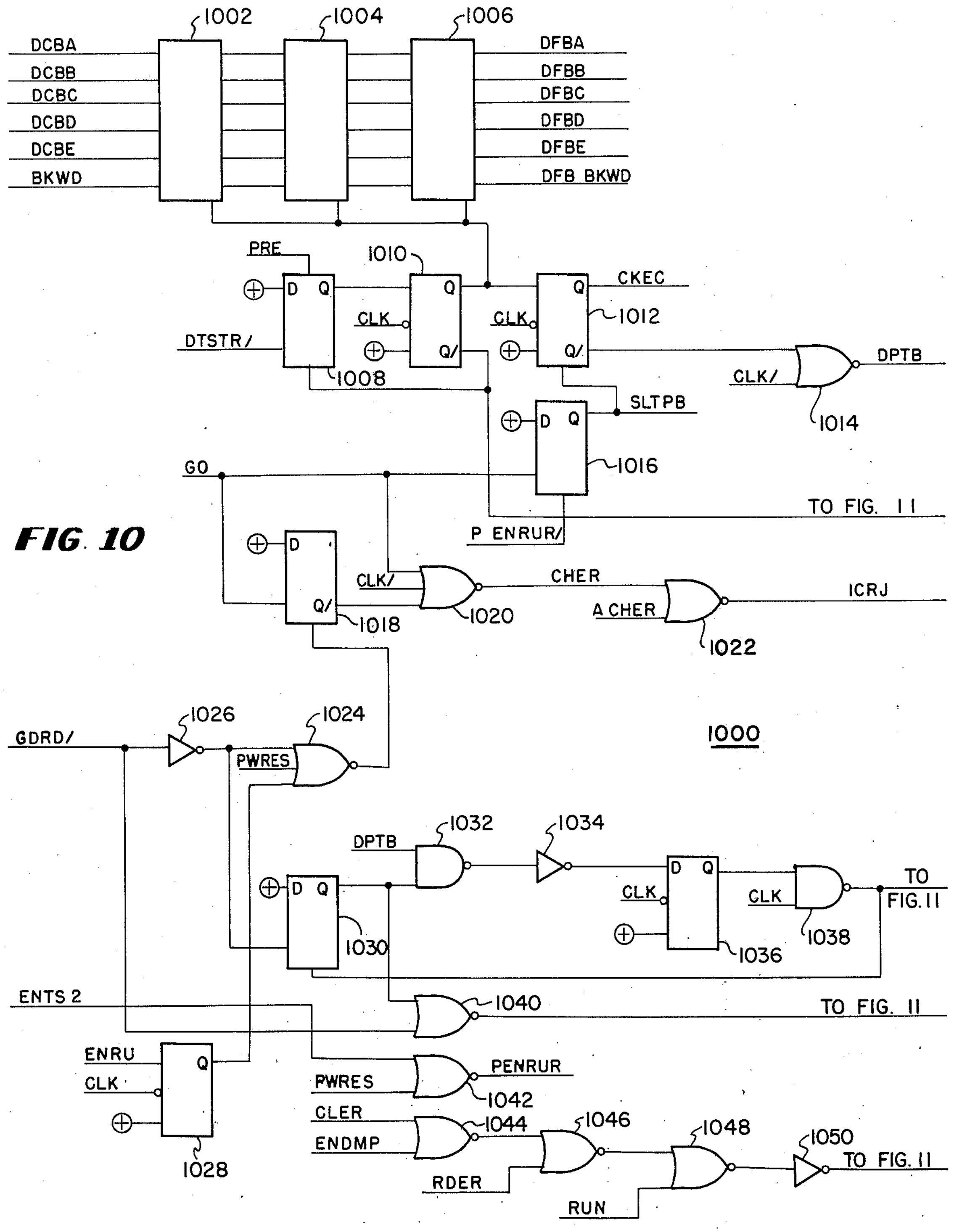
Figure 11:
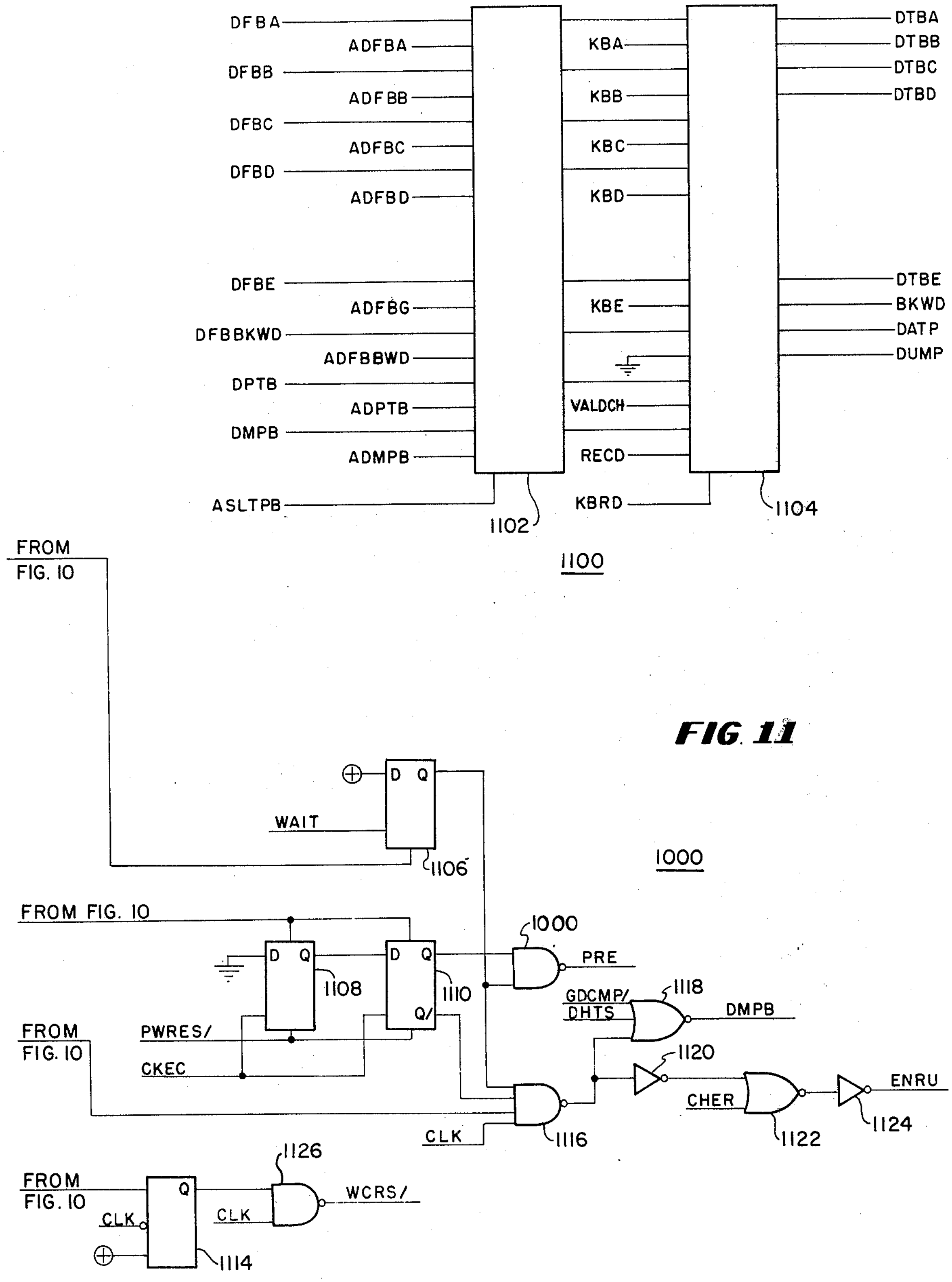
Figure 13:
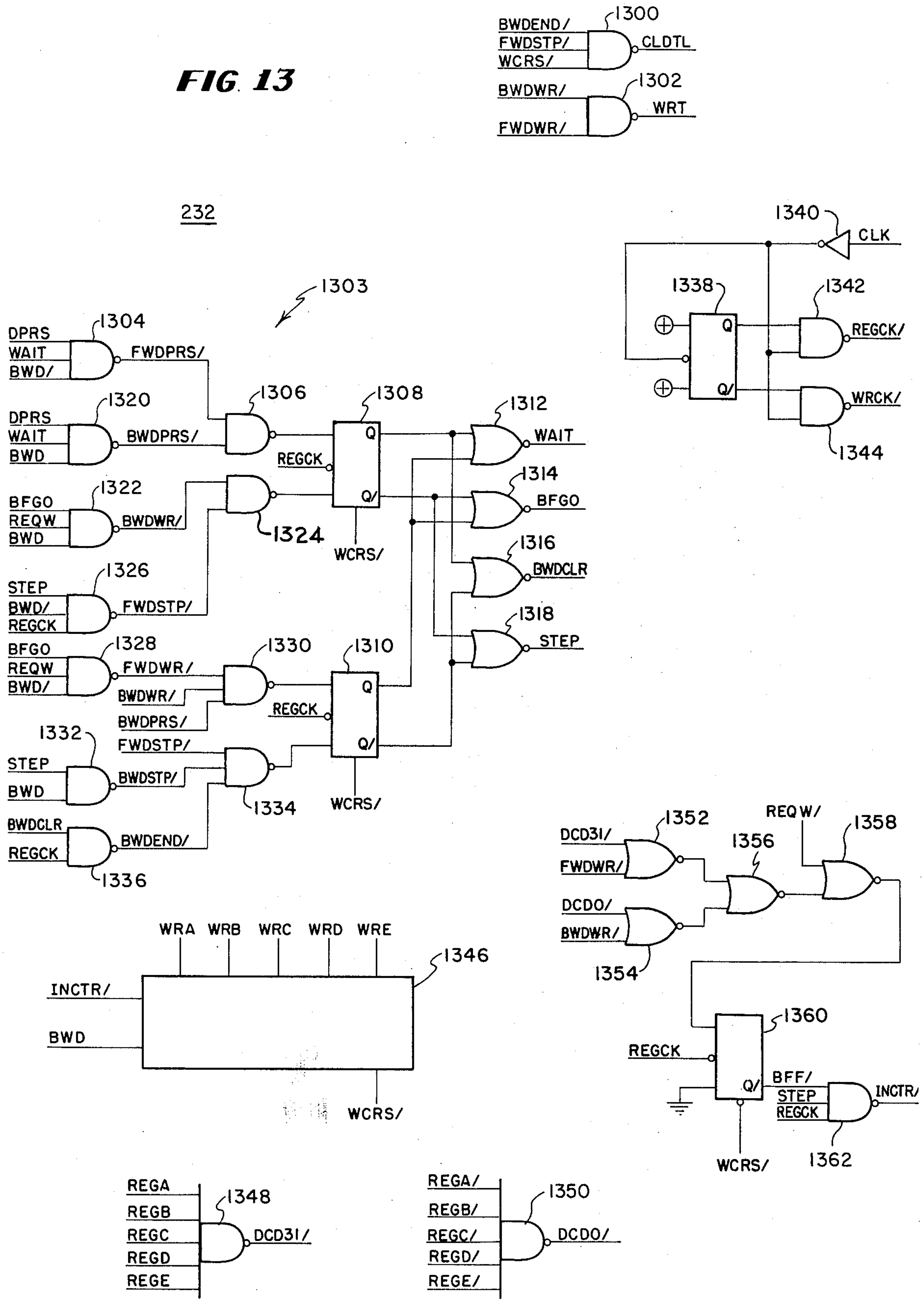
Figure 14:
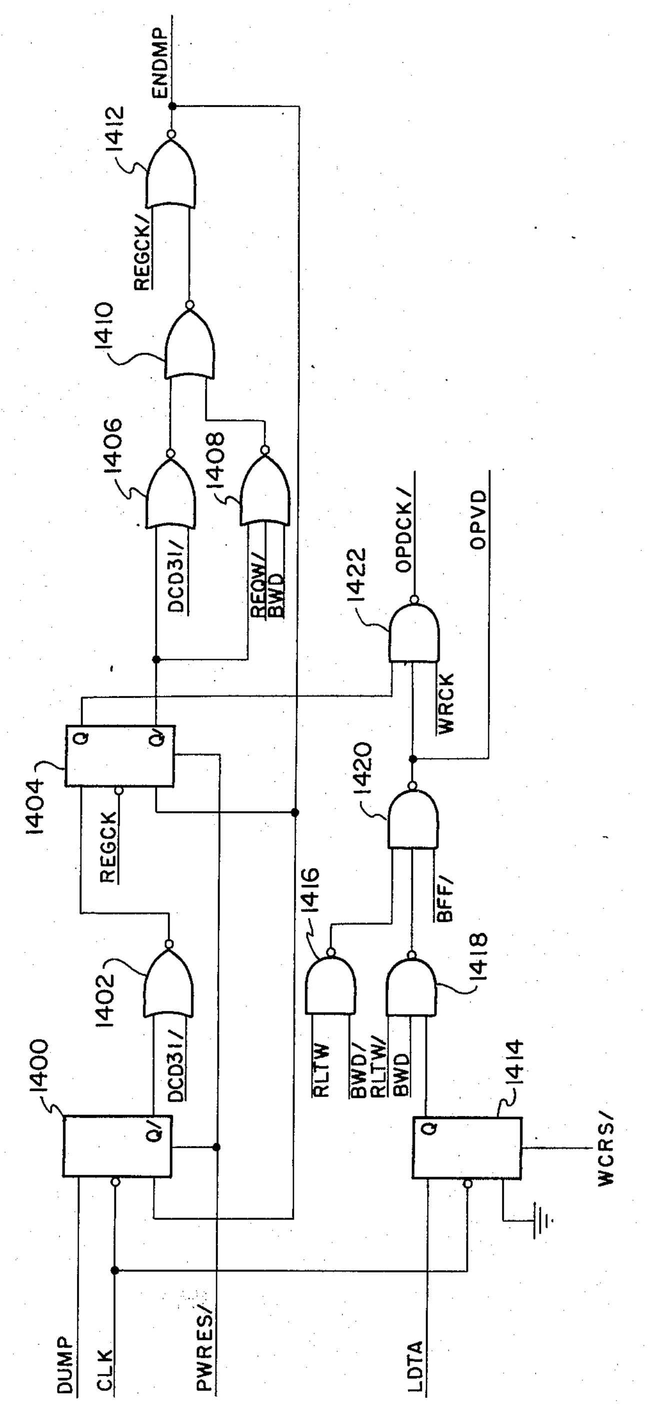
Figure 15:
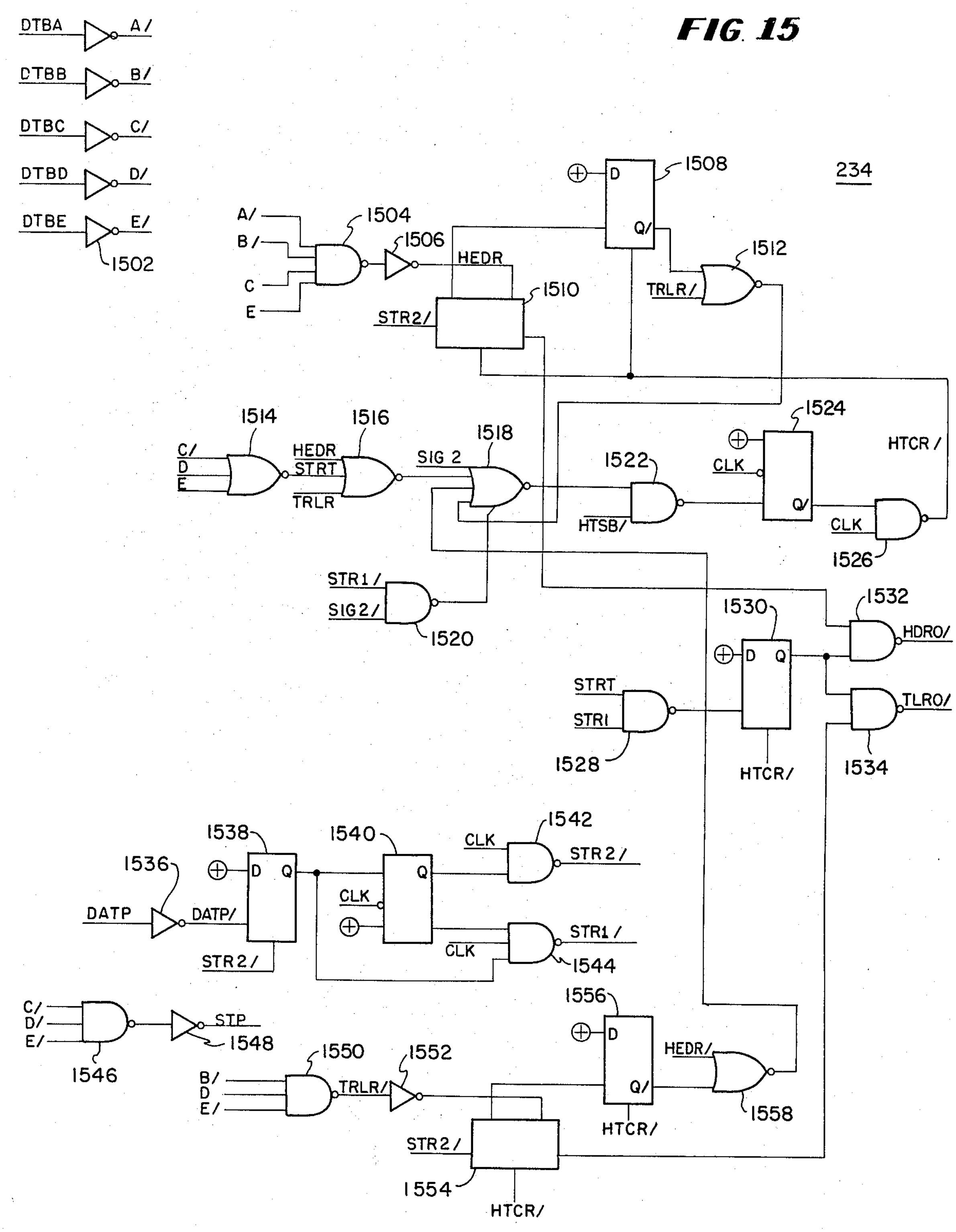
Figure 16:
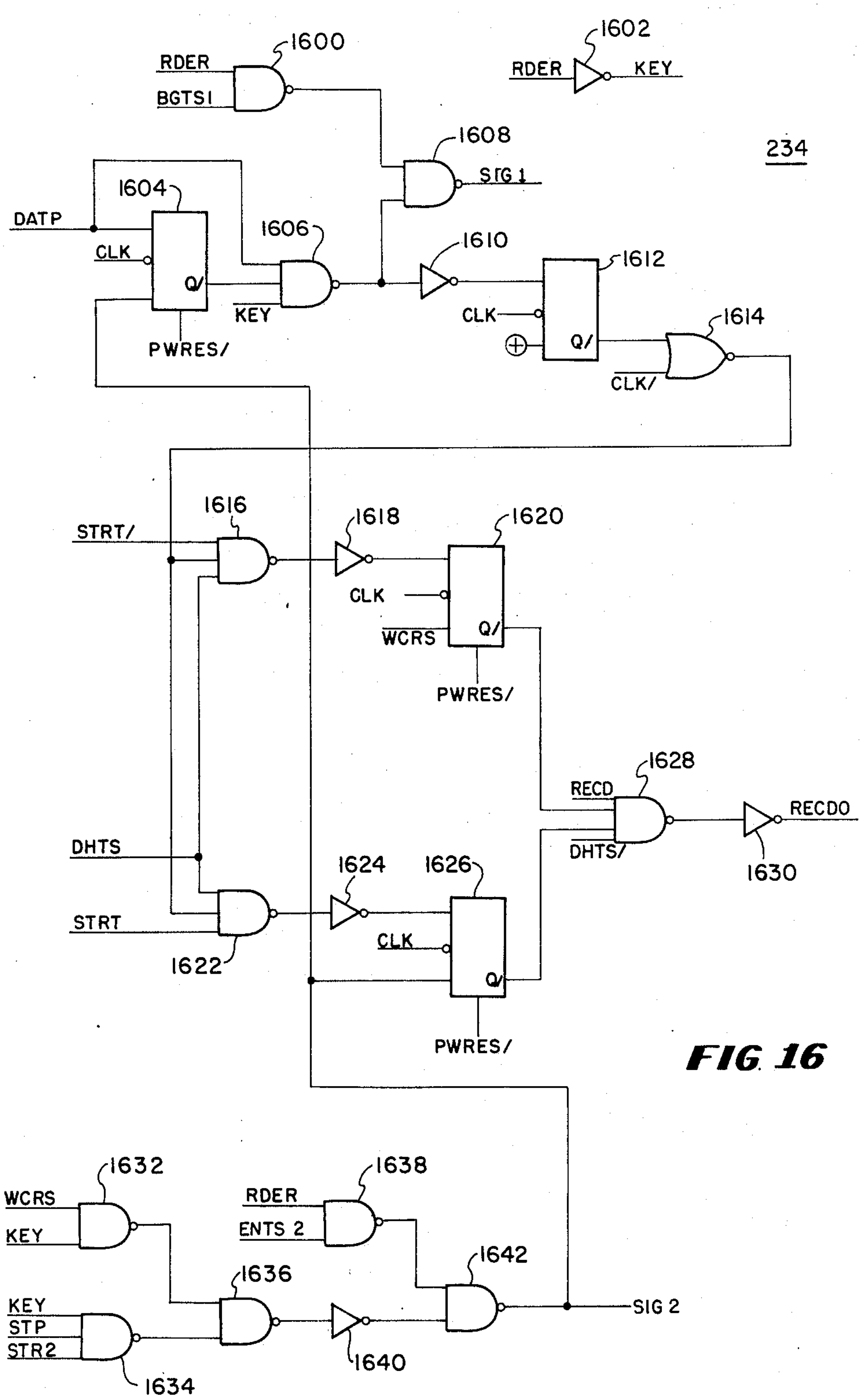
Figure 17:
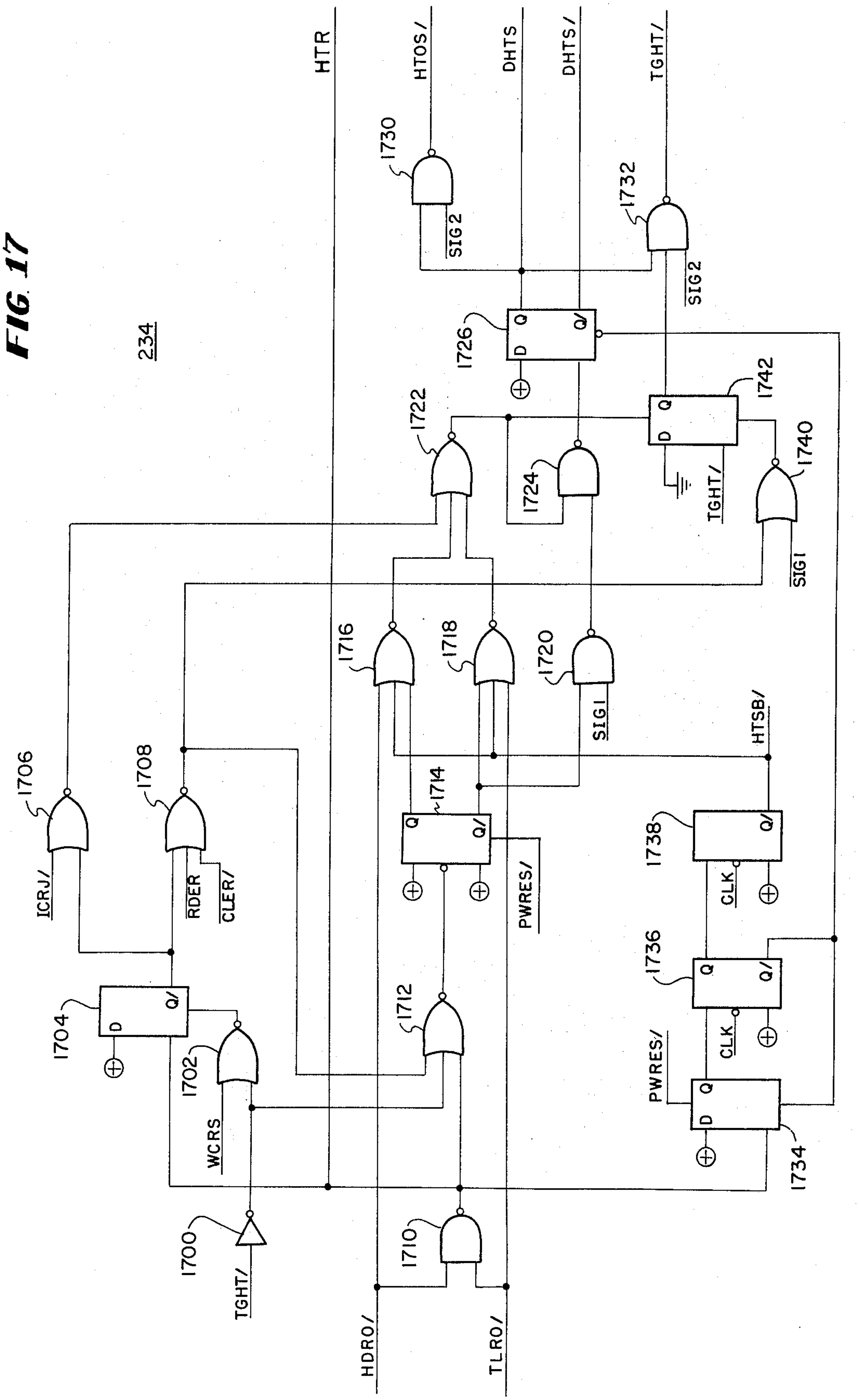
Figure 18:
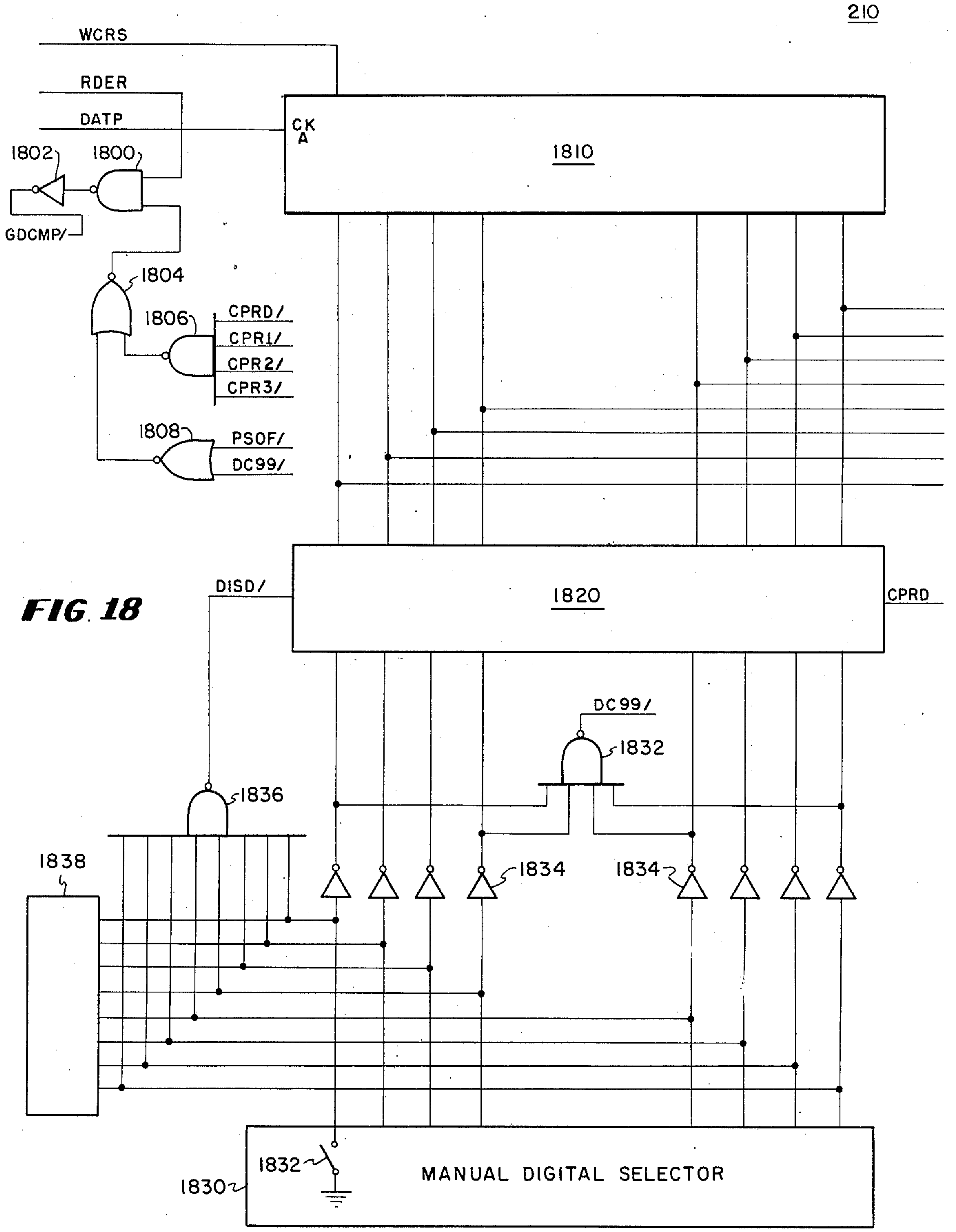
Figure 19:
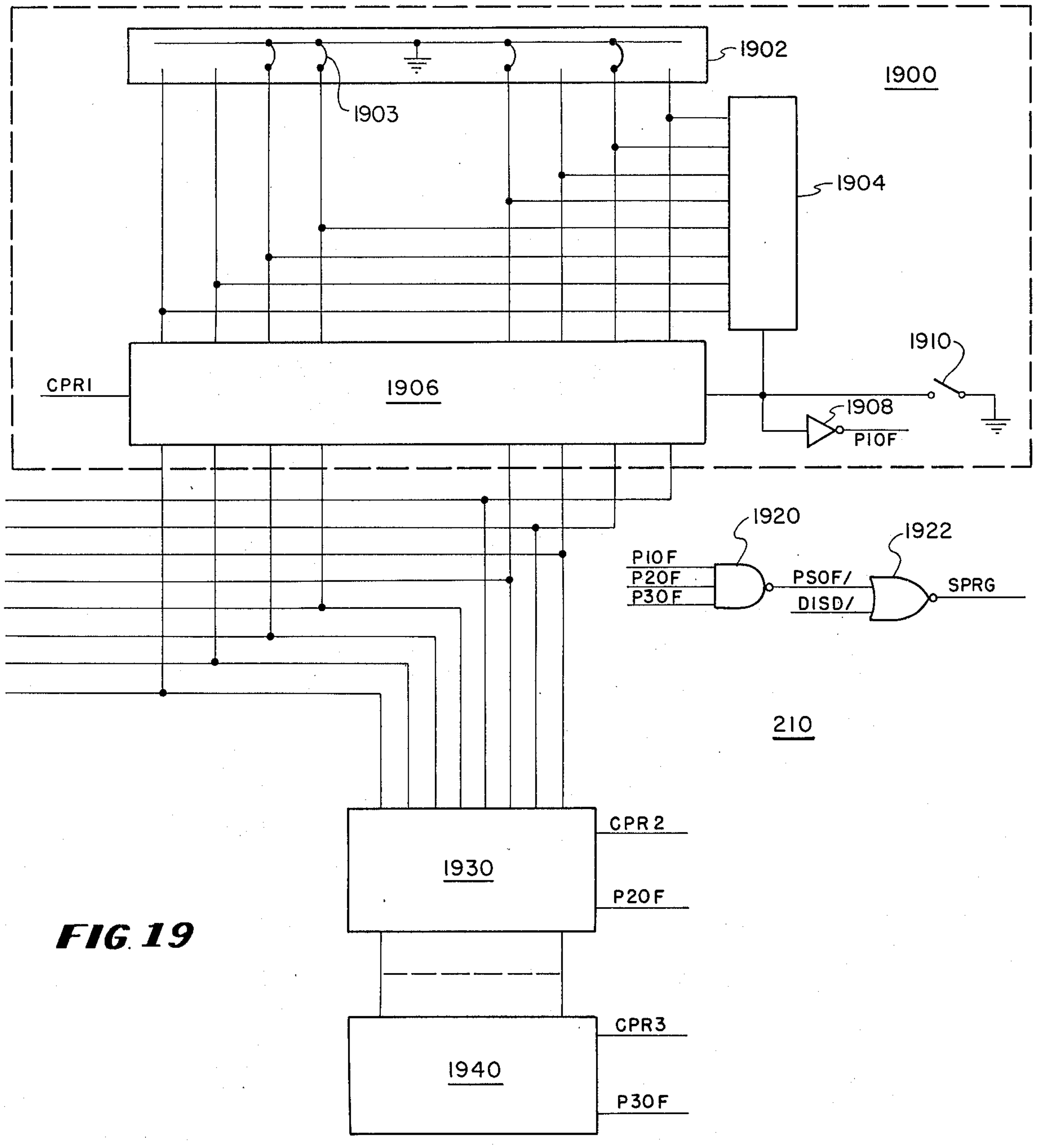
Figure 20:
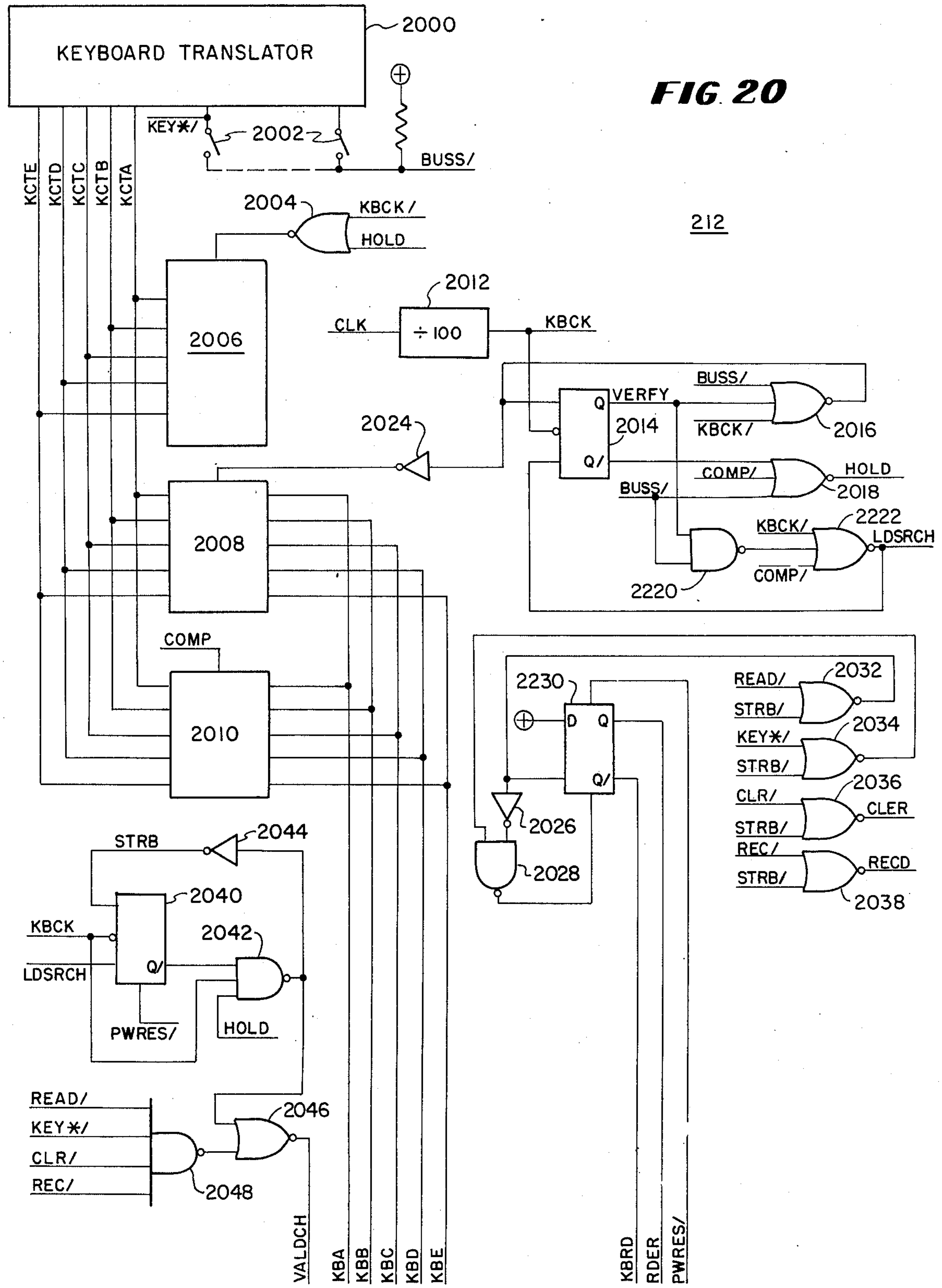

FIGS. 8 and 9 form a schematic circuit diagram of error checking and programming control circuits associated with the code demodulators;

FIGS. 10 and 11 form a schematic circuit diagram of a prebuffer unit for one demodulator channel and a channel selector for selecting different demodulator channels and prebuffer units;

FIGS. 12–14 form a schematic diagram of an output buffer and control circuit therefor;

FIGS. 15–17 form a schematic diagram of a control circuit for checking for the presence of header and trailer records;

FIGS. 18 and 19, when placed side-by-side, form a circuit diagram of a character number control circuit associated with the buffer control circuit; and FIG. 20 forms a circuit diagram of a keyboard unit associated with the reader.

Figures 1, 2:
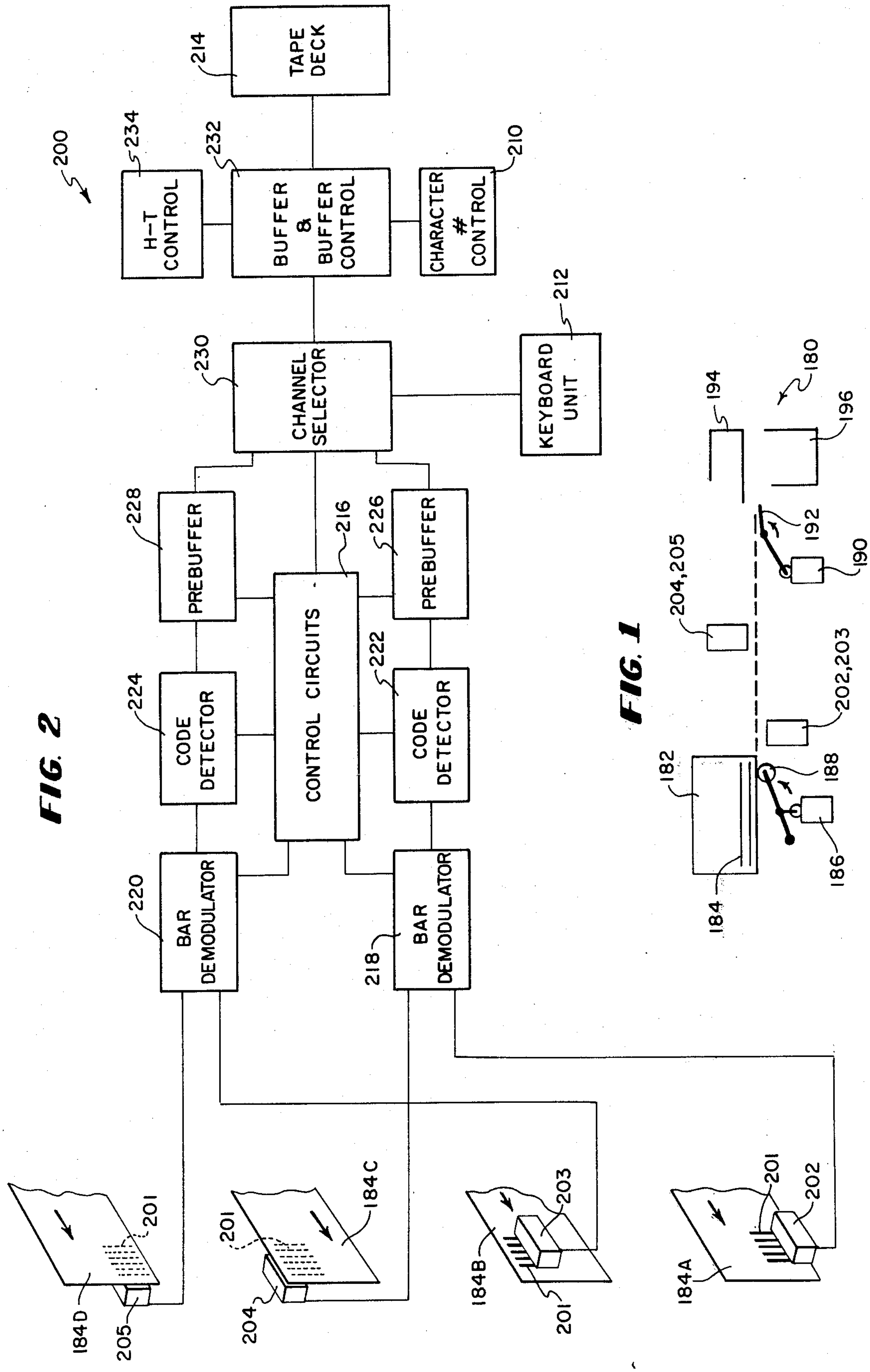
FIG. 1 is a simplified schematic illustration of certain components of a batch record reader embodying the present invention.
FIG. 2 is a schematic diagram in block form illustrating the components of a system for controlling the operation of the batch record reader shown in FIG. 1.

Referring now more specifically to FIG. 1 of the drawings, therein is illustrated a batch record reader which embodies the invention and which is indicated generally as 180. Although the mechanical components of the reader 180 can be of any suitable type known in the art, they preferably comprise an arrangement such as that shown in the contemporaneously filed application of Steigerwald and Clift (M-252) which application is assigned to the same assignee as the present application. In general, the record reader 180 includes a storage bin or receptacle 182 containing a plurality of coded records 184 (FIGS. 1 and 2) which are to be read or translated. Although these records 184 can be of a number of different types using reflective or magnetic codes, they can comprise a generally reflective paper ticket or label on which information is encoded using a series of alternate blank spaced and printed black bars 201 modulated in width as described in the copending application of Bruce W. Dobras, Ser. No. 239,168, filed Mar. 29, 1972, which application is assigned to the same assignee as the present application. The black bars 201 are printed in a series along one edge of the ticket 184 offset from the center of the ticket 184. A complete data entry or message is encoded by a series of groups of the black bars 201 along an edge of the record or ticket 184. A typical message includes a start code, message information usually including a plurality of characters, and a stop code. The start and stop codes are so selected as to provide unambiguous interpretation when read in either a forward or reverse direction.

The records or tickets 184 can be placed in the storage or feeder bin or receptacle 182 intermixed to occupy any one of four different positions or orientations. These four possible positions are illustrated schematically in FIG. 2 by four tickets 184A-184B shown in conjunction with four sensing heads 202-205, respectively. The ticket 184A includes a coded message disposed along its lower edge which, when relative movement between the head 202 and the reader 184A takes place in a direction indicated by the arrow, presents the start code as the first item of information to the sensing head 202. The printed bars 201 on the record 184A are assumed to be on the front of the record 184A.

The record 184B illustrates the printed bars 201 of the coded message as being disposed along an upper edge of the front of the record 184B. When the record 184B is moved in the direction indicated by the arrow, the stop code is presented as the first item of information to the sensing head 203, and the message is read in a reverse direction.

On the record 184C, the printed bars 201 appear on the upper edge of the back of the record 184C. When the record 184C is moved in the indicated direction, the start code in the encoded message is the first item of information presented to the sensing head 204. Thus, the message on the record 184C is read in a forward direction.

On the record 184D, printed bars 201 are disposed along the lower edge of the back surface of the record. Thus, the stop code in the message is the first item of information presented to the sensing head 205 when the record 184D is moved in the direction indicated by the arrow.

Thus, the records 184 can be intermixed in the storage receptacle 182 so that the coded messages on tickets 184 in two positions can be read from one side of the feed path, and the coded messages on the tickets 184 in the other two positions can be read only from the other side of the record or feed path. In each of these two pairs of positions, one message will be read in a forward direction and the other message will be read in a reverse direction. In addition, the batch reader 180 is designed to require the provision of a header record or ticket preceding each of the groups of records 184 to be read and a trailer ticket following this group of tickets. These header and trailer tickets or records can be used, for example, to segregate tickets derived from different sources, such as different departments of a retail establishment. In the illustrated embodiment, the header ticket includes a start code followed by five successive codes representing the digit 8. A trailer card includes an encoded message comprising an initial start code followed by five successive codes for the digit 9. These header and trailer cards can also include additional source identifying or similar information. Thus, the first record 184 fed into the batch reader 180 from the storage receptacle 182 must be a header card.

A control circuit 200 (FIG. 2) controlling the operation of the reader 180 is provided with some manually selected input information prior to initiating operation of the reader 180. In the first place, the batch reader 180 includes a character control circuit 210 (FIG. 2) forming a part of the control circuit 200. This character control or character number control 210 insures that each ticket 184 read by the reader 180 includes a predetermined number of message characters. The character control 210 includes a number of preset character number programs selected by manual switches, a series of thumb switches for setting a variable number of characters into the character control, and an override control which permits the batch reader to operate with variable indeterminate numbers of characters in the messages on the various records 184. Thus, the machine operator, prior to placing the batch reader 180 in operation, selects one of the preset programs requiring a given number of characters, sets the thumb wheel switches for the number of characters to be expected in each message, or sets the character control circuit 210 into an override condition in which no control is exercised over the number of characters in each message.

The batch reader 180 also includes a keyboard unit 212 in the control circuit 200. This keyboard unit 212 is provided to permit the manual entry of data into an output unit or tape deck 214, in addition to the data derived from reading the records 184. The batch reader 180 cannot be simultaneously operated in a manual entry mode and in a reading mode. Accordingly, if a batch of tickets 184 are to be read, a manual control associated with the keyboard unit 212 is operated to a setting representing reader operation. This disables the keyboard input unit 212.

When the reader 180 is to be placed in operation, a manual start control in a control circuit 216 forming a part of the control circuit 200 is actuated. This start control starts the main drive motor for feeding the tickets 184 from the hopper 182 along the drive path. However, to provide a delay permitting the drive system to attain operating speed, a solenoid 186 is energized for a brief period to move a feeder wheel 188 away from the lowermost or outermost record 184 in the storage receptacle. After the delay, the solenoid 186 releases the wheel 188 to feed the lower record 184 into a continuously operating conveying system which advances this record past the two sets of sensing heads 202, 203 and 204, 205 which are disposed adjacent opposite sides of the record 184. The first record 184 should be a header card. This header card first moves past the heads 202, 203 and then past the reading heads 204, 205.

The heads 202–205 can be of any construction well known in the art and generally include a light source and a light responsive detector. The outputs from the detectors in the heads 202–205 are selectively connected to the inputs of a pair of bar demodulators 218 and 220. The inputs to the demodulator 218 derived from the heads 202 and 204 receive information read in a forward direction, and the inputs to the demodulator 220 receive data from the heads 203 and 205 representing data read in a reverse direction. When the leading edge of the header ticket 184 reaches the set of heads 202, 203, the demodulators 218, 220 advise the control circuit 216 that a ticket is present at the first reading station, and the control circuit holds the heads 202, 203 in an enabled state and inhibits operation of the heads 204, 205. In addition, the control circuit 216 conditions the demodulators 218, 220 for supplying synchronized data derived from the printed bars 201 on the ticket 184 to a pair of individually connected code detectors 222 and 224. The control circuit 216 in its initial state is conditioned so that a ticket reading operation cannot be initiated unless one of the heads 202 and 203 in the first station supplies to the circuit 200 a valid start condition, either a start read in a forward direction or a stop read in a reverse direction followed by two correctly encoded characters of any value.

Thus, the outputs of the two code detectors 222, 224 are connected to a pair of prebuffer units 226 and 228, respectively. Each of the prebuffer units 226 and 228 has a three character storage capacity. Accordingly, both of the code detectors 222 and 224 now continuously monitor for a proper start condition. When a proper start condition is found, the code representing the proper start condition is stored in the first stage of the connected prebuffer 226, 228. The control circuit 216 then controls the detectors 222, 224 to search for two properly encoded characters of any value. As these two characters are found, they are transferred into the proper one of the prebuffers 226, 228.

However, only one of the prebuffers 226, 228 will receive the three proper characters constituting the condition necessary for continuing operation of the batch reader 180 inasmuch as only one of the sensing heads 202, 203 in the first station is actually sensing data. Accordingly, whenever either one of the buffers 226, 228 has received three characters comprising the proper starting condition, the control circuit 216 recognizes one of the buffers 226, 228 containing the proper start condition and controls a channel selector 230 to cut through the proper prebuffer 226, 228 to a buffer and buffer control circuit 232. The channel terminating in the one of the prebuffers 226, 228 that is not cut through by the channel selector 230 remains isolated from the buffer and cannot transfer spurious data through the buffer 232 to the tape deck or magnetic storage or output unit 214.

When the channel selector 230 supplies information to the input of the buffer and buffer control circuit 232, a header-trailer control circuit 234 is placed in operation. This circuit checks to insure that the first record 184 read by the batch reader 180 preceding ticket or message information comprises a header ticket. The header-trailer control circuit 234 examines the first six bits of information stored in the buffer 232 to insure that it comprises the information characterizing a header card. If this information is not received, the circuit 200 prevents output data transfer by establishing an error condition requiring a renewed attempt to read information into the tape deck 214. If, however, the received information indicates that the first record 184 comprises a header card, the buffer in the buffer control circuit 232 can continue to receive data from the selected one of the prebuffers 226, 228 and to supply this information with proper timing and in proper code format to the input of the tape deck 214 for recording. As each character is transferred into the buffer 232 from the selector unit 230, the character control 210 accumulates a running total of transferred characters. If the expected number of characters is not received, the character control circuit 210 establishes an error condition preventing transfer of data into the output unit 214 at the end of the record 184.

In the description above, it is assumed that one of the heads 202, 203 at the first sensing station provides the necessary three characters of information indicating a proper start condition and that head control logic circuits in the control circuit 216 maintain the heads 204, 205 at the second sensing station in an inoperative state. If, however, a valid start condition has not been detected by the time that the leading edge of the ticket 184 reaches the second sensing station provided by the vertically spaced sensing heads 204, 205, the heads 202, 203 are disabled, and the heads 204, 205 are enabled. These heads sense the assumed back of the record 184 and then operate in the manner described above to supply information to the circuit 200 for storage in the tape deck 214 in the manner described above.

If either one of the sets of heads 202, 203 or 204, 205 provides information indicating that the first sensed ticket 184 is a header ticket, this information is transferred to the tape deck 214 in the manner described above. However, it is desirable to be able to segregate tickets providing improper data in accordance with the source from which these tickets were obtained. Accordingly, when the control circuit 200 determines that a header or trailer ticket is passing through the batch reader 180, a solenoid 190 (FIG. 1) is momentarily actuated as the header or trailer ticket 184 passes beyond the second sensing station and approaches the end of the feed path. The momentary energization of the solenoid 190 moves a gate 192 into a displaced position so that the header or trailer ticket 184 is diverted into and stacked in a receptacle 194 in which are stored the tickets 184 from which improper information has been derived. Following diversion of the header ticket, the solenoid 190 is released to restore the gate 192 to a normal position in which it directs read tickets 184 into a receiver or storage bin 196. The receiver 196 contains tickets from which proper or correct information has been derived.

Thereafter the remaining tickets 184 in the storage bin 182 are periodically and automatically fed from the storage bin under the control of the solenoid 185 to be sensed by the heads 202-205. All tickets from which correct information is received are conveyed to the receptacle 196. If, however, incorrect information is detected by the circuits 210, 222, 224, or 234, the solenoid 190 is energized to shift the position of the gate 192 so that the incorrect tickets are diverted to the storage receptacle 194. At the end of reading a group of tickets from a given source, the trailer ticket is detected, and the solenoid 190 is energized to divert the trailer ticket to the receptacle 194. Thus, the tickets in the receptacle 194 from which bad information has been derived are bracketed by the header and trailer tickets identifying the group from which these tickets were derived. The sensing of a trailer ticket also controls the circuit 200 so that a reading operation cannot be initiated on the next batch of tickets unless a header card is presented as the first ticket 184.

Whenever it is desirable to insert additional information into the magnetic storage unit or tape deck 214 in conjunction with data derived from the tickets 814, a manual control associated with the control circuit 200 is actuated to disable the ticket reading portion of the batch reader 180 and to enable the keyboard unit 212.

In general, the channel selector 230 inhibits selection of either of the prebuffers 226, 228 in this mode and enables the keyboard unit 212 to supply data to the buffer and buffer control circuit 232. The keyboard unit 212 includes a manual key input through which data can be supplied to the tape deck 214. In addition, a visual display is associated with the keyboard unit 212 to permit data entered into the tape deck 212 to be visually verified.

The circuitry of the control circuit 200 is illustrated in the following figures of the drawings in simplified logic form using NAND and NOR logic. In one embodiment constructed in accordance with the present invention, the logic components from which the control circuit 200 was constructed were Series 54/74 TTL logic elements manufactured and sold by Texas Instruments Incorporated of Dallas, Texas. Obviously, however, the control circuit 200 could be constructed using different families of logic elements, i.e., complementary symmetry MOS devices, or could be implemented using other types of logic functions, such as AND and OR devices.

Figure 3:
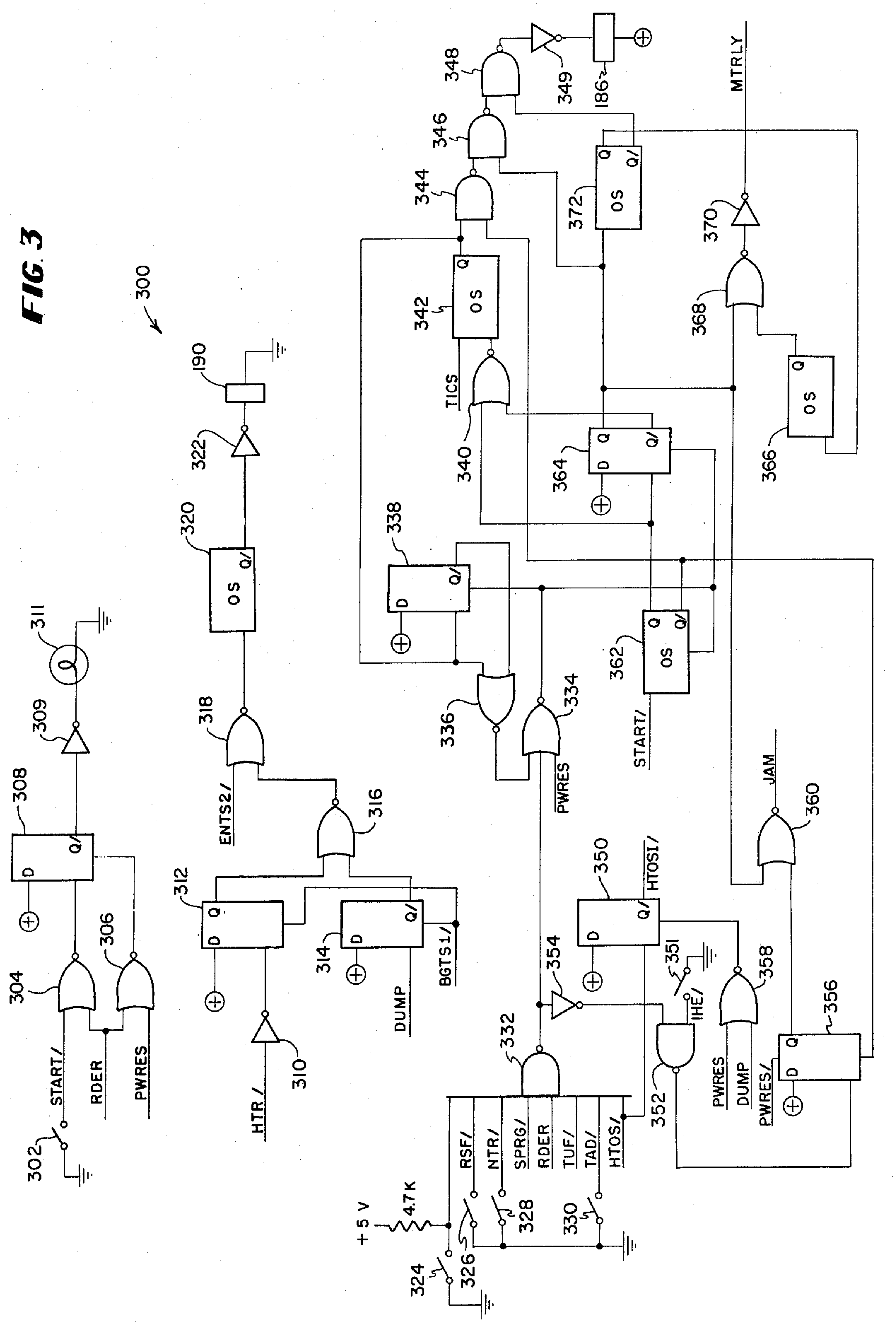
FIG. 3 is a schematic diagram of a mechanism control circuit included in the batch reader.

In the following description, the signals generated by the various logic components and used for control functions are designated by alphabetical or alphanumeric designations. Throughout the description, the corresponding signal in inverted form is indicated by the same signal designation followed by a /. As an example, the control circuit 200 utilizes a master reset signal which is generated by known means (not shown) each time that power is applied to the batch reader 180. This master reset signal is identified as PWRES and is applied, for instance, to one input of a NOR gate 306 in a mechanism control circuit 300 (FIG. 3). Its inverted signal identified as PWRES/ is applied to the prime input terminal of a D flip-flop 356 in the same control circuit 300.

Mechanism Control Circuit

Referring now more specifically to the mechanism control circuit 300, this circuit forms a part of the control circuit 216 and is basically concerned with controlling the operability of the mechanical drive components in the batch reader 180. Further, since the normal intended mode of operation of the batch reader 180 is to read the tickets 184 rather than to effect manual data entry through the keyboard unit 212, the mechanism control circuit 300 includes an annunciator or indicating lamp 311, the illumination of which indicates that the reader 180 is conditioned for keyboard data entry.

To effect this latter control, there is provided a D flip-flop 308. When the power reset signal PWRES is provided, the output of the NOR gate 306 drops to a low level and resets the flip-flop 308 so that a more positive potential is applied to the input of an inverting lamp driver 309, the output of which is connected to the annunciator lamp 311. Accordingly, when the D flip-flop 308 is reset, the lamp 311 is not illuminated.

When the batch reader 180 is in its reader mode conditioned to read tickets 184, a reader signal RDER is at a more positive level. This signal is also effective through the NOR gate 306 to reset the flip-flop 308. It is also effective through a NOR gate 304 to hold the clock input of the flip-flop 308 at a low level potential.

If, however, the reader 180 is conditioned for keyboard operation, the signal RDER is at a more negative level. If an attempt is then made to start a reading operation by closing a manual start switch 302, a signal START/ drops to a low level. At this time, both of the inputs to the gate 304 are at a low level, and its output rises to a more positive potential. This sets the flip-flop 308 so that a more negative potential is applied to the input of the lamp driving inverter 309. This causes the illumination of the lamp 311 and provides a visible indication that an attempt has been made to start the batch reader with this reader conditioned for keyboard data entry. When the reader 180 is restored to its reader mode, the signal RDER rises to a more positive level to reset the flip-flop 308 and to apply a continuous low level potential to the clock input of this flip-flop, and the illumination of the lamp 311 is terminated.

The closure of the switch 302 to provide the more negative signal START/ triggers a one-shot 362 having a delay interval of around three seconds. The more positive output from the Q terminal of the one-shot 362 sets a D flip-flop 364. The more positive output from the flip-flop 364 drives the output of a connected NOR gate 368 to a low level which is forwarded through an inverter 370 to provide a more positive signal MTRLY. This signal energizes the motor drive relay so that the common drive motor for the feed system in the batch reader 180 is placed in operation. The operation of this motor, for instance, produces rotation of the feed roller 188 (FIG. 1) as well as the remainder of the conveying means for advancing a record 184 fed from a hopper 182 along a feed path toward the hoppers or receptacles 194 and 196. However, movement of the record 184 is not initiated at this time because the solenoid 186 (FIG. 1) is energized to inhibit feeding of the first record 184 until such time as the drive motor reaches its operating speed.

More specifically, when the flip-flop 364 is set, the more positive potential from its Q terminal completes the enabling of a NAND gate 346 so that its output drops to a low level and is effective through a NAND gate 348 to apply a more positive potential to the input of a solenoid driving inverter 349. The low level output from the inverter 349 energizes the solenoid 186 so that the drive wheel 188 is displaced relative to the first card or ticket 184 in the hopper 182. This prevents feeding of the first header ticket 184 along the feed path in the batch reader 180.

When the one-shot 362 times out after an interval of around three seconds, which is sufficient to permit the drive motor to come up to speed, the Q output of the one-shot 362 drops to a low level so that both inputs to a NOR gate 340 are now at a low level in view of the prior setting of the flip-flop 364. Thus, the output of the gate 340 rises to a more positive potential. The output of the gate 340 is connected to the positive-going trigger input of a one-shot 342 and sets this one-shot which has a delay interval of around 200 milliseconds. The output from the one-shot 342 rises to a more positive potential and completes the enabling of a NAND gate 344 so that a low level input is applied to one input of the gate 346. The output potential from the gate 346 is effective through the gate 348 and the inverter 349 to release the solenoid 186 to permit the first ticket 184 to be fed from the hopper along the feed path in the batch reader 180.

The one-shot 342 is a retriggerable one-shot and is supplied at its negative-going clock input with a signal TICS. This signal drops to a low level as the trailing edge of each ticket 184 passes the first sensing station including the sensing heads 202 and 203. Thus, so long as tickets 184 are fed along the feed path within the 200 millisecond delay interval of the one-shot 342, this one-shot will not time out, and the solenoid 186 remains in a released state permitting the continuous feeding of tickets 184 from the hopper 182 into the feed path of the batch reader 180.

The initial setting of the one-shot 342 prepares a circuit including a flip-flop 338 and a pair of NOR gates 334 and 336 for resetting the motor drive portion of the control circuit 300 to a normal state whenever the feeding of the tickets 184 is terminated or whenever a jam condition arises such that tickets do not pass beyond the first sensing station in the expected time interval. More specifically, when the one-shot 342 is initially set, the positive-going output signal therefrom sets the flip-flop 338 so that a negative potential is applied to one input of the NOR gate 336. The other input to this gate is maintained positive by the output from the one-shot 342. However, when the one-shot 342 times out for any of the reasons set forth above, the second input to the gate 336 drops to a low level, and the output of this gate rises to a more positive level which is effective through the gate 334 to reset the flip-flops 338 and 364 and to hold the one-shot 362 in its reset or cleared state. The resetting of the flip-flop 338 merely restores this portion of the circuit to a normal state. The resetting of the flip-flop 364 provides a negative-going signal at its Q output terminal which triggers a one-shot 372. The Q/terminal of the one-shot 372 drops to a low level potential and is effective through the gate 348 and the inverter 349 to energize the solenoid 186 so that the feeding of further cards from the hopper 182 is inhibited. The more positive potential provided at the Q output of the one-shot 372 is supplied to the positive-going trigger terminal of the one-shot 366 to set this flip-flop.

The more positive output from the one-shot 366 is effective through the NOR gate 368 and the inverter 370 to maintain the motor control relay operated for the period of time required to clear any tickets 184 then in the feed path of the batch reader 180 to either of the receptacles 194 and 196. The control potential provided by the one-shot 366 replaces the control potential for the motor relay removed by the resetting of the flip-flop 364.

After the delay interval of the one-shot 366, the motor relay is released to terminate energization of the main drive motor, and this motor slows down to a stop condition. During this period, the one-shot 372 maintains the solenoid 186 energized to prevent any record feeding during the "slot-down" interval. The one-shot 372 then times out to release the solenoid 186 to permit the reader 180 to be placed in operation on receipt of the next start command.

The circuit 300 also includes a jam detecting circuit including the D flip-flop 356 and a NOR gate 360. The flip-flop 356 is normally primed to a set state when the batch reader is placed in operation by the signal PWRES/. Thus, the Q output of the flip-flop 356 normally holds the output of the NOR gate indicated as a signal JAM at a low level. However, when the one-shot 362 is set to start the batch reader 180, the low level output from the Q/ terminal clears the flip-flop 356 to remove one positive input to the NOR gate 360. However, the flip-flop 364 is substantially concurrently set and returns a more positive input to the other input to the gate 360. Thus, the signal JAM remains at a low level even though the flip-flop 356 is reset.

If a jam arises and a continuing series of records 184 is not detected by the one-shot 342, the flip-flop 364 is reset in the manner described above, and the flip-flop 356 remains reset. Thus, both inputs to the NOR gate 360 are now held at a low level. The output of this gate rises to a more positive potential, and this more positive potential controls a suitable annunciator to indicate that a jam condition has been encountered.

If, on the other hand, the ticket reader 180 is stopped by any expected occurrence, as by manually closing a stop switch 324 during the reading operation, the output of a NAND gate 332 is driven to a more positive potential which is effective through the gate 334 to reset the components 338, 362, and 364 in the manner described above. At this time, one input to the gate 360 drops to a low level potential because of the resetting of the flip-flop 364. However, the more positive potential from the gate 332 is effective through an inverter 354 and a NAND gate 352 to provide a positive-going signal at the clock input to the flip-flop 356 so that this flip-flop is set. This returns a more positive potential to the lower input of the gate 360, and the signal JAM is held at a low level at the termination of the reading operation.

The same stopping of the reader 180 and holding the jam signal JAM at its low ineffective level occurs whenever any one of the other inputs to the NAND gate 322 drops to a low level prior to the resetting of the one-shot 342. A switch 326 provides a low level signal RSF/ whenever the reject ticket hopper 194 (FIG. 1) becomes filled. A switch 328 is closed whenever the good read ticket receptacle or hopper 196 is inadvertently removed. A switch 330 is closed whenever an access door covering the reading mechanism is inadvertently opened. These two switches provide the signals NTR/ and TAD/, respectively. A signal SPRG/ is provided by the character number control 210 whenever the operator has filed to select the number of characters to be expected from each ticket 184. The signal RDER becomes negative whenever the operator attempts to switch to keyboard operation during a ticket reading operation. A signal TUF/ appears whenever there is a tape error, and a signal HTOS/ appears whenever the header and trailer records 184 are out of sequence. In addition, a switch 351 is closed to set the flip-flop 356 but not to clear the components noted above whenever the input ticket hopper 182 becomes empty.

The control circuit 300 also includes means for controlling the energization of the solenoid 190 for selectively diverting tickets 184 to the bad ticket receptacle 194. This diversion taked place whenever incorrect data is derived from a ticket 184 and whenever the ticket 184 comprises a header ticket or a trailer ticket.

Assuming that the reader 180 has just been placed in operation and that the header-trailer control circuit 234 detects the header card, this circuit provides a signal HTR/ which is effective through an inverter 310 to set a D flip-flop 312. The more posiive output from the flip-flop 312 is effective through a NOR gate 316 to apply a low level potential to one input of a NOR gate 318. The other input to this gate is supplied with the signal ENTS2/ which drops to a low level as the trailing edge of a ticket 184 leaves the second sensing station including the heads 204 and 205. At this time, the output of the gate 318 rises to a more positive level and triggers the positive-going trigger input to a one-shot 320 having a delay interval of around 70 milliseconds. The low level output from the one-shot 320 is effective through a solenoid driving inverter 322 to energize and operate the solenoid 190. This moves the gate 192 (FIG. 1) to a position in which the header card is diverted into the reject ticket hopper 194. At the end of the delay interval of the one-shot 320, the solenoid 190 is released. Flip-flop 312 is reset by the signal BGTSI/.

To provide means for diverting the tickets from which incorrect data has been derived into the hopper 194, a D flip-flop 314 is provided. The reset or clear terminal of this flip-flop is provided with a signal BGTSI/ which drops to a low level when the leading edge of a ticket 184 reaches the first sensing station including the heads 202 and 203. At this time the Q/output of the flip-flop becomes more positive and is effective through the NOR gate 316 to partially enable the gate 318. If correct data is derived from the record 184 during its passage through either of the two sensing stations formed by the heads 202-205, a signal DUMP becomes positive indicating that the data can be transferred from the output buffer 232 to the tape deck 214. The more positive signal DUMP sets the flip-flop 314 and removes the partial enabling for the gate 318. However, if the ticket does not provide proper data, the signal DUMP does not become positive, and the flip-flop 314 remains reset. Accordingly, when the trailing edge of the ticket 184 leaves the second sensing station provided by the heads 204 and 205, the signal ENTS2/ becomes more negative in the manner described above, and the gate 318 is fully enabled which produces the operation of the solenoid 190 in the manner described above so that the ticket is diverted to the bad ticket hopper 194.

Sensing Heads and Associated Circuitry

Figure 4:
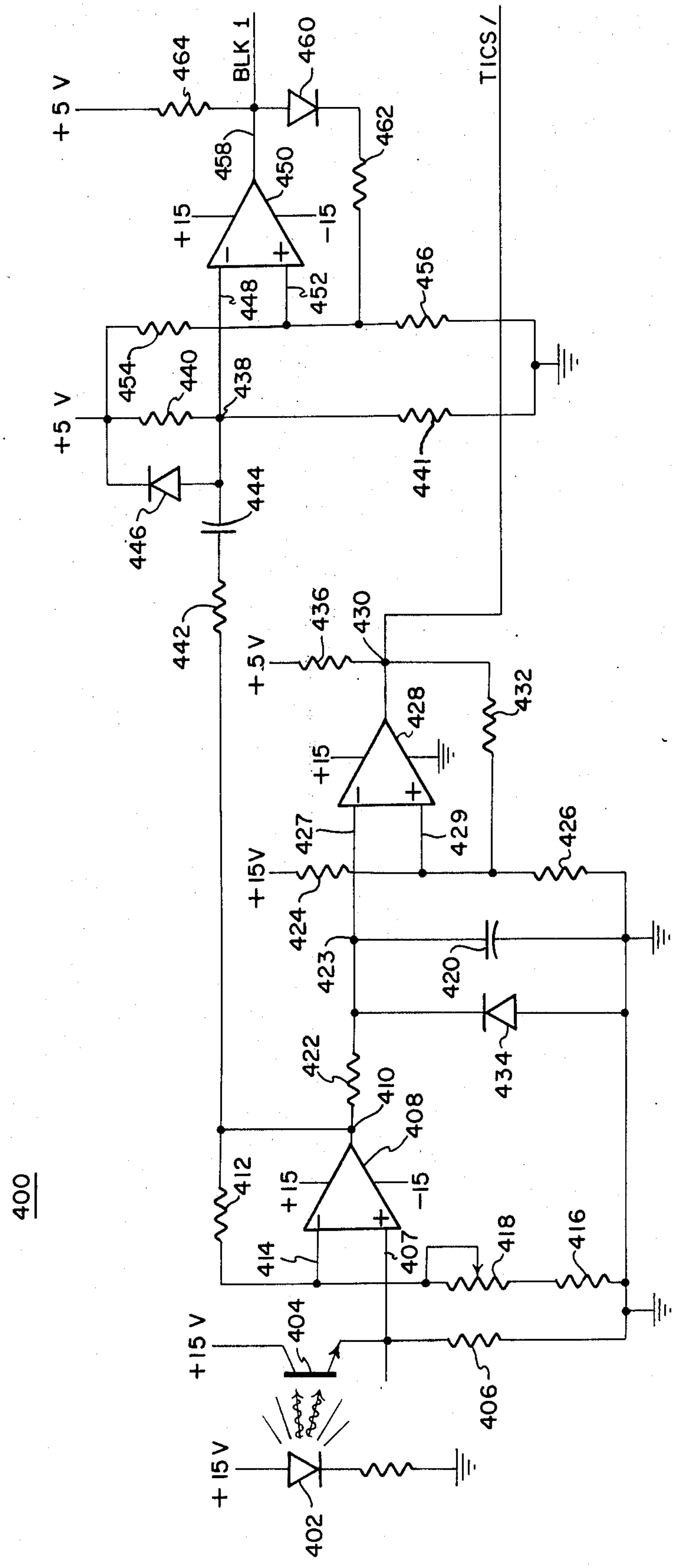
FIG. 4 is a schematic diagram of a circuit for developing control and code representing signals at one of the sensing stations in the reader.

In the preferred embodiment of the invention, each of the sensing heads 202, 203, 204, and 205 includes a light emitting diode which is used to illuminate the records and a light sensitive transistor which is used to sense the amount of light which is reflected from the records. In FIG. 4, a suitable circuit 400 is shown which may be used to energize a light emitting diode 402 and light sensitive transistor 404 and to amplify signals which are presented by the transistor 404. The diode 402 and transistor 404 are mounted within one of the sensing heads 202, 203, 204, or 205. The other elements of the circuit 400 from portions of the bar demodulators 218 and 220. Each of the bar demodulators 218 and 220 contains two of the circuits 400, one for each of the two heads associated with each bar demodulator.

With reference to FIG. 4, a suitable light emitting diode 402 is shown connected in series with a resistor between ground and a positive source of potential. A light sensitive transistor 404 is shown similarly connected in series with a resistor 406 between ground and a positive source of potential, with the resistor 406 connected to an emitter of the transistor 404 and with the collector of the transistor 404 connecting to the source of potential. Optical elements (not shown in FIG. 4) of conventional design are used to focus light emitted from the diode 402 upon an adjacent record and to convey light reflected from the record to the transistor 404. Any photons of light which strike the transistor 404 cause the generation of charge carriers within the transistors 404. The current flow represented by these charge carriers is amplified by the transistor 404 and results in an amplified current flow through the transistor 404 and through the series resistor 406. This current flow causes a positive potential to develop across the resistor 406. The magnitude of this current varies with the intensity of the light that impinges upon the transistor 404.

When a white record bearing a series of black bars and other indicia passes opposite a scanning head, the amount of light which is reflected off of the record to the transistor 404 depends upon whether the light emitted by the diode is focused upon a printed black region or upon a white space between two adjacent black regions. As a record is moved with constant velocity past the diode 402 and transistor 404, the light which impinges upon the transistor is modulated in accordance with the bar coding and other markings which the record bears, and the potential across the resistor 406 varies up and down accordingly. Any pattern of light and dark portions on a record is thus converted into a fluctuating electrical potential across the resistor 406. When no record is positioned opposite the light emitting diode 402, the light emitted by the diode 402 is not reflected, and little or no light reaches the transistor 404. Hence, little or no potential is developed across the resistor 406 when no record is positioned before the diode 402 and the transistor 404. When a card passes opposite the diode 402 and transistor 404 the potential across the resistor 406 initially rises positively in response to the light reflected from the white edge of the record, and then fluctuates in accordance with the indicia printed upon the card.

The potential developed across the resistor 406 is fed into a non-inverting input 407 of a conventional operational amplifier 408, and an amplified version of this potential appears at an output 410 of the amplifier 408. The output signal of 410 is fed back through a resistor 412 to an inverting input 414 of the amplifier 408, and the inverting input 414 is connected to ground potential by a fixed resistor 416 and an adjustable resistor 418 which are connected in series with one another. These connections cause the amplifier 408 to function as a linear voltage amplifier the gain which may be varied from about 10 to 100 in dependence upon the setting of the variable resistor 418. The amplifier 408 amplifies both alternating and direct current signals in a linear manner, and hence the signal which appears at 410 is simply an amplified version of the signal developed across the resistor 406 by the transistor 404.

Two different signals are derived from the amplified signal which appears at the output 410. A first signal TICS/ is normally at a potential of about +5 volts when no record is present before a scanning head. The signal TICS/ drops to ground potential when a record passes in front of the light emitting diode 402 and transistor 404. The signal TICS/ thus signals that a record is present before the scanning head. A signal BLK1 fluctuates positively and negatively in accordance with the patterns of dark and light areas on any given record that passes the scanning head and thus represents whatever information content is presented by a record to the transistor 404.

The signal TICS/ is developed by an integrating circuit having a Schmitt trigger output. Since the amplifier 408 is connected as a non-inverting amplifier, the potential at the amplifier output 410 swings positively when the potential across the resistor 406 swings positively. As was noted above, the potential across the resistor 406 swings from close to ground potential to a positive level whenever a record passes before the scanning head. The amplifier 408 develops an amplified version of this positive potential at the output 410. Hence, the output 410 goes positive whenever a record is scanned.

This positive potential at 410 is applied to a series circuit comprising a resistor 422 and a capacitor 420. The capacitor 420 has one terminal grounded and has another terminal connected to one terminal of the resistor 422 to form a node 423. The other terminal of the resistor 422 is connected to the output 410. The positive potential which appears at the output 410 when a record is before the scanning head causes a charging current to flow through the resistor 422 and to develop a charge across the capacitor 420 such that the node 423 goes positive with respect to ground. If the positive potential at the output 410 is maintained a sufficient length of time, the positive potential developed across the capacitor 420 raises the potential of an inverted input 427 of a high gain operational amplifier 428 to a more positive level than the level at which a non-inverting input 429 of the amplifier 428 is biased by potential divider resistors 424 and 426. When the amplifier input 427 goes positive of the input 429, the output 430 of the operational amplifier 428 swings from a positive level to close to ground potential and thus causes the TICS/ signal to go to ground potential. In order to insure that the transition from positive to ground at the node 430 is a clean transition, a resistor 432 supplies positive feedback from the output 430 to the non-inverted input 429 of the amplifier 428 and thus gives the amplifier 428 a Schmitt trigger type of characteristic.

The signal at the output 430 of the amplifier 428 stays close to ground potential until the record has completely passed by the scanning head so that the potential across the resistor 406 falls back to ground potential. The potential at the output 410 of the amplifier 408 goes negative and draws a reverse current through the resistor 422. This reverse current discharges the capacitor 420 until the node 423 goes negative respective to ground sufficiently so as to induce forward conduction in a diode 434 that is connected in parallel with the capacitor 420. The diode 434 prevents a substantial reverse charge from being developed across the capacitor 420 and thus reduces the amount of time it takes to charge the capacitor 420 positively.

The input amplifier 408 has both positive and negative supply current connections to sources of plus and minus 15 volts. The Schmitt trigger amplifier 428 has positive and negative supply connections which connect respectively to a source of +15 volts and to ground. Because of these supply connections, the output of the amplifier 408 is free to fluctuate both positively and negatively of ground potential while the output 430 of the amplifier 428 cannot swing below ground potential. A resistor 436 connecting the output 430 to a source of +5 volts further limits both the positive and negative swings which occur at the output 430 and, in general, renders the output signal TICS compatable with the logic gates used elsewhere in the overall system.

The signal BLKl is developed basically by differentiating the output signal at BLK1 and then passing the signal through a D.C. level restoration and a Schmitt trigger circuit. The output signal 410 is applied through a series circuit to a terminal 438 which is connected to a +5 volt potential source by a resistor 440 and to ground by a resistor 441. The series circuit comprises a current limiting resistor 442 that is connected in series with a DC blocking capacitor 444. A diode 446 also connects the node 438 to the source of +5 volt potential and thus prevents the node 438 from going substantially positive of +5 volts. The node 438 is coupled to an inverting input 448 of an operational amplifier 450. A non-inverting input 452 of the same amplifier 450 is biased at a fixed potential level by biasing resistors 454 and 456. An output 458 of the amplifier 450 is the point at which the signal BLK1 appears.

Assume that a record is moving to a position opposite the diode 402 and the transistor 404. Just before the record passes in front of the transistor 404, a slight positive potential exists across the resistor 406, and the potential at the output 410 of the amplifier 408 is typically close to ground level or even negative. The capacitor 444 is fully charged by the resistors 440, 441, and 442 so that the node 438 is positive and so that the other terminal of the capacitor 444 is at the potential level of the output 410.

As the record moves before the transistor 404, the edge of the record causes an increase in the amount of illumination which strikes the transistor 404. In response to this increased illumination, a positive potential develops across the resistor 406 and an amplified version of this positive potential appears at the output 410. This positive swing of the output 410 pulls the adjacent terminal of the capacitor 444 positive and causes the capacitor 444 to push the node 438 positive. However, the diode 446 becomes conductive if the node 423 exceeds +5 volts. The capacitor 444 is formed to discharge itself through the resistor 442 until once again the left-most terminal of the capacitor is at the same potential as the output 410 of the amplifier 408. In this manner, the charge across the capacitor 444 is quickly adjusted when a record passes before the scanning head so as to adjust the charge on the capacitor 444 to compensate for any variance in the intensity of illumination given off by the diode 402, the color or reflectivity of the record, the gain and drift of the amplifier 408, and other variable factors within the circuit. The diode 446, capacitor 444, and resistors 441 and 442 thus function as a D.C. restoration circuit which establishes a positive level corresponding to the scanning of a portion of the record that is free from indicia.

As the record moves pass the transistor 404, the various dark patterns upon the record cause the amount of light reflected to the transistor 404 to fluctuate. These fluctuations are reflected as negative and positive swings of the potential at the output 410. Since these fluctuations are rapid in comparison with the time constant of the capacitor 444, these fluctuations pass directly to the node 438 where they are applied directly to an inverting input of the operational amplifier 450. Whenever a negative fluctuation, due to a dark indicia upon a record, is sufficiently strong so as to cause the potential at the node 438 to swing negative of the potential at the non-inverting input 452, the output 458 of the amplifier 450 swings to a positive potential and remains there until the potential at the node 438 swings positive once again. To assure a clean output signal at 458, a series circuit comprising a diode 460 and a resistor 462 provide positive feedback from the output 458 back to the input 452 of the amplifier 450 and thus produce a Schmitt-trigger-type of action. The particular darkness of an indicia upon a record which can cause the node 438 to swing negative of the input 452 may be adjusted by adjusting the setting of the variable resistor 418. Hence, the resistor 418 may be adjusted to take into account differences in the characteristics of varying records which are being read and of varying marks which are being read off of the records. The resistor 418 may be adjusted to optimize the ability of the apparatus to distinguish meaningful indicia from noise and other variations in the nature of the records.

The circuitry shown at 400 is generating a first output signal BLK1 which fluctuates in accordance with light and dark indicia presented to the reading head 202 shown in FIG. 2. Similar circuitry is associated with the heads 203, 204, and 205 and results in the generation of signals BLK2, BLK3, and BLK4 corresponding to each of the aforementioned sensing heads. The circuitry 400 in FIG. 4 also generates a TICS/ signal which indicates when a record is opposite the head 202. Similar circuitry may be provided for each of the record sensing heads 203, 204, and 205. In particular, circuitry associated with the head 204 is used to generate an ATICS/ signal which indicates when a record is opposite the head 204. Since heads 203 and 205 are adjacent heads 202 and 204, it is unnecessary to generate corresponding "record present" signals for the heads 203 and 205. Hence, the signal TICS/ is used to indicate when a record is opposite the two heads 202 and 203, and the signal ATICS/ is used to indicate when a record is opposite the heads 204 and 205.

Bar Code Synchronizing Signals.

Figure 5:
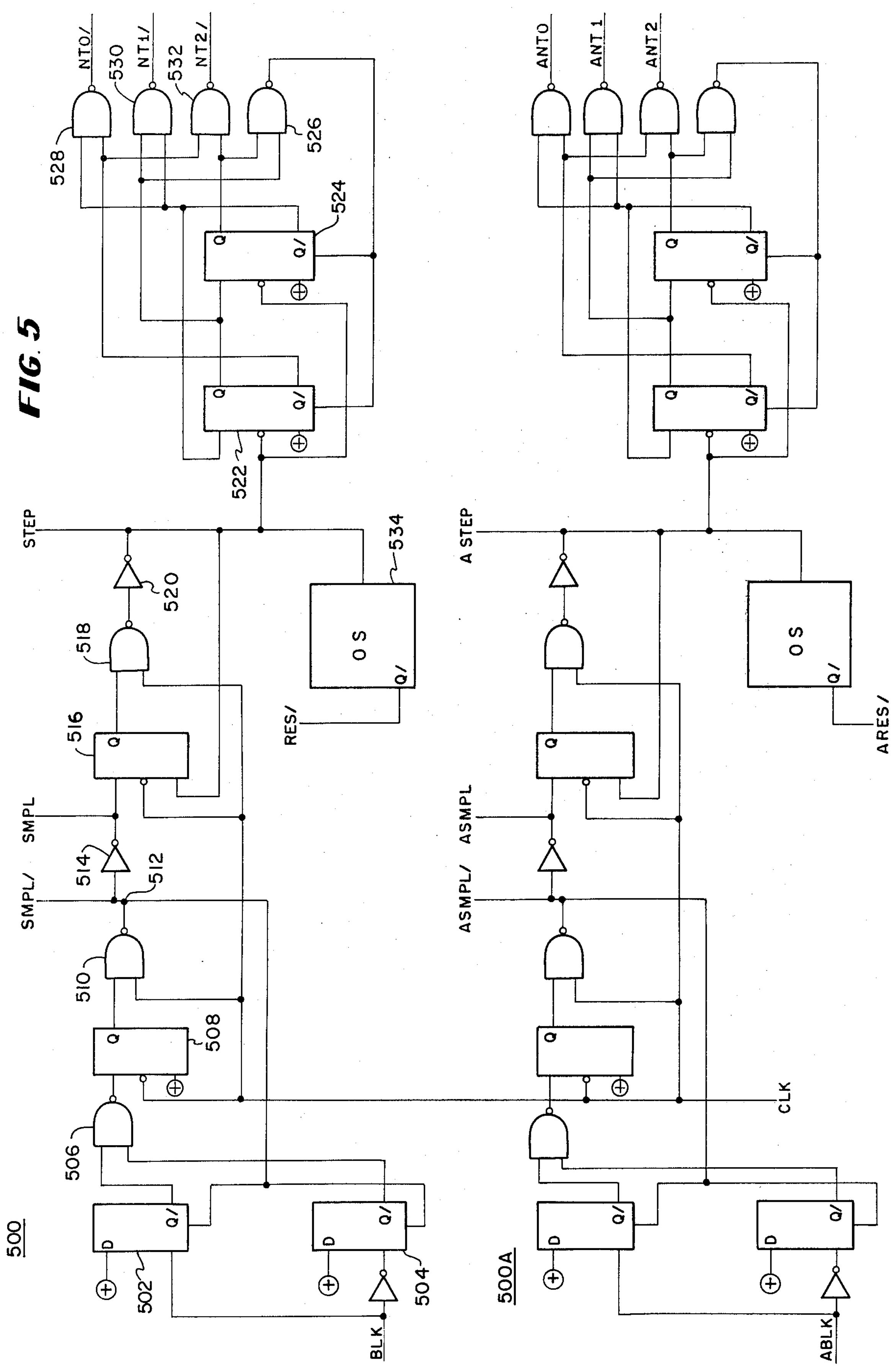
FIG. 5 is a schematic diagram of a control circuit for synchronizing the demodulation of the code representing signals produced by the circuit shown in FIG. 4.

It has just been explained that the indicia upon the printed records is converted into a time-varying electrical signal by the circuitry shown at 400 in FIG. 4. In order to facilitate analysis of the time-varying signal and the extraction of information from the signal, the circuitry 500 and 500A shown in FIG. 5 is provided to generate control signals synchronously with the fluctuation of the signals BLK1, BLK2, BLK3, and BLK4 each of which corresponds to one of the sensing heads. The sensing heads 202 and 203 are positioned at a different location along the path over which the records travel than are the sensing heads 204 and 205. The heads 202 and 203 are spaced far enough from the heads 204 and 205 so that when the heads 202 and 203 begin to read information from a record, the heads 204 and 205 are not yet in service. Similarly, when a record is scanned by the heads 204 and 205, the heads 202 and 203 are typically not in service. Hence, only two bar code synchronizing circuits 500 and 500A are required at any moment in time. Depending upon the position of a given record, circuitry which is to be described at a later point selects two of the signals BLK1, BLK2, BLK3, and BLK4 and routes these two signals to the respective circuits 500 and 500A shown in FIG. 5. These two incoming signals are called the BLK and ABLK signals. Since the circuitry 500 shown in the upper half of FIG. 5 is indentical to the circuitry 500A shown in the lower half of FIG. 5, only the circuitry 500 is described below. The same description is then applicable to the circuitry 500A.

The signal BLK is applied directly to the clock input of a first D flip-flop 502 and in inverted form to the clock input of a second D flip-flop 504. The D inputs to the two flip-flops 502 and 504 are strapped to a positive potential source. Hence, when the BLK signal swings positively, the D flip-flop 502 is set. Similarly, when the BLK signal swings negatively, the D flip-flop 504 is set. The inverted outputs of flip-flops 502 and 504 are both passed through a logic gate 506 to the J input of a JK flip-flop 508 the K input to which is strapped to a positive potential source. High-frequency CLK (clock) pulses are continously supplied to the toggle input of the flip-flop 508. (These CLK clocking pulses are generated by an entirely conventional high-frequency oscillator and are used to control the timing of all logical operations within the system.)

In response to either a positive or a negative fluctuation of the BLK signal, one or the other of the flip-flops 502 or 504 generates a low level inverted output signal which causes the gate 506 to supply high level input signal to the J input of the flip-flop 508. The trailing edge of the next CLK pulse then sets the flip-flop 508, thus enabling a gate 510 to pass a positive CLK pulse to a node 512. The signal at the node 512 is called the SMPL/ (sample) signal pulse, and this signal is inverted by a gate 514 to form a SMPL signal pulse. The SMPL/ signal pulse is fed back to the clear inputs of the two D flip-flops 502 and 504 to reset whichever one of the flip-flops 502 or 504 was set by the recent fluctuation of the BLK signal. Both the inputs to the gate 506 then go positive and force the gate 506 to generate a ground level output signal. The J input to the flip-flop 508 thus is driven to ground potential by the gate 506 and keeps the flip-flop 508 cleared after it is toggled by the trailing edge of the CLK pulse which cleared the flip-flop 502 or 504. When the flip-flop 508 is cleared, the Q output of the flip-flop 508 goes to ground potential and causes the gate 510 to generate a high level output signal, and the SMPL signal pulse is terminated. The SMPL signal pulse thus endures only for the length of a single CLK pulse.

The SMPL signal pulse is applied to the J input of a JK flip-flop 516. Simultaneously, a CLK pulse is applied to the toggle input of the flip-flop 516. The trailing edge of the CLK pulse sets the flip-flop 516 and causes a positive level signal to be presented at the Q output of the flip-flop 516 which enables a gate 518 to pass the next CLK pulse into the STEP signal pulse line through an inverting gate 520. The resulting STEP signal pulse is fed back to the K input of the flip-flop 516 and thus enables the flip-flop 516 to be cleared by the next successive CLK pulse. The STEP pulse has the width of a single CLK pulse.

To summarize briefly, whenever the BLK signal fluctuates either positively or negatively, first an SMPL pulse is generated, and immediately afterwards a STEP pulse is generated.

The STEP pulse is applied to the toggle inputs of a pair of flip-flops 522 and 524. The two flip-flops 522 and 524 are interconnected in semi-shift-register fashion to form a counter, and they are reset by a gate 526 when they pass a binary count of 3. The gates 528, 530, and 532 are arranged to generate output signals corresponding to the three states of the counter which includes the flip-flops 522 and 524. In response to successive STEP pulses, the signals $N_T0/$, $N_T1/$, and $N_T2/$ are sequentially generated, in that order and repeatedly, so long as STEP pulses continue to occur. The details of the three state counter comprising the flip-flops 522 and 524 are apparent in FIG. 5 and need no further explanation. Any equivalent three state counter arrangement may be substituted for that shown.

The STEP signal is also fed to the input of a one-shot 534 and causes the generation of an inverted RES signal which endures for approximately 20 microseconds or so.

Demodulation and Digital Conversion

Figure 6:
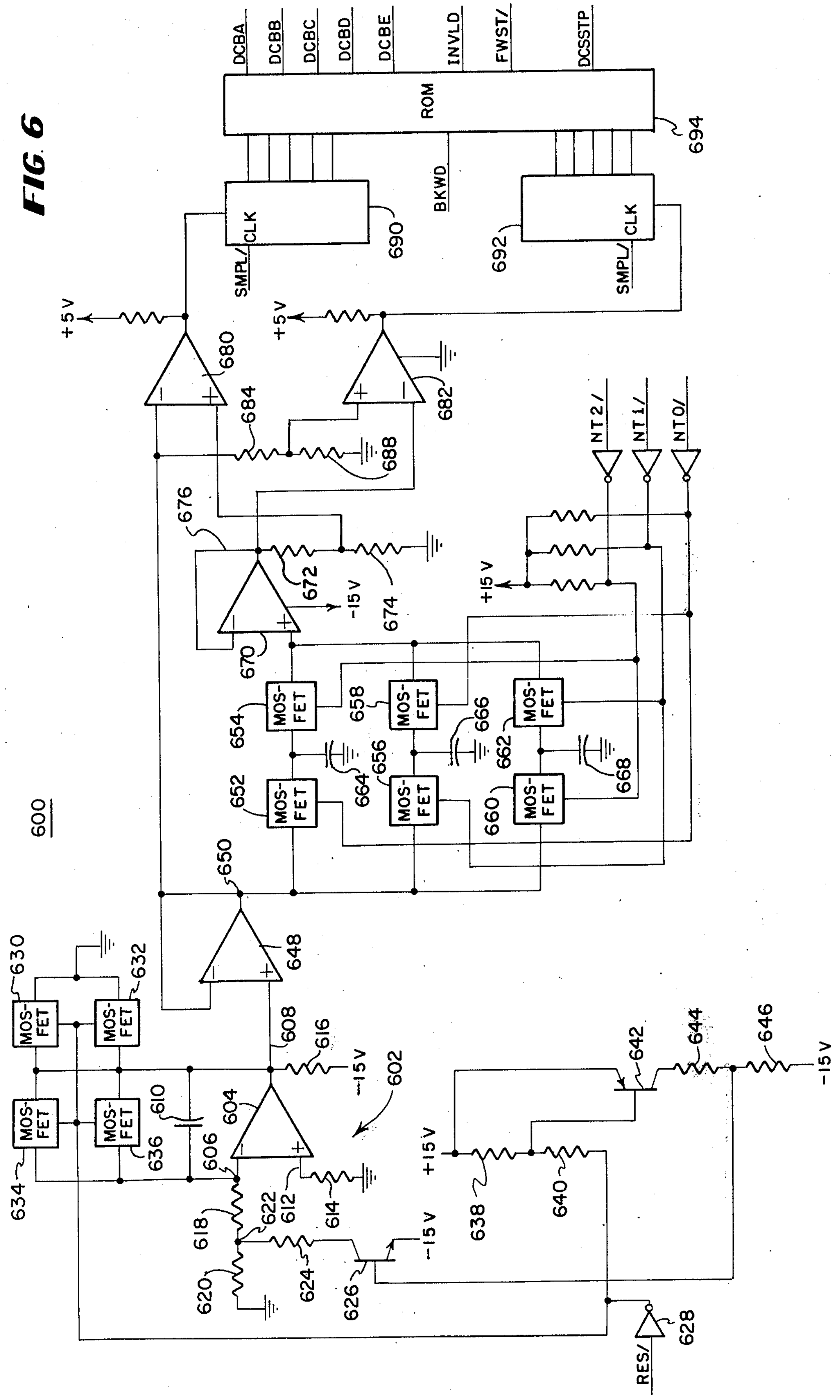
FIG. 6 is a schematic diagram of a bar code demodulator including code detecting means.

With reference to FIG. 5, a 20 microsecond RES/ pulse is generated by the one-shot 534 in response to every reversal of the incoming BLK signal representing a transition from a white area upon a record to a dark area of the same record, or vice-versa. This RES/ pulse is fed to circuitry 600 shown in FIG. 6 which measures the width of each bar and the spacing between adjacent bars on each record. The circuitry 600 also generates digital coding corresponding to the varying width combinations which are encountered. Circuitry identical to that shown at 600 in FIG. 6 is used to preform a similar conversion of the data represented by the ABLK signal that is generated in the lower half of FIG. 5. In this manner, data from two scanning heads is processed simultaneously.

The RES/ signal is used to control the resetting and the timed operation of an integrator which is indicated generally at 602. The integrator 602 includes a high-gain operational amplifier 604 having an inverting input 606 which is connected to the amplifier output 608 by an integrating capacitor 610. A non-inverting input 612 to the amplifier 614 is grounded through a resistor 614, and the amplifier output 608 is connected to a source of −15 volts by a resistor 616. The inverted input 606 to the amplifier 604 is connected to ground by two resistors 618 and 620 which are connected in series with one another. A node 622 that is the junction between the two resistors 618 and 620 is also connected to a source of −15 volts by a series circuit which includes a resistor 624 and a transistor switch 626. When the switch 626 is conductive, current flow through the resistors 624 and 618 flows into the integrating capacitor 610 and causes a steadily increasing potential to appear at the output 608.

When the one-shot 534 (FIG. 5) generates a RES/ pulse, the pulse is inverted by a gate 628 shown in FIG. 6 and is applied as a positive going pulse to a series of four MOS-FET's (metal oxide and semiconductor field-effect transistors). Two of the MOS-FET's 630 and 632 shortcircuit the output 608 of the amplifier 604 to ground, and the remaining two MOS-FET's 634 and 636 discharge the capacitor 610 and thus reset the integrator 602 so that approximately zero volts appears at the output 608.

When the RES/ pulse terminates, the output of the gate 628 goes to ground potential and renders the MOS-FET's 630, 632, 634, and 636 non-conductive. The output of the gate 628 also applies a ground level potential to a pair of resistors 638 and 640 which are connected serially from a source of +15 volts to the output of the gate 628. The potential across the resistor 638 is applied across the base-emmiter junction of a PNP transistor 642 and renders the transistor 642 fully conductive. The emitter and collector of the transistor 642 are connected in series with a pair of resistors 644 and 646 between sources of positive and negative 15 volts. Hence, when the transistor 642 becomes fully conductive, a large potential appears across the resistor 646. The transistor switch 626 is an NPN switching transistor having its base-emitter junction connected across the resistor 646. The transistor 626 becomes fully conductive when the RES/ signal pulse terminates.

The transistor switch 626 causes current from the −15 volt supply to flow through the resistors 624 and 618 to the inverted input 606 of the amplifier 604. This current is integrated by the amplifier 604 from the time when the RES/ pulse terminates until the occurrance of the next RES/ pulse. Hence, a positively swinging sawtooth signal waveform appears at the output 608 of the amplifier 604.

A buffer operational amplifier 648 serves as a unity-voltage-gain current amplifier for the sawtooth waveform and applies the sawtooth waveform to an output 650. The waveform at the output 650 is applied to a non-inverting input of the amplifier 648, and the inverted input of the amplifier 648 is strapped to the amplifier output so as to produce a unity-gain configuration.

It will be recalled that each time the signal BLK fluctuates either positively or negatively to indicate a transition from a light to a dark area or from a dark to a light area of a record a new one of the three signals $N_T0/$, $N_T1/$, and $N_T2/$ is generated by the circuitry shown in FIG. 5. These signals are fed to the circuitry 600 and are used to control a series of MOS-FET switches which appear at the center of FIG. 6.

When the signal $N_T0/$ is present, the MOS-FET's 652 and 658 are rendered conductive so that the output 650 of the integrator 602 is applied to a storage capacitor 664 and so that simultaneously a storage capacitor 666 is connected to the input of a unity-gain buffer amplifier 670 that is identical to the amplifier 648 already described. When the signal $N_T1/$ is present, the MOS-FETs 656 and 662 are rendered conductive so that the output 650 of the integrator 602 is fed into a storage capacitor 666 and so that the storage capacitor 668 is connected to the input of the unity-gain buffer amplifier 670. When the signal NT2/ is present, the MOS-FETs 660 and 654 are rendered conductive so as to couple the output 650 to the storage capacitor 668 and so as to couple the storage capacitor 664 to the buffer amplifier 670.

The circuitry just described stores analog values in the capacitors 664, 666, and 668 corresponding to three successive widths of light and dark areas on a record. Each time that the scanning head associated with the record encounters a transition from light to dark or from dark to light, the RES/ signal resets the integrator 602 and also advances the counter shown in FIG. 5 so as to generate the next sequential signal $N_T0/$, $N_T1/$, or $N_T2/$. The integrator 602 then measures the time interval which endures until the next dark-to-light or light-to-dark transition occurs. The final voltage output of the integrator 602 is applied to one of the storage capacitors in accordance with which of the signals $N_T0/$, $N_T1/$, or $N_T2/$ is being presented at that time. When the next RES/ pulse occurs, the capacitor which has just been charged is disconnected from the integrator 602 and is left with a charge whose magnitude is proportional to the length of the last black or white bar code. The next of the sequential signals $N_T0/$, $N_T1/$, or $N_T2/$ then occurs and connects the integrator output 650 to the next of the storage capacitors. In this manner, the integrator measures the width of the successive black and white strips and stores charge in the capacitors 664, 666, and 668 corresponding to the width of the last three strips measured.

It will be remembered that the SMPL pulse is generated (in FIG. 5) a brief moment before the STEP pulse is generated. The STEP pulse causes the counter shown in FIG. 5 to generate the next $N_T0/$, $N_T1/$, or $N_T2/$ signal in the sequence and also generates the RES/ signal which resets the integrator 602. A brief interval before the STEP pulse occurs, the SMPL pulse is fed to a pair of data storage registers 690 and 692 which are shown in FIG. 6 and loads one bit of data into each of the registers 690 and 692 in accordance with the state of a pair of comparators 680 and 682. When the SMPL/ pulse occurs, the integrator 602 is presenting at the output 650 a potential whose magnitude is proportional to the length of the last dark or light bar which has just been measured by the scanning process. Simultaneously, the amplifier 670 is receiving at its input from one of the storage capacitors a potential whose magnitude is proportional to the duration of the previous dark or light bar that was of the same color (dark or light) as the bar just scanned. Hence, if the bar just scanned is the white strip that separates two adjoining black bars, then the width of this bar is represented by the signal which appears at 650, and the width of the immediately preceeding white strip between two black bars is represented by the potential which is presented by the amplifier 670. On the other hand, if the width of a black bar has just been measured by the integrator 602, then a potential proportional to the width of the black bar appears at 650 and a potential proportional to the width of the immediately preceeding black bar appears at the output of the amplifier 670. The intervening white or black bar is represented by a potential which is stored in a storage capacitor that is not connected to the integrator output 650 or to the input of the amplifier 670.

A potential proportional to the magnitude of the bar just scanned appears at the output 650 and is presented to one input of the comparator 680. A fixed percentage of this potential is applied to one input of the comparator 682 by resistors 684 and 688. Similarly, a potential proportional to the magnitude of the bar previously scanned appears at the amplifier 670 output 676 and is presented by that amplifier to the other input of the comparator 682. A fixed percentage of this potential is presented to the other input of the comparator 680 by the resistors 672 and 674. The magnitudes of the resistors 672, 674, 684, and 688 shown in FIG. 6 are selected so that each of the comparators 680 and 682 is presented with the full magnitude of one signal and with ⅝ of the magnitude of the other signal. In other words, each comparator compares one signal to another signal multiplied by 1.6.

The comparator 680 determines whether the width just measured is less than ⅝ as long as the width previously read and presented to the amplifier 670. If the width just measured is less than ⅝ the length of the width previously read, the comparator 680 generates a high level output and causes a 1 data bit to be loaded into the register 690. The comparator 682 carries out a similar comparison to determine whether or not the width just read is more than 1.6 times the width previously read. If so, the comparator 682 supplies a 1 data bit to the storage register 690. If either test fails, the comparator supplies a 0 data bit to the storage register 692 or 690.

The circuitry just described thus measures the width of adjacent bars and of adjacent spaces on the machine readable record and compares the width of the bar or space most recently read with that of the bar or space just previously read. If the width of a bar or space is less than ⅝ of the width just previously read, then a 1 data bit is placed in the storage register 690, a 0 data bit is placed in the storage register 692 to indicate that the width just read is narrower than the width previously read. If the width most recently read is greater than 1.6 times the length of the record previously read, then a 1 data bit is placed in the register 692 and a 0 data bit is placed in the storage register 690 to indicate that the width just read is wider than that previously read. If the width just read is less than 1.6 times but greater than ⅝ times the width previously read, then 0 data bits are placed in both the registers 690 and 692, and the bars are arbitrarily assumed to be of the same width.

After each dark or light portion of the record is scanned, the SMPL/ pulse loads data bits into the registers 690 and 692. The RES/ pulse which immediately follows resets the integrator 602 and causes the generation of the next signal of the set $N_T0/$, $N_T1/$, and $N_T2/$. In this manner, a record of the comparative widths of dark and light patches on the record is created and is stored within the two registers 690 and 692.

The registers 690 and 692 are each shift registers having a five bit storage capacity and having parallel data outputs. The ten data leads extending from the two shift registers 690 and 692 are fed to the address terminals of a read only memory 694. Thus, an output at the output terminals of the read only memory 694 may be generated corresponding to each different possible combination of bits stored in the two registers 690 and 692. Assuming that the read only memory 694 has a capacity to store eight data bits in each storage location, eight output bits may be obtained from the read only memory 694 in response to each combination of input bits. The upper five output bits DCBA...DCBE form a five bit character code which represents a decoding of the data (if any) that has just been scanned on a record card. If the coding represents an improper character, then the read only memory supplies an INVLD signal bit output. If a start or a stop character is detected, the read only memory 694 supplies a DCSSTP (decode start or stop) signal bit and also supplies a FWST/ (forward start) signal bit that is low for a start character and high for a stop character and that determines in which direction the scanning of a record is progressing — from front to back, or from back to front. A description of a related encoding and decoding arrangement is set forth in application Ser. No. 239,168.

Channel Selection Circuitry

In connection with the discussion of FIGS. 2 and 4, it was noted that a circuit 400 is used in conjunction with each of the four record scanning heads 202, 203, 204 and 205. It was further noted that each of these circuits 400 generates an output signal which signals are called BLK1, BLK2, BLK3, and BLK4. One of the circuits 400 associated with one of the adjacent scanning heads 202 and 203 generates a signal TICS/ which indicates when a record is opposite the two heads 202 and 203. Similar circuitry associated with one of the two heads 204 and 205 generates a corresponding signal ATICS/ signal to indicate when a record is adjacent the two heads 204 and 205.

It has been noted previously that a record may be read by the heads 202 and 203 or by the heads 204 and 205 but that a record is usually not read by all four of the heads simultaneously. Hence, of the four signals BLK1, BLK2, BLK3, and BLK4, only the two signals from the heads which are actually in use are analyzed by the circuitry shown in FIGS. 5 and 6. The circuitry 700 (FIG. 7) singles out two of the signals BLK1, BLK2, BLK3, and BLK4 for presentation for circuitry shown in FIG. 5 over the BLK and ABLK signal lines.

Figure 7:
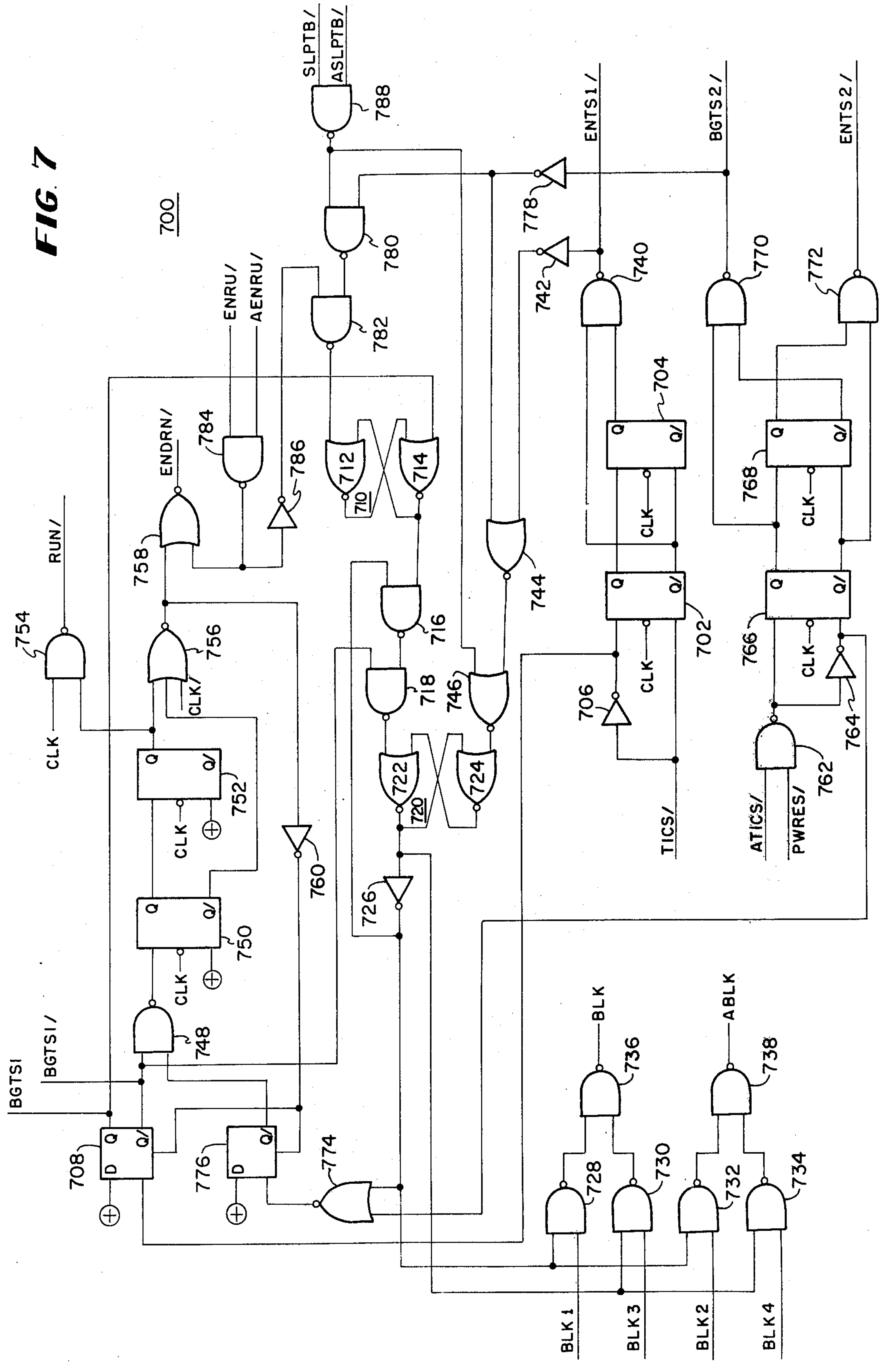
FIG. 7 is a schematic diagram of a circuit for controlling the switching between the various heads in the different sensing stations of the batch reader.

With reference to FIG. 7, the signals BLK1, BLK2, BLK3, and BLK4 are fed into the respective gates 728, 732, 730, and 734. A bistable (or simple flip-flop) 720, which is constructed by cross-connecting the inputs and outputs of a pair of NOR gates 722 and 724, determines which two of the four gates 728, 730, 732, and 734 are permitted to pass their respective input signals into the BLK and ABLK signal lines. When the bistable 720 is in a first state, a positive level signal at the output of the gate 722 enables the two gates 730 and 734 to pass the signal BLK3 through the two gates 730 and 736 the BLK signal line and to pass the signal BLK4 through the gates 734 and 738 to the ABLK signal line. An inverter 726 simultaneously generates a low-level signal which disables the two gates 728 and 732, thus preventing the BLK1 and BLK2 signals from flowing into the BLK and ABLK signal lines. When the bistable 720 is in a second state, the gates 728 and 732 are enabled to pass their respective input signals BLK1 and BLK2, and the gates 730 and 734 block their respective input signals. In this manner, the state of the bistable 720 determines which two of the four signals BLK1, BLK2, BLK3, and BLK4 are selected for presentation to the circuitry shown in FIG. 5.

When no record is opposite any of the record scanning heads, the two signals TICS/ and ATICS/ are both positive. All of the flip-flops 702, 704, 766, and 768 shown at the bottom of FIG. 7 are in their cleared or reset state generating low-level Q output signals in response to the high level TICS/ and ATICS/ incoming signals. The four flip-flops 708, 776, 750, and 752 shown in the upper right hand corner of FIG. 7 are also initially in the cleared states generating positive level Q/ output signals and ground level Q output signals. The bistable device 720, which controls which of the scanning head signals is transferred to the circuitry shown in FIG. 5, may be assumed to be initially in a state such that the output of the gate 722 is high, so that the BLK3 and BLK4 signals associated with the pair of heads that generate the ATICS/ signal are allowed to pass through their respective pair of gates 730-736 and 734-738 to the BLK and the ABLK signal lines. The circuitry 700 is thus initially adjusted to pass signals from heads 204 and 205 to the circuitry shown in FIG. 5. Another bistable 710, which is constructed by cross-connecting inputs and outputs of a pair of gates 712 and 714, may be assumed to be initially in a state such that the gate 714 is generating a ground level output signal, thus forcing a gate 716 to supply a positive signal to one input of a gate 718. The other input to the gate 718 receives a positive level input from the Q/ output of the flip-flop 708, and hence the gate 718 initially generates a ground level output signal which does not set the bistable 720.

Assume now that a record passes opposite the scanning heads 202 and 203 shown in FIG. 1 and thus causes the TICS/ signal to go to ground. This ground level signal is inverted by a gate 706 and is applied as a positive level signal to the toggle input of the D flip-flop 708 to set the flip-flop 708. The Q/ output of the flip-flop 708 goes to ground potential and forces the output of the gate 718 to go positive, thus reversing the state of the bistable 720 so that now the BLK1 signal is channelled into the BLK signal line and the BLK2 signal is channelled into the ABLK signal line. In this way, information from heads 202 and 203 are fed to the circuitry shown in FIG. 5.

A positive level signal appears at the Q output of the flip-flop 708 and sets the bistable 710 (if it was not already set) so that the gate 714 is definitely generating a ground level output signal which, as already noted, forces the gate 716 to supply a continuously positive level signal to one input of the gate 718.

The ground level TICS/ signal is applied directly to the K input of a JK flip-flop 702 and is applied as a positive level signal to the J input of the flip-flop 702. The flip-flop 702 toggles into a set state in response to the trailing edge of the next CLK pulse and generates a positive level Q output signal. Since the outputs of the flip-flop 702 are applied directly to J and K inputs the flip-flop 704, the next successive CLK pulse sets the flip-flop 704. The two flip-flops 702 and 704 remain in a set state until the termination of the TICS/ signal, as will be explained below. No pulses pass through the gate 740 at this time.

When the flip-flop 708 is set by the leading edge of the TICS/ signal, the Q/ output of the flip-flop 708 causes a gate 748 to supply a high level signal to the J input of a JK flip-flop 750. The next CLK pulse that occurs toggles the flip-flop 750 into a set state. The Q/ output of the flip-flop 750 goes to ground potential and supplies a ground level signal to one input of a gate 756. Another input receiving a ground level input from the Q output of the flip-flop 752 at this time, and the remaining input to the gate 756 is receiving a positive level CLK/ signal pulse. The flip-flop 708 is now set and is generating a high level BGTS1 signal pulse and a ground level BGTS1/ signal pulse.

When the CLK signal once again goes high, the CLK/ signal goes to ground and forces the gate 756 to generate a positive output signal pulse. This positive output signal pulse is inverted by a gate 760 and is applied as a ground level clearing signal to the clear inputs of the two flip-flops 708 and 776. Hence, the flip-flop 708 is cleared and ceases to generate a BGTS1 signal pulse. The high level output of the gate 756 also flows through the gate 758 and becomes an ENDRN/ signal which is used to clear the decoding logic described below for the decoding of the newly encountered record.

When the CLK signal again falls to a ground potential, the CLK/ signal goes high and causes the output of the gate 756 to go to ground so that the ENDRN/ signal is terminated. The positive-to-ground transition of the CLK signal toggles the flip-flop 752 and causes a positive potential to appear at the Q output of the flip-flop 752. This positive potential enables a gate 754 to pass the next successive CLK pulse to a RUN/ signal line. This same positive-to-ground CLK pulse transition clears the flip-flop 750, and the next positive-to-ground CLK pulse transition clears the flip-flop 752 and prevents the generation of a second RUN/ pulse.

To briefly summarize the action that has just occurred, in response to an incoming ground level TICS/-signal caused by a record passing before the heads 202 and 203, both of the bistables 710 and 720 are set and the information signals BLK1 and BLK2 from the scanning heads 202 and 203 are channelled to the circuitry shown in FIG. 5 over the BLK and the ABLK signal lines. A momentary BGTS1 pulse is generated by the flip-flop 708, and immediately following the termination of this pulse an ENDRN/ pulse is generated. The ENDRN/ pulse is followed immediately by an RUN/ pulse. These three pulses carry out functions which are explained below.

The system then proceeds to analyze the data which is recovered by the scanner heads 202 and 203 to determine whether the data from either of the scanning heads represents a valid bar code printed on one side or the other side of a record. If the data does represent a valid bar code, then either a signal SLPTB/ or a signal ASLPTB/ is returned to FIG. 7 and is applied to an input of a gate 788. The output of the gate 788 goes high in response to either of these signals and disables a gate 746, thus preventing either the termination of the TICS/ signal or the onset of the ATICS/ signal from resetting the bistable 720 so long as the SLPTB/ or ASLPTB/ signal remains present. Hence, the good data signals SLPTB/ and ASLPTB/ lock the circuitry shown in FIG. 7 so that the BLK3 and BLK4 signals from the scanning heads 204 and 205 continue to be disregarded. The positive output of the gate 788 also enables a gate 780 to pass a pulse which appears at the output of a gate 778 at the onset of the ATICS/ signal (this signal is generated when a record passes opposite the heads 204 and 205) through the two gates 780 and 782 to an input of the bistable 710 so as to clear the bistable 710 in response to the occurrence of the ATICS/ signal prior to the termination of the SLPTB/ or ASLPTB/ signals. The bistable 710 then locks the bistable 720 until the leading edge of the next record is opposite the heads 202 and 203, as is explained below.

When the TICS/ signal terminates, it signifies that a record has passed beyond the two heads 202 and 203. The termination of TICS/ signal causes the two flip-flops 702 and 704 to successively toggle into their cleared states synchronously with the two successive CLK pulses. After the flip-flop 702 has cleared and prior to the time when the flip-flop 704 becomes cleared, high level output signals from the two flip-flops cause the gate 740 to generate a ground level ENTS1/ signal which indicates the end of the record scan by the heads 202 and 203. This signal normally passes through the gates 742, 744, and 746 and resets the bistable 720 back to its initial state.

When a record passes opposite heads 204 and 205, the ATICS/ signal is generated and goes to ground potential. The signal passes through a gate 762 and another gate 764 and is applied as a positive level signal to the J input of the flip-flop 766 and as a ground level signal to the K input of the 766. The next two CLK pulses set the flip-flops 766 and 768 sequentially. During that time when the flip-flop 766 is set but prior to the time when the flip-flop 768 is set, the two flip-flops supply positive level signals to a gate 770 which cause the gate 770 to generate a ground level BGTS2/ signal pulse which signals the onset of the ATICS/ signal. This BGTS2/ signal pulse normally passes through the gates 778, 744, and 746 and sets the bistable 720 so as to connect the signal BLK 3 to the BLK signal line and the signal BLK4 to the ABLK signal line. It is noteworthy that this function occurs whether or not the TICS/ signal has been terminated, and hence the two sensing heads 204 and 205 may begin to read a record prior to when the record has completely passed by the sensing heads 202 and 203. However, if one of the heads 202 or 203 has encountered a proper bar code, then one of the signals SLPTB or ASLPTB normally forces a rerouting of the BGTS2/ pulse through the two gates 780 and 782 to the clear input of bistable 710, as has been explained. Hence, the onset of the ATICS/ signal cannot reset the bistable 720 if one of the heads 202 or 203 is actually in the process of reading a valid bar code from a record.

If the onset of the ATICS/ signal is successful in resetting the bistable 720, then a positive level output signal from the bistable 720 is inverted by the gate 726 and is applied as a ground level potential to one input of a gate 774, thus enabling the gate 774 to pass any signal applied to its other input. The ground level ATICS/ signal then passes directly through the gates 762, 764, and 774 and is applied to the toggle input of a D flip-flop 776 as a positive going level. This positive going level toggles the flip-flop 776 into a set state and causes the generation of a low-level Q/ output signal by the flip-flop 776. The low level Q/ signal passes through the gate 748 and is applied as a positive level to the J input of the flip-flop 750. In the manner already explained, the flip-flops 750 and 752 first clear the flip-flop 776, then generate an ENDRN/ pulse to reset the system logic, and finally generate a RUN/ pulse to initiate a search for good data on the record which is now being scanned by the heads 204 and 205.

After the record has been completely scanned by the heads 204 and 205, the ATICS/ pulse goes positive once again, and the two flip-flops 766 and 768 toggle back into their cleared states in synchronism with two successive CLK pulses. During the brief time interval when the flip-flop 766 is cleared and the flip-flop 768 is still set, the two flip-flops supply positive level signals to both inputs of a gate 772 and cause the gate 772 to generate an ENTS2/ pulse to signal the termination of the ATICS/ signal.

The purpose of the bistable 710 is to lock the bistable 720 under certain circumstances. The bistable 710 is normally set by a BGTS1 pulse which occurs synchronously with the onset of the TICS/ signal when a record passes the first pair of scanning heads. The bistable 710 then presents a ground level signal to one input of the gate 716 and thus forces the gate 716 to continuously present a high level signal to the gate 718. This high level signal, along with the normally high level output of the flip-flop 708, combine to force the gate 718 to continuously generate a low level output signal which does not toggle the bistable 720 except when the leading edge of a record passes the first pair of heads. If one of the end of run signals ENRU/ or AENRU/ occurs, or if the BGTS2/ pulse (which signals that a record is passing by the second set of scanning heads) occurs when either SLPTB/ or the ASLPTB/ good data signals are present (indicating that good data is being read by the first pair of heads), then the bistable 710 is returned to its cleared state and presents a positive level signal to one input of the gate 716. Assuming that the bistable 720 is still transferring signals from the first set of record scanning heads to the circuitry shown in FIG. 5, a high level output of the inverting gate 726 is fed back into the gate 716. Hence, the gate 716 now presents a ground level signal to the gate 718 and forces the output of the gate 718 to go positive. This positive level signal is fed to the gate 722 within the bistable 720 and locks up the bistable 720, thus preventing it from being toggled by either the termination of the TICS/ signal or by the onset of the ATICS/ signal. The bistable 710 then continues to lock up the bistable 720 until the next record passes the first set of heads, at which time another BGTS1 pulse again sets the bistables 710 and 720. In this manner, the end of run signal ENRU/ or AENRU/ during a scan by the first pair of heads prevents any data from being collected by the second set of scanning heads, and the occurence of the good data signals SLPTB/ and ASLPTB/ during a scan by the first set of heads prevents any scanning from being initiated by the second set of scanning heads.

Character Recognition Control Logic

For each one of the two heads which are scanning a record at any given moment, there exists control logic circuitry 800 and 900 (shown in FIGS. 8 and 9) which control the analysis of the light to dark transitions carried by the record, which determine whether or not those transitions represent data, and which determine whether or not the data is valid. The circuitry shown at 800 and 900 interconnects with the circuitry 500 shown in the upper half of FIG. 5. It is to be understood that circuitry identical to the circuitry at 800 and 900 is also provided in the preferred embodiment of the invention to interconnect with the circuitry 500A shown in the lower half of FIG. 5.

The overall process of searching a record for coded information is controlled by a central control circuit which is shown entirely at 800. The control circuitry 800 consist basically of three JK flip-flops 802, 804, and 806 which are set and cleared by a variety of control signals which enter the circuitry 800 from the left-hand side of the figure. The output signals generated by the flip-flops 802, 804, and 806 are fed into a conventional 3-to-7 decoder circuit 808 which generates a unique output signal for each possible combination of the three input signals from the flip-flops 802, 804, and 806. In the normal operation of the batch record reader, these output signals are generated in a particular order. In the table that follows, the output signals are listed in the precise order in which they occur when good data is encountered upon a record. The three-digit binary number opposite each signal name indicates the state of the three flip-flops 802, 804, and 806. The most significant digit of the binary number represents the state of the flip-flop 802, the middle digit of the binary number represents the state of the flip-flop 804, and the least significant digit of the binary number represents the state of the flip-flop 806:

| Signal Name | Corresponding Binary Code |
|---|---|
| RESET/ | $000_2$ |
| ENA/ | $100_2$ |
| CNT/ | $110_2$ |
| SERCH/ | $010_2$ |
| STRT/ | $011_2$ |
| 1VALC/ | $111_2$ |
| GO/ | $101_2$ |
| GDRD/ | $001_2$ |

Initially, all of the flip-flops 802, 804, and 806 are cleared and the decoding logic 808 generates the output signal RESET/ indicating that the system is in an idle condition awaiting the next record. When the leading edge of a record card passes the scanning head that is associated with the circuitry 800 at any moment, the logic shown in FIG. 7 first generates the ENDRN/ signal to clear the flip-flops 802, 804, and 806 if they are not already cleared. The signal ENDRN passes through the gates 810, 814, and 816, and 812 so as to enable the flip-flops 802, 804, and 806 to be cleared by the coincident CLK pulse.

An RUN/ pulse is then generated by the circuitry 700. The RUN/ pulse, together with the RESET/ signal generated by the decoder 808, combine to enable a gate 818 to generate a SEN1 signal which passes through gates 820 and 822 and enables the coincident CLK pulse which occurs to set the flip-flop 802 so that the code $100_2$ is presented to the decoding logic 808. The decoding logic 808 responds by generating the ENA/ output signal which enables the scanning of the record to commence.

With reference to FIG. 9, a counter 906 is provided within the circuitry 900 to count the light-to-dark and the dark-to-light transitions which occur on each record card. Since each character of a proper code is made up of four black bars and three light spaces between the four black bars, each character code involves a scanning of four transitions from light to dark and four transitions from dark to light for a total of eight transitions. The counter 906 counts these transitions to determine when all the transitions for a single character have been scanned. The SMPL signal supplies a pulse to the counter 906 with each transition, as was explained in connection with the description of FIG. 5. Assuming that the counter 906 is set to zero count initially when the first light-to-dark transition is encountered, the counter 906 reaches a binary count of 7 or $111_2$ on the transition from light to dark that occurs as the scanning proceeds over the last bar in a given character code. Hence, during the time interval when the last bar in a given character code is scanned, the counter 906 presents a full count to an output gate 908 and causes the gate 908 to generate a low level output signal. This signal normally passes through the gate 910 and is strobed through a gate 912 by the occurrence of a SMPL pulse synchronously with the final dark-to-light transition as the scanning proceeds from the last bar in a given character code to the light area separating that character code from the next. Hence, a MSPL/ pulse is developed at the output of the gate 912 when the scanning of a given character is finished. A flip-flop 914 and a set of gates 916 and 918 respond to the MSPL/ pulse by generating a TFCH pulse which is spaced in time from the MSPL/ pulse by one CLK timing interval.

Referring once again to FIG. 8, the control logic 800 initially generates an RESET/ signal when a record first passes opposite the scanning head associated with the circuitry 800. This RESET/ signal is fed through a gate 904 and initially clears the counter 906 to zero count. When the RUN/ signal is generated by the logic 700, the conbined RUN/ and RESET/ signals cause the gate 818 to generate a SEN1 pulse which passes through the gates 902 and 904 and also resets the counter 906 to zero count. As has been explained, the SEN1 pulse additionally causes the control logic 800 to terminate the generation of the RESET/ signal and to commence generating the ENA/ signal. The ENA/ signal enables a search to commence for the first light-to-dark transition on the record card.

When the first light-to-dark transition is encountered, a SMPL signal is generated by the logic 500 in a manner that has already been explained. This SMPL signal advances the counter 906 to a count of one. The inverted SMPL/ signal combines with the ENA/ signal generated by the decoder 808 to cause a gate 828 to supply a high level signal to the J input of a flip-flop 804. The coincident CLK pulse sets the flip-flop 804 so that the three flip-flops 802, 804, and 806 present a code of $110_2$ to the decoder 808. In response to this input code the decoder 808 terminates the ENA/ signal and commences generating a CNT/ (count) signal.

The counter 906 now counts the successive transitions from light-to-dark and from dark-to-light. After sufficient transitions have been counted so that a bar code character could conceivably have been read, the counter reaches a count of seven and enables the next SMPL pulse to flow over the MSPL/ signal line, through a gate 836 which is enabled by the CNT/ signal and through gates 812 and 842 to the K input of the flip-flop 802. The coincident CLK pulse clears the flip-flop 802 and causes the code $010_2$ to be presented to the decoder 808. The decoder 808 responds by generating the SERCH/ (search for start/stop character) signal.

The SERCH/ signal passes through the gate 904 and locks the counter 906 in a clear state. This signal also forces the gate 910 to continuously supply a positive level signal to the gate 912 so that every SMPL pulse appears on the MSPL/ signal line. In this manner, the logic 800 and 900 checks after every light-to-dark or dark-to-light transition to see if a complete start or stop character has been received.

When a start or stop control character is encountered and the corresponding data is stored in the shift registers 690 and 692, the read only memory 694 generates a DCSSTP output signal indicating that a start or a stop character has been encountered. The read only memory 694 also generates an FWST/ signal to indicate whether the character is a start code, indicating that the data is being read off a record in a forward direction, or a stop code, indicating that the data is being read off a record in the reverse direction.

The DCSSTP signal is strobed through a gate 936 (FIG. 9) by the TFCH/ signal to form a DCSTP (decode start and stop) pulse. Hence, a DCSTP pulse occurs every time that a valid start or stop code is encountered. Since the MSPL/ pulse is generated following every SMPL pulse during this mode of operation, a TFCH pulse is also generated following every SMPL pulse but somewhat delayed in time with respect to each MSPL/ pulse. As soon as a DCSTP pulse occurs, it passes through a gate 826 which is enabled by the SERCH/ signal and becomes a DCSTR pulse which enables the flip-flop 806 to be set by the coincident CLK pulse. The flip-flops 802, 804, and 806 then present the code $011_2$ to the decoding logic 808 and cause the decoding logic 808 to terminate the SERCH/ signal and to commence generating an STRT/ (start or stop code encountered) signal. The logic in FIG. 8 thus acknowledges the fact that a valid start or stop control character has been encountered upon a record.

During the SERCH/ mode of operation, the SERCH/ signal is fed into a gate 930 along with the FWST/ signal that is generated by the read only memory 694 and that is low or high in accordance with whether a record is being read in the forward or reverse direction. If a start code is encountered upon a record indicating that a record is being read in the forward direction, then the gate 930 is fully enabled to supply a positive level to the J input of a flip-flop 934. A DCSTR pulse generated by the gate 826 at this time strobes the flip-flop 934 and causes the generation of a BKWD/ signal to indicate that data is being read forwards. This BKWD/ signal is fed back into the read only memory 694, since the significance of the data read from the shift registers 690 and 692 differs in dependence upon whether the data is being read in the forward or in the backward direction (except for start and stop codes, as has been noted).

The criterion for finding an intelligable code upon a record is to find a valid start or stop code followed by two valid characters. The mechanism for finding a valid start or stop code has already been described. During the STRT (start) mode of operation of the control logic 800, a search is carried out for a first valid character. If one is found, the logic 800 generates a 1VALC/ signal (one valid character found signal) to indicate that a first valid character has been found. If a second valid character is then encountered, the control logic 800 generates a GO/ signal to indicate that both a start or stop character and two valid characters have been found and it is time to begin transferring the incoming data into the buffer 232 prior to transfer of the data to the system tape deck 214 or output.

When the SERCH signal mode of operation terminates, the SERCH/ signal goes positive and permits the counter 906 to begin counting from zero count. The gate 910 is also permitted to respond only to output signals from the gate 908 so that the MSPL/ and TFCH signals are generated only following every eighth transition from light-to-dark and from dark-to-light. Hence, during the STRT/, 1VALC/, and the GO/ modes of system operation, the MSPL/ and TFCH pulses are generated only after a complete character has been scanned on a record. This is to be distinguished from the mode of operation when the SERCH signal is present and when an MSPL/ and a TFCH pulse is generated folowing every light-to-dark and dark-to-light transition. During SERCH operations, the control logic does not know which transition corresponds to the end of a character code. Hence, a check for a valid character must be made after every transition.

During STRT/, 1VAL/ and GO/ modes of operation, whether a valid character code has been received or not is determined by the output signals from the read only memory 694. When the memory 694 encounters an invalid character code, it generates a INVLD output signal. When the memory 694 encounters a start or stop code, it generates a DCSSTP output signal. If these two signals are absent, then their absence allows a gate 824 to pass a TFCH pulse which is generated by the gate 918 following the scanning of each character code. Hence, a VALCH/ pulse appears at the output of the gate 824 following the scanning of each valid character code.

Immediately following the recognition of a start or stop character, the control logic 800 terminates the SERCH/ signal and begins to generate the STRT/ signal. When a first valid character is encountered, a VALCH/ pulse combines with the STRT/ signal to cause an output signal to flow from a logic gate 832 and through the logic gates 820 and 822 to the J input of the flip-flop 802. The coincident CLK pulse sets the flip-flop 802 and causes the three flip-flops in the control logic 800 to supply the code $111_2$ to the decoding logic 808. In response to this input code, the decoding logic 808 generates the output signal 1VALC/ to signify that a first valid character code has been encountered following a start or stop character code. In a similar manner, when a second valid character is encountered following a start or stop character code, a VALCH/ pulse combines with the ground level 1VALC/ signal to cause an output signal to flow from a gate 830 through the gates 814 and 816 to the K input of the flip-flop 804 so that the flip-flop 804 is cleared by a coincident pulse. The three flip-flops in the control logic 800 then present the code $101_2$ to the decoder logic 808 and thus cause the decoding logic 808 to generate the GO/ output signal. The GO/ output signal initiates the transfer of data from the input logic of the system to the buffer 232 in which data is stored prior to its transfer to the tape deck 214 or other permanent storage device.

If the preferred embodiment of the invention encounters a valid start or stop code that is not followed by two valid character codes, then the control logic 800 assumes that what looked like a valid start or stop code was, in fact, merely random printed indicia upon the record. In this case, the control logic 800 returns to the enable mode such that the ENA/ signal is generated, and then returns to the search mode with the SERCH/ signal generated as soon as the next light-to-dark or dark-to-light transition is encountered upon the record.

After a start or stop code plus two valid characters have been recognized, if an invalid character or an improperly positioned start or stop code is encountered, the control logic 800 assumes that it has located intelligent data on the record but that the data is either erroneous or has been improperly read. In this case, the control logic 800 returns to the reset state and generates the RESET/ signal. The logic 800 is then unable to respond to any further data upon that record and does not respond until the next record passes before the scanning head, as is indicated by the next occurrence of the RUN/ signal. Hence, once the initial criterion (a control character followed by two valid characters) is satisfied, if any errors are found upon a record, the record is rejected in total and no further attempt is made to read that record. If the criterion is not satisfied, then the control logic continues to check the record in an attempt to find a valid bar code at some other location upon the record.

An invalid character is identified by an INVCH signal which is generated by a gate 952. During those time intervals when the decoder 808 is generating the STRT/ signal or the 1VALC/ signal and is searching for a first or second valid character, a gate 940 enables a gate 944 to channel the output of a gate 942 through the gates 948, 950, and 952 to the INVCH signal line. The INVCH signal thus appears when the output of the gate 942 goes high. The gate 952 is strobed only after a complete character has been scanned by the TFCH/ pulse, and the INVCH signal cannot appear at any other time.

The gate 942 receives as input signals the DCSSTP/ signal generated by the read only memory 694 whenever a start or stop code is encountered, and also the INVLD signal which is generated by the read only memory 694 whenever an invalid character code is encountered. The INVLD signal is inverted by passage through a gate 938, so that both of these signals are applied to the gate 942 in inverted form. Hence, either the occurrence of an invalid character code or the occurrence of a start or stop character code can cause the output of the gate 942 to go high and cause the generation of the INVCH signal in synchronism with the next occurrence of the TFCH/ pulse. If the signal INVCH occurs during a time when the STRT/ signal is present, those two signals combine and cause a gate 834 to generate a SEN2 output signal which passes through gates 820 and 822 and causes the coincident CLK pulse to set a flip-flop 802. Simultaneously, the INVCH/ signal alone passes through a gate 810 and clears the flip-flop 806, and also passes through gates 814 and 816 and clears the flip-flop 804. The flip-flops 802, 804, and 806 then present the binary number $100_2$ to the decoding logic 808 which responds by generating the ENA/ signal output. The SEN2 signal pulse generated by the gate 834 also passes through the gates 902 and 904 and resets the counter 906 to zero count.

If the INVCH signal occurs when the 1VALC/ signal is generated by the decoder 808, the INVCH signal clears the flip-flops 804 and 806, as already explianed, but does not need to set the flip-flop 802, since that flip-flop has already been set by the simultaneous occurrence of the STRT/ and the VALCH/ signals. Once again, the decoder logic is forced to generate the ENA/ signal in response to the occurrence of the INVCH signal pulse at this time. Hence, if the second or third character in a decoded message is either invalid or a start or stop code, the logic 800 returns to its enabled state and recommences the search for a valid initial start of stop character code.

After the first start or stop character and the first two valid characters have been recognized by the control logic 800, the gate 940 disables the gate 944 from passing the output signal from the gate 942. The GO/ signal generated by the decoder 808 enables a gate 946 to pass a BDCH/ (bad character) output from the gate 938 through the gates 950 and 952 to the INVCH signal line when the gate 952 is strobed by the TFCH/ pulse at the end of the scanning of each character. The BDCH/ signal occurs when the read only memory 694 signals that an invalid character has occurred that is not a valid start or stop code character. The INVLD (invalid character) signal from the read only memory 694 is applied to one input of the gate 938. The other input to the gate 938 is normally enabled by a high level DCSSTP/ signal when a start or stop character is not detected by the read only memory 694. When a start of stop character is detected by the read only memory 694, the DCSSTP/ signal goes to ground and prevents the gate 938 from generating the BDCH/ signal. In this manner, the INVCH signal responds only to bad characters and no longer responds to the occurrence of a valid start or stop code so long as the GO/ signal is present.

If an invalid character is encountered at a time when the GO/ signal is present, the INVCH signal occurs and passes through the gates 838, 840, 812 and 842 to clear the flip-flop 802 in synchronism with the coincident CLK pulses. Simultaneously, the INVCH signal clears the flip-flops 804 and 806 in the manner which has already been explained. Hence, all three of the flip-flops 802, 804, and 806 are cleared by the occurrence of a bad character after the initial three characters on a record have been successfully scanned. The three flip-flops present the code $000_2$ to the decoder 808 and thus force the decoder 808 to generate the RESET/ signal. This RESET/ signal may only be terminated by the occurrence of an RUN/ pulse when the next record passes before the scanning head. Hence, the occurrence of a bad character on a record anywhere past the first three character positions causes the entire record to be rejected by the logic 800 and locks up the logic 800 until the next successive record passes before the scanning head.

The last character in a valid record is either a start or a stop code, depending upon the direction in which the record is scanned. In response to a valid start or stop code character, the read only memory 694 generates the DCSSTP/ signal. This signal is strobed through a gate 936 by a TFCH/ pulse that occurs after the start or stop character is scanned and is applied to the DCSTP signal line. Because the GO/ signal is enabling the gate 840, the resulting DCSTP pulse passes through the gates 838, 840, 812, and 842 and causes the coincident CLK pulse to clear the flip-flop 802. The flip-flops 802, 804, and 806 then present the code $001_2$ to the decoder logic 808 and cause the logic 808 to generate a GDRD/ (good read) signal to signify that an entire message has been read from a record without any errors having been encountered. The GDRD/ signal continues to be generated until the next record passes opposite the scanning heads and causes the generation of the ENDRN/ reset signal which places the control logic 800 back into its RESET/ state ready to scan another record.

In order to synchronize the transfer of data out of the read only memory 694, it is desirable to have a pulse signal which goes high when either a valid character or a start or stop control character is encountered. Such a signal is generated by the gate 920 and is called a DTSTR signal. The gate 920 has as inputs the VALCH (valid character) pulse that is generated by the gate 824 and also the DCSTP/ (decode start and stop code) pulse that is generated by the gate 936. The DTSTR signal pulse occurs in synchronism with the TFCH pulse generated by the gate 918.

Prebuffer and Prebuffer Control Logic

With reference to FIG. 2, each of the two system channels includes a prebuffer 226 and 228. A detailed logic diagram of the prebuffer 226 is indicated by the reference numeral 1000 in FIG. 10 and in the lower half of FIG. 11. The prebuffer 1000 is a typical prebuffer designed for use in either of the two channels, and it is understood that an identical prebuffer 228 is also used in conjunction with the other channel.

Since the criterion for detecting a valid bar code is the discovery of a start or stop character followed by two valid character codes, it is necessary for the prebuffer 1000 to have the capacity to store three character codes. These three characters are stored inn three parallel input and output data storage registers 1002, 1004, and 1006. The data output signals from the read only memory 694, together with the BKWD (forward or backward) signal from the flip-flop 934 which indicates whether data is being presented in a forward or reverse direction, are all presented to the parallel inputs of the storage register 1002. The parallel data outputs of the register 1002 connect to the inputs of the register 1004, and the outputs of the register 1004 connect to the inputs of the register 1006. The labeled signal outputs of the register 1006 are fed to the channel selector 230, the details of which are shown at 1100 in the upper portion of FIG. 11. The three data storage registers 1002, 1004, and 1006 each has a data transfer terminal, and all of the data transfer terminals are connected together to the Q output of a flip-flop 1010.

The occurrence of a valid character code or of a valid control character is signalled by the DTSTR/ pulse generated by the gate 926 shown in FIG. 9. This pulse toggles a first flip-flop 1008 which enables the next successive CLK pulse to toggle the flip-flop 1010 and to cause whatever data is presented by the read only memory 694 to be loaded into the first storage register 1002. In the case of the first character code encountered, this is a control character and it is stored in the register 1002. The Q/ output of the flip-flop 1010 clears the flip-flop 1008. The Q output of the flip-flop 1010 attempts to enable the flip-flop 1012 to be toggled by the next successive CLK pulse. However, the flip-flop 1012 is locked in its cleared state by an SLTPB signal that is generated by a cleared flip-flop 1016.

When a valid character is detected after the detection of a control character, another DTSTR/ pulse loads the valid character into the storage register 1002 and transfers the start or stop control character into the register 1004. In a similar manner, a second valid character is then normally transferred into the register 1002 by the next occurrence of a DTSTR/ pulse, and at the same time the first valid character is transferred into the register 1004 and the start or stop control character is transferred into the register 1006 where it is presented to the channel selector 230.

If a start or stop character and two valid characters are successfully loaded into the registers 1002, 1004, and 1006, the control logic 800 generates the GO signal to signal that data may now be transferred into the buffer 232. The GO signal toggles the flip-flop 1016 into a set state so that the flip-flop 1012 is released and is allowed to generate a CKEC pulse immediately following each strobing of the data registers 1002, 1004, and 1006 by the flip-flip 1010 in response to DTSTR/ pulses. The inverted output of the flip-flop 1012 enables a gate 1014 to pass a CLK pulse to an DPTB data line which feeds into the channel selector 230 along with the data output of the register 1006. A pulse on the DPTB data line signals the buffer 232 that a data item is ready to be loaded into the buffer 232. Hence, the release of the flip-flops 1012 and 1016 by the GO signal automatically initiates the transfer of data out of the register 1006 and into the buffer 232, starting with the start or stop control character.

The circuitry just described then continues to transfer data out of the read only memory 694, through the three registers 1002, 1004, and 1006, and into the buffer 232 through the channel selector 230. Each time another character is scanned, a DTSTR pulse causes the flip-flop 1010 to load that character into the register 1002 and to shift the other characters stored in the three registers forward. The flip-flop 1012 then causes the gate 1014 to then generate a DPTB pulse which causes the character now in the register 1006 to be loaded into the buffer 232.

If an invalid character is detected during these operations, the GO signal terminates prior to the clearing of a flip-flop 1018 that was initially set by the GO signal. The absence of the GO signal and the inverted output of the flip-flop 1018 then permit a CLK/ pulse to pass through gates 1020 and 1022 to an ICRJ (incorrect-reject) signal line to signal the occurrence of an error. The resulting ICRJ signal then causes the buffer 232 to reject all of the data which it has previously stored and to await the presentation of data from some other record. The gate 1022 is common to both channels of the apparatus and receives from the prebuffer 228 an ACHER signal that corresponds to the signal CHER which flows from the gate 1020.

If no errors are encountered on the record which is being read, the data presentation process is terminated when a final start or stop control character is encountered on the record. At this time, the control circuitry 800 terminates the GO signal and generates a GDRD/ (good read) signal to signify that a record has been read successfully without any errors having been encountered. This GDRD/ signal passes through gates 1026 and 1024 and clears the flip-flop 1018 at the same time that the GO signal terminates and thus prevents the generation of an ICRJ error signal.

At this point in time, the character stored in the register 1006 has already been transferred into the buffer 232, but two characters are stored in the registers 1002 and 1004. It is desirable to present these last two additional characters to the buffer 232 for storage. The GDRD/signal therefore passes through the gate 1026 and sets a flip-flop 1030. The flip-flop 1030 enables a gate 1032 to pass a DPTB pulse from the gate 1014 through a inverting amplifier 1034 to a J input of a flip-flop 1036. (It will be remembered that the DPTB pulse occurs to signal the buffer 232 that data is ready in the register 1006 and thus occurs when the buffer is to retrieve a character code from the register 1006.) The coincident CLK pulse toggles the flip-flop 1036 into a set state. A positive level Q output from the flip-flop 1036 then enables the next successive CLK pulse to pass through a gate 1038, set a pair of D flip-flops 1108 and 1110, and clear the flip-flop 1030. This same CLK pulse clears the flip-flop 1036 and thus terminates all output signals at the output of the gate 1038. At this point in time, a flip-flop 1106 has just been cleared by the Q/ output of the flip-flop 1010 when the final start or stop character was loaded into the register 1002. The flip-flop 1106 now generates a ground level Q output signal.

The buffer 232 sets the flip-flop 1106 after it has successfully retrieved a character code from the register 1006 and is ready for the reception of another character code. More specifically, a signal WAIT generated by the buffer 232 toggles the flip-flop 1106 so that the flip-flop 1106 generates a positive Q output signal.

At all previous times when data from the record was being transferred to the buffer 232 by the circuit 1000, prior to the onset of the GDRD/ signal, the Q output of the flip-flop 1110 was at ground potential and prevented any high level output of the flip-flop 1106 from passing through a gate 1112. Hence, the flip-flop 1106 and the gate 1112 had no effect upon the operation of the circuitry 1000 prior to the onset of the GDRD/ signal. However, the flip-flops 1108 and 1110 were set following the onset of the GDRD/ signal. Hence, the gate 1112 is now partially enabled by a high level Q output signal that is supplied by the flip-flop 1110. When the buffer 232 returns the WAIT signal to request another input character, the positive output from the flip-flop 1106 passes through the gate 1112 and is fed as a ground level signal into the preset input of the flip-flop 1008. This PRE signal immediately causes the flip-flop 1010 to shift the character codes forward within the registers 1002, 1004, and 1006 and to clear both of the flip-flops 1008 and 1106. The flip-flop 1012 then causes the gate 1014 to generate another DPTB signal to tell the buffer 232 that a character code is ready to be transferred to the buffer 232.

A CKEC pulse generated by the flip-flop 1012 at this time toggles the set flip-flop 1108 into its cleared state but does not toggle the set flip-flop 1110. The buffer 232 retrieves from the register 1006 the character that previously resided in the register 1004. Since the flip-flop 1110 still remains set after the above operation, the entire procedure just described is automatically repeated again. When the buffer 232 again returns a WAIT signal to indicate that it is ready for another data item, the flip-flop 1106 once again causes the gate 1112 to preset the flip-flop 1008 which in turn causes the flip-flop 1010 to advance the start or stop character code forward from the register 1004 into the register 1006. The flip-flop 1010 then clears the flip-flops 1008 and 1106 and enables the flip-flop 1012 to generate a second CKEC output pulse. This second CKEC pulse toggles and clears the flip-flop 1110 and thus terminates the positive Q enabling signal which the flip-flop 1110 previously supplied to the gate 1112. The flip-flop 1012 also permits the gate 1014 to generate one final DPTB pulse which signals to the buffer 232 that the last character code is ready within the register 1006.

After retrieving this last character code, the buffer 232 again returns the WAIT signal to the flip-flop 1106, but this time the positive level Q output signal of the flip-flop 1106 cannot pass through the gate 1112 because the alternate input to the gate 1112 is held at ground potential by the flip-flop 1110. Hence, the circuitry 1000 terminates its operation until the next DTSTR/ pulse is received in connection with the reading of some other record.

After a record has been successfully read, the logic 1000 generates a DMPB signal which is fed through the channel selector 230 to the buffer 232 to initiate a transfer of the data from the buffer 232 to the tape deck 214 or other output device. The DMPB signal is generated by a gate 1118. In order for the signal DMPB to appear at the output of the gate 1118, the gate 1118 must receive a ground level GDCMP/ (good compare) signal from the character number control 210 signifying that the proper number of characters were found within the message, and also a ground level DHTS signal signifying that the header-trailer criterion established by the header-trailer test control 234 has been satisfied. The final ground level input to the gate 1118 comes from a gate 1116. In order for the DMPB signal to be generated, all of the inputs to the gate 1116 must be positive.

A first input to the gate 1116 comes from the flip-flop 1106 and goes positive when the flip-flop 1106 is set by the WAIT signal which is returned by the buffer 232. In this manner, the DMPB signal is prevented from commencing until after the buffer 232 has completed the process of acepting the final character code from the register 1006. A second input to the gate 1116 comes from the inverted output of the flip-flop 1110 and goes high only after the final two character codes have been presented to the buffer 232. A third input to the gate 1116 flows from a gate 1040 when the GDRD/ signal is present and when the flip-flop 1030 has been reset. This input goes positive after all but the last two character codes have been transferred to the buffer 232. The fourth input to the gate 1116 is then strobed by the CLK signal.

In response to either an error condition indicated by the CHER signal generated by the gate 1020, or to a ground level signal at the output of the gate 1116 indicating that the data from a record has been completely fed into the buffer 232, the gates 1120, 1122, and 1124 generate an ENRU (end of run) signal. A similar AENRU signal is generated by the corresponding prebuffer 228 in the other channel. These two signals are fed back through the gates 784, 786, and 782 to set the bistable 710 and to prevent the reading of data from the alternate set of scanning heads, with the assumption being made that the record just scanned was picked up by one of the first pair of scanning heads.

After the current record has completely passed both scanning stations, the ENTS2 signal is generated by the gate 772 to indicate the termination of the scanning process. This signal passes through the gate 1042 and becomes a PENRUR/ signal which clears the flip-flop 1016 and causes that flip-flop to disable the flip-flop 1012 during the beginning of the next record scan.

Circuitry which is described at a later point in this description is reset or returned to its standby state by a WCRS/ signal pulse which is generated by a flip-flop 1114 and gate 1126 one clock pulse after the J input to the flip-flop 1114 is enabled by an incoming signal. The source of this incoming signal during the scanning of records is the RUN signal line. As each new record is scanned, a RUN signal pulse passes through the gates 1048 and 1050 and causes a WCRS/ pulse to be generated. When the data is entered through the system keyboard, a RDER signal (from FIG. 20) enables a CLER (clear last entry) signal to pass through the gates 1044, 1046, 1048, and 1050 and to produce a WCRS pulse. This CLER signal enables one at the keyboard to erase an erroneous entry from the buffer 232 by depressing a CLEAR key, as is explained at a later point. Also during deyboard operations, an ENDMP signal generated after data is transferred from the buffer 232 to the tape deck 214 passes through the gates 1044, 1046, 1048, and 1050 and causes a WCRS/ pulse to clear all the stored data from the buffer 232.

The Channel Selector

The channel selector 230 is indicated at 1100 in FIG. 11 in block diagram form. The channel selector consists of a first array of input selection gates 1102 and a second set of input selection gates 1104. Each of the selection gate arrays accepts at its left-hand edge two sets of incoming signals and supplies to its right-hand edge one of the two sets of incoming signals in dependence upon the state of a controlling signal that is fed into the gate array from the bottom. The details of these data selection gates are conventional and are not disclosed in the figure. Briefly described, the gates are constructed by feeding each of the incoming signals into an individual AND-type gates half of which connect to the controlling signal directly, and half of which are connected through an inverting gate to the controlling signal so that only half of the AND gates are enabled to pass their respective incoming signals at any given moment. OR-type gates are then used to combine the output signals supplied by corresponding pairs of these AND-type gates, and the OR-type gates provide the selection gate output signals.

The selection gate array 1102 determines whether data is selected from the prebuffer 228 or from the prebuffer 226, both of which are shown in FIG. 1. The selection gate inputs from the prebuffer 226 include the data signals DFBA, DFBB, DFBC, DFBD, DFBE, and DFBBKWD which are presented at the output of the register 1006. The DPTB "data ready" control signal generated by the gate 1014 and the DMPB "transfer data to tape" control signal generated by the gate 1118 are also fed into the selector 1102 as input signals from the prebuffer 226. The remaining signals entering the selecter 1102 from the left are corresponding signals generated by the prebuffer 228.

The signal ASLTPB, generated by the flip-flop within the prebuffer 228 that corresponds to the flip-flop 1016 in the prebuffer 226, controls which of the two sets of prebuffer input signals is selected by the selection gate array 1102. This, in turn, is determined by which of the two active scanning heads is receiving good data. Hence, the selection gate array 1102 automatically selects the data presented by the prebuffer which is actually receiving good data from a record and presents this data to one input of the selection gate array 1104.

The selection gate array 1104 is identical to the selection gate array 1102 and chooses between input data presented by the selection gate array 1102 and input data which is generated by the keyboard circuitry shown in FIG. 20. The output signals of the selection gate array 1104 are fed directly to the buffer 232. The output of the selection gate array 1104 includes five data conveying signal lines DTBA-DTBE, a BKWD signal with indicates whether the data is in normal or reverse order, a DATP control signal which indicates when the buffer 232 is to accept data from the signal lines DTBA-DTBE, and a DUMP control signal which signals to the buffer 232 that data is to be transferred from the buffer 232 to the tape deck 214.

Prior to the occurrence of the GO signal in the control logic for either channel, the channel selector 1100 supplies the output signals from the prebuffer 226 to the buffer 232. When good data is discovered by one channel or the other, the prebuffer connects whichever channel has encountered good data to the buffer 232 under the control of the ASLTPB signal generated by a flip-flop in the prebuffer 228 that corresponds to the flip-flop 1016 in the prebuffer 226. A short time interval later, either a DPTB pulse from the gate 1014 in the prebuffer 226 or an ADPTB pulse from a corresponding gate in the prebuffer 228 passes through the channel selector 1100 to the DATP signal line and signals to the buffer 232 that a character code is being presented to the buffer 232 through the channel selector 1100.

Header-Trailer Control Circuit 234

The header-trailer control circuit 234 (FIGS. 15-17) receives the input data to the buffer and buffer control circuit 232 and operates to determine whether each batch or group of tickets is preceded by a header ticket or record 184 and followed by a trailer ticket or record 184. As noted above, the header ticket includes a start code followed by five characters 8, whereas the trailer card includes a start character and five successive characters 9. However, because of the nature of the control circuitry 200 for the batch reader 180, each ticket 184 must include a start code and a stop code. The circuit 234 is so arranged that the trailer card is recognized by detection of its start code in conjunction with the five characters 9. In addition, the arrangement of the header-trailer control circuit 234 is such as to permit keyboard controlled entry of data from the keyboard unit 212 that complies with the required header and trailer format control.

Referring now more specifically to FIG. 15 of the drawings, therein is illustrated a group of inverters 1502 supplied with input signals DTBA-DTBE. These signals comprise the input signals supplied by the channel selector 230 to the buffer and buffer control circuit 232. These signals in their inverted form are designated in FIGS. 15-17 as the signals A/-E/. In this manner, the header-trailer control circuit 234 is provided with data derived either from the prebuffers 226, 228 or the keyboard unit 212 in parallel with the supply of this information to the buffer 232.

The use of these signals in the control circuit 234 is controlled by a pair of strobe signals STR1/ and STR2/. These two signals are generated under the control of a data present signal DATP which appears incident to the presentation of each character code to the buffer 232. The circuit for generating the strobe signals STR1/ and STR2/ includes a D flip-flop 1534, a JK flip-flop 1540, and a pair of NAND gates 1542 and 1544 which are sequenced by the system clock signal CLK.

In certain instances in the control circuit 234 the inverted signal RDER representing the fact that the circuit 200 is conditioned for reader operation will appear as the signal KEY as developed by an inverter 1602.

When the system is started and the first ticket 184 reaches the first sensing station defined by the heads 202-203 with the circuit 200 conditioned for reader operation, the signals RDER and BGTS1 are both positive to enable a NAND gate 1600 so that the low level output therefrom is effective through a NAND gate 1608 to provide a signal SIG1. This signal is applied to one input of a NAND gate 1720, the other input of which is provided with a more positive signal from a flip-flop 1714 which was reset by the reset signal PWRES/. Thus, the gate 1720 is fully enabled and its low level output signal is effective through a NAND gate 1724 to set a D flip-flop 1726. The more positive output from the Q terminal of this flip-flop partially enables a pair of NAND gates 1730 and 1732. This positive signal also supplies the signal DHTS which demands a header ticket 184.

The first item presented by the record 184 passing along the feed path from either of the two sensing stations should be a start code, if the ticket 184 is being read in a forward direction. If the ticket 184 is being read in a reverse direction, one of the digits "8" will be first presented. Assuming that the start code is the first item provided, the indicated inputs to a NOR gate 1514 all drop to a low level to provide the signal STRT. On the strobe signal STR1 the NAND gate 1528 is fully enabled to set a D flip-flop 1530. The output from the Q terminal of this flip-flop partially enables a pair of NAND gates 1532 and 1534.

Assuming that a correct header record 184 is being sent, the next digit of information supplied is the code for the character 8, and all of the inputs to a NAND gate 1504 are enabled so that the output of this gate drops to a low level and is effective through an inverter 1506 to provide the header signal HEDR. This signal is supplied to a serial input of a five bit shift register 1510, and a binary 1 is shifted into this shift register by the strobe signal STR2. When the first 1 is shifted into the shift register 1510, the Q output terminal of the first stage supplies a more positive signal to the clock input of a D flip-flop 1508 to set this flip-flop. When four additional codes representing the character 8 have been received, the first binary 1 shifted into the shift register 1510 reaches its last stage, and the true output therefrom provides a more positive signal to complete the enabling of the NAND gate 1532. This provides the low level signal HDRO/ representing the receipt of a proper header card by the system.

In the event that digits other than the proper digits 8 of the header identification are received by the control circuit 234, the components described above are cleared and the signal HDRO/ cannot be generated. This control is primarily exercised by a strobed NOR gate 1518, the strobe input of which is connected to the output of a NAND gate 1520. One input to the NAND gate 1520 is the strobe signal STR1/. Accordingly, the inputs to the gate 1518 are examined as each character is transferred through the control circuit 234.

One input to the gate 1518 is the signal SIG2 which is generated at the end of a ticket and when the keyboard unit 212 enters either a clear or a stop. Another input to the gate 1518 is the output of a NOR gate 1516. This gate is provided with the signal HEDR representing the presence of 8's, the signal STRT representing a start condition, and a signal TRLR which is described below and represents the presence of 9. Accordingly, if any signal received is not a header, a start, or a trailer signal, the NOR gate 1516 applies a more positive potential to the connected input of the gate 1518.

The other two inputs to the gate 1518 represent intermixed digits 8 or 9. More specifically, when the flip-flop 1508 is set to apply a more positive potential to the connected input of the NOr gate 1512, the signal TRLR/ connected to the other input will become negative on the appearance of a 9. Since 8's and 9's cannot be intermixed in a proper header code, the gate 1512 will supply a high level input to the gate 1518. The remaining input to the gate 1518 receives a more positive signal from a NOR gate 1558. This gate and a connected D flip-flop 1556 perform the same function for the digit 9 that the components 1508 and 1512 perform for the digit 8. Thus, the appearance of a digit 8 represented by the signal HEDR/ at one input of the gate 1558 after the receipt of an initial digit 9 will cause the output of the gate 1558 to go high.

When the gate 1520 strobes the gate 1518, the presence of any positive input to this gate results in a low level output which is effective through a NAND gate 1522 to apply a more positive potential to one input of a JK flip-flop 1524. On the following clock signal CLK, the flip-flop 1524 is reset, and a connected NAND gate 1526 is fully enabled on the next clock pulse to develop a reset signal HTCR/. This signal resets the shift register 1510 and the flip-flop 1508. The resetting of the flip-flop 1510 prevents the enabling of the gate 1532 and thus the generation of the signal HDRO/. The signal HTCR/ also clears or resets the flip-flop 1530 controlling the other input to the gate 1532.

In the description above, it is assumed that the header card is read in the forward direction so that the start appears prior to the series of digits 8. The circuit performs in the same manner, but in an inverted order, if the record 184 is read in a reverse direction so that the five digits 8 precede the start code.

Assuming that the signal HDRO/ is generated indicating the successful reception of a header card, this signal is applied to one input of a NAND gate 1710 to drive the output of this gate more positive. This more positive signal is effective through a NOr gate 1712 to set the flip-flop 1714. This flip-flop keeps track of the sequence of header and trailer cards. When the flip-flop 1714 is set, it indicates the reception of a header and the expected reception of the following trailer. When the flip-flop 1714 is reset, it represents the receipt of a trailer record and the anticipation of the next receipt of a header record. The setting of the flip-flop 1714 inhibits one input to a connected NOR gate 1716, another input of which is supplied with the signal HDRO/. The positive-going signal at the output of the gate 1710 also sets a pair of D flip-flops 1704 and 1734.

When the flip-flop 1734 is set, a more positive potential is applied to the input of a JK flip-flop 1736 so that this flip-flop is set on the next clock signal. The Q/terminal of the set flip-flop 1736 drops to a low level to reset the flip-flop 1734 as well as the flip-flop 1726. The resetting of the flip-flop 1726 terminates the header demand signal DHTS and also removes the partial enabling for the gates 1730 and 1732.

On the next clock pulse, the flip-flop 1736 is reset to terminate the clearing signals referred to above, and a flip-flop 1738 is set. When the flip-flop 1738 is set, a signal HTSB/ becomes more negative to sample the signals applied to the other inputs of the NOR gate 1716 and a NOR gate 1718. Since a header card in correct sequence was sensed, neither gate 1716 nor gate 1718 provides a more positive output which is an indication of an error in the header-trailer sequence.

The signal HTSB/ is also returned to one input of the NAND gate 1522. When the signal HTSB/ drops to a low level, the gate 1522 together with the flip-flop 1524 and the NAND gate 1526 clear the components described above by the generation of the signal HTCR/. This prepares these components for searching for the trailer card. On the next clock pulse, the flip-flop 1738 is reset so that the signal HTSB/ rises to a more positive level.

As noted above, the flip-flop 1704 is also set concurrent with the setting of the flip-flop 1734. When the flip-flop 1704 is set, its Q/output drops to a low level to partially enable the gate 1706. The other input to this gate is supplied with the signal ICRJ/ described above. This signal is provided whenever a bad code is encountered. Thus, if a bad code is encountered after a record containing the header information, the output of the NOR gate 1706 rises to a more positive level which is applied to one input of a NOR gate 1722. The application of a more positive signal to any of the inputs to the NOR gate 1722 indicates a header-trailer control failure.

Thus, the more positive signal supplied by the gate 1706 to the gate 1722 drives the output of this gate to a more negative level which is effective through the upper input to the gate 1724 to set the flip-flop 1726 to return the demand for a header record because the prior test for a header record resulted in a failure. The low level signal at the output of the gate 1722 also primes an error flip-flop 1742 to a set condition so that a more positive signal is supplied to one input of a NAND gate 1732. The other input to this gate is enabled by the set flip-flop 1726, and the remaining input to this gate 1732 is enabled by the signal SIG2 which is generated under the conditions described above. Accordingly, when the end of the ticket 184 is reached, the signal SIG2 becomes more positive, and the gate 1732 is fully enabled.

When this gate becomes fully enabled, a signal TGHT/ is generated. This signal performs the following functions among others. This signal is effective through an inverter 1700 and a NOR gate 1702 to reset the flip-flop 1704. It also clocks the flip-flop 1742 to a reset state to disable the gate 1732. In addition, the output from the inverter 1700 is effective through the NOR gate 1712 to toggle the flip-flop 1714 back to a set condition so that the circuit 234 is conditioned to expect a header record as the next valid record.

Assuming that the ticket reading operation proceeds correctly following the receipt of a header record or ticket 184 and that the end of the group of tickets is reached so that a trailer card including five consecutive digits 9 and a start code is supplied into the feed path of the batch reader 180, when the start code on the trailer ticket is detected, the flip-flop 1530 is set in the manner described above. A NAND gate 1550 with the indicated inputs detects the presence of a digit 9 and provides a more negative signal TRLR/ which is effective through an inverter 1552 to load a first binary 1 in a five bit shift register 1554. This signal is entered using the strobe signal STR2/. When a binary 1 is loaded into the first stage of the shift register 1554, the true output of the first stage clocks the D flip-flop 1556 to set this flip-flop and apply an enabling potential to one input of the NOR gate 1558. If four successive following digits 9 are received, the output of the fifth or last stage in the shift register 1554 completes the enabling of the NAND gate 1534 so that a more negative trailer present signal TLRO/ is generated. In the event that spurious data is encountered, the strobed NOR gate 1518 restores the system in the manner described above.

When the signal TLRO appears, it is also effective through the gate 1710 and the NOR gate 1712 to toggle the flip-flop 1714 from its set state to its reset state. The signal TLRO/ also sets the flip-flop 1704 and 1734. The flip-flops 1736 and 1738 are set and reset in sequence under the control of the flip-flop 1734 to provide the same functions described above including the sampling of the inputs to the gates 1716 and 1718. Since a trailer card appears in the proper sequence, no error signals are generated. The flip-flop 1738 provides a resetting signal HTSB/ which performs the same functions described above in conjunction with the description of the receipt of the header card, except that the flip-flop 1726 is not reset inasmuch as it was not set by the signal SIG1 when the presence of the trailer card in the feed path was detected. This is true because the set flip-flop 1714 inhibited the upper input to the gate 1720. The signal TLRO/ is terminated when the signal HTSB/ generates the reset signal HTCR/.

With regard to detecting error conditions in the header-trailer sequence, the function is primarily carried out by the gates 1716 and 1718 under the control of the status of the toggling flip-flop 1714. If, for example, the flip-flop 1714 has been set in anticipation that a header card would be received and, in fact, a trailer card represented by the signal TLRO/ is received, the flip-flop 1714 enables the upper input to the gate 1718, and the signal TLRO/ enables the lower input to the gate 1718. When the signal HTSB/ drops to a low level, the NOR gate 1718 is fully enabled, and a more positive output is generated which is applied to one input of the gate 1722. This produces the resetting and error indicating signals described above in conjunction with the control of the gate 1722 by the gate 1706. Alternatively, if the flip-flop 1714 has just been reset in anticipation that the next signal to be received would be a trailer signal and the signal HDRO/ representing a header is supplied, the signal HTSB/ completes the enabling of the gate 1716 to provide a more positive input to the NOR gate 1722. This also produces the resetting and error indicating functions described above.

Further, if the flip-flop 1726 is set in the manner described above on the leading edge of a record expected to be a header and the flip-flop 1726 is not reset by the receipt of a header ticket or record, as indicated by the presence of the reset signal from the Q/ terminal of the flip-flop 1736, the flip-flop 1726 remains set when the trailing edge of the record is reached. As set forth above, the signal SIG2 becomes positive on the trailing edge of the record, and a gate 1730 is fully enabled. This provides the signal HTOS/. As set forth above in the description of the mechanism control circuit 300, the presence of the signal HTOS/ stops the batch ticket reader 180.

The trailer control circuit 234 also exercises a constraint on the entry of data through the keyboard unit 212. When the ticket reader 180 is conditioned for the entry of information from the keyboard unit 212, the signal KEY is more positive and partially enables a gate 1606. Another input to this gate is enabled from the Q/ terminal of a JK flip-flop 1604. Thus, when the first signal DATP appears indicating a first item of data from the keyboard appearing at the output of the channel selector 230, the gate 1606 is fully enabled and is effective through an inverter 1610 to apply a more positive potential to the J terminal of a JK flip-flop 1612. Thus, the next following clock signal sets both the flip-flop 1604 and the flip-flop 1612. When the gate 1606 is enabled, it is also effective through the gate 1608 to provide the signal SIG1 for setting the flip-flop 1726 in the manner described above. This signal is terminated by the setting of the flip-flop 1604 which remains set during successive clock signals CLK because both inputs to this flip-flop remain at a low level.

The next following clock signal resets the flip-flop 1612. However, preceding this resetting a NOR gate 1614 having one input coupled to the Q/terminal fo the flip-flop 1612 and its other input supplied with the signal CLK/provides a single clock pulse to one input of each of a pair of NAND gates 1616 and 1622. Another set of inputs to the gates 1616 and 1622 is provided by the signal DHTS which is generated by the prior setting of the flip-flop 1726 described above. A third input to the gate 1616 is the signal STRT/, and the third input to the gate 1622 is STRT. Thus, if a header card is provided, the start signal STRT is provided, and the gate 1622 is fully enabled by the clock signal provided from the NOR gate 1614. The output of the gate 1622 is effective through the inverter 1624 to set a flip-flop 1626 on the next following clock signal CLK. When the flip-flop 1626 is set, its lower level Q/ output provides one inhibit to a NAND gate 1628. This gate is subsequently used through an inverter 1630 to provide a signal RECDO which is used to control the recording in the tape deck 214 of data originating from the keyboard unit 212. Thus, the inhibit provided by the flip-flop 1626 is temporary and exists only until such time as data is to be recorded. It should be noted that the lower input to the gate 1628 is provided by the signal DHTS/ which is negative until such time as the presence of a proper header condition has been detected inasmuch as this signal originates from the Q/ terminal of the flip-flop 1726 which is set by the first data pulse appearing from the keyboard in the manner described above.

If, on the other hand, a start signal is not detected as the first entry from the keyboard, the signal STRT/ complete the enabling of the gate 1616, and the output of this gate is effective through an inverter 1618 to set the flip-flop 1620. When this flip-flop is set, its Q/ output applies an inhibit to the gate 1628. This inhibit, however, cannot be removed when the end of the keyboard data entry is reached because the flip-flop 1620 is reset only when the master reset signal WCRS is supplied to its K input terminal. Thus, the failure to detect a start code on entering the keyboard entry prevents the transfer of data from the keyboard unit 212 to the tape deck 214.

The remaining detection of the header entry provided by the keyboard unit 212 takes place in substantially the same manner as described above. However, when the entry from the keyboard unit 212 is terminated by the actuation of a stop key providing a stop code, this code is detected by a gate 1546, and this gate is effective through an inverter 1548 to provide a stop signal STP. This signal together with the keyboard signal KEY and the strobe signal STR2 completes the enabling of a NAND gate 1634 providing a low level output which is effective through a NAND gate 1636 and an inverter 1640 to drive the output of a NAND gate 1642 to a more positive level. This signal is the signal SIG2. This signal can also be generated when the keyboard unit 212 is effective by a NAND gate 1632 whenever the main reset signal WCRS is present. The signal SIG2 is also generated by a NAND gate 1638 when the reader 180 is in a reader mode, as represented by a signal RDER, and at the end of the sensing of a ticket 184 at the second sensing station by the signal ENTS2.

The signal SIG2 resets the flip-flop 1626 on the next following clock signal CLK to remove an inhibit from the gate 1628. This signal SIG2 is also effective on this same clock signal CLK to reset the flip-flop 1604 in preparation for a subsequent data entry from the keyboard unit.

When the operator wishes to record the data in the buffer 232 provided by the keyboard unit 212, a record key in the keyboard unit 212 is actuated to provide the signal RECD. This completes the enabling of the gate 1628 so that the inverter 1630 provides the signal RECDO. This signal is described above dumps the information from the buffer 232 into the tape deck 214.

The header-trailer control cicuit 234 also includes means for resetting the controls shown on FIG. 17 in the event that bad data is provided from the keyboard unit 212 following the receipt of a correct header designation. This function is performed by the NOR gate 1708. The flip-flop 1704 is set by the header signal HDRO/, as described above. If the system is conditioned for keyboard operation, the signal RDER is at a low level enabling a second input to the gate 1708. If the operator discovers an incorrect data entry, observing the visual display controlled by the keyboard unit 212, a clear key is operated to provide a signal CLER/. This completes the enabling of the gate 1708 so that its more positive output is effective through a NOR gate 1740 to reset the error condition flip-flop 1742. This flip-flop is also reset by the signal SIG1 through the NOR gate 1740 on the leading edge of each ticket.

The more positive output from the gate 1708 is also effective through the NOR gate 1712 to toggle the flip-flop 1714. Since this flip-flop was previously toggled to a state indicating the correct receipt of a header identification, it is necessary to toggle the flip-flop back, inasmuch as the data entry will not proceed on the basis of the information cleared by the keyboard operator.

Character Control Circuit 210

The character control circuit 210 is illustrated in the schematic circuit formed by placing FIGS. 18 and 19 adjacent each other. The circuit 210 provides a control insuring that the message derived from a ticket contains the proper number of characters. To accomplish this, the circuit 210 includes three identical preprogrammed assemblies 1900, 1930, and 1940, of which only the unit 1900 is shown in detail. In addition, the circuit includes a manually controlled arrangement or selector 1830, such as thumb wheel switches for entering any desired value of characters to be expected in a message. The circuit 210 can also be controlled to provide an override condition in which any number of characters in a message will be accepted.

Referring now more specifically to the preprogrammed units 1900, 1930, and 1940 which are identical in construction, the illustrated unit 1900 includes a pair of four bit or an eight bit comparator unit 1906 having an equality output signal CPRI and an equality input normally connected to a positive biasing network 1904. To provide a means for preprogramming a count or character number, an arrangement such as a patchboard 1902 is provided having jumpers 1903 selectively connected to the B inputs of the comparator 1906 arranged in units and tens groups. The inputs to the B terminals of the comparator 1906 are normally maintained at a positive potential by the biasing network 1904 except for those selected input conductors connected to ground by the jumpers 1903. Thus, the comparator 1906 is permanently provided with the units and tens values of the number of characters to be expected in a message. Connected to the equality input of the comparator 1906 is a manual switch 1910 and an inverter 1908, the output signal of which is designated as P10F. When the switch 1910 is closed, the unit 1900 is rendered ineffective. Normally, all of the switches in the units 1900, 1930, and 1940 are maintained in a closed state. When one of the units 1900, 1930, and 1940 is to be placed in use, the corresponding switch such as the switch 1910 is opened.

Assuming that the unit 1900 is to be used to set a count of the number of characters to be expected from a ticket 184, the switch 1910 is opened so that a more positive potential is applied by the network 1904 to the equality input of the comparator 1906. The high level signal applied to the input of the inverter 1908 provides a low level signal P10F indicating that the program unit 1900 has been selected for operation. This low level signal is effective through a NAND gate 1920 to provide a more positive signal PSOF/ which in turn is effective through a NOR gate 1922 to provide a low level signal SPRG. This means that the inverted signal SPRG/ is at a high level. As described above in the description of the mechanism control, a high level SPRG/ indicates that a program selection has been made and an automatic stop condition for the mechanism control 300 is not provided.

The character control circuit 210 also includes a pair of connected binary coded decimal counters comprising a counter 1810 providing eight output leads representing the values of units and tens digits which are connected to the B inputs of the comparator 1906 in the unit 1900 as well as the corresponding comparators in the units 1930 and 1940. The units 1930 and 1940 are, however, ineffective at this time because their switches corresponding to the switch 1910 are in a closed state. The counter 1810 is cleared by the signal WCRS and is provided at its clock A input with the data present signal DATP. Thus the counter 1810 provides eight output signals corresponding to the binary coded decimal tens and units count of the number of characters received in each message.

Accordingly, when the counter 1810 reaches a setting corresponding to the value set into the comparator 1906 by the patchboard 1902, the equality comparison signal CPR1 becomes positive, and its inverted signal CRP1/ becomes more negative. This latter signal is applied to one input of a NAND gate 1806 and is effective to drive the output of this gate to a more positive potential. This potential is effective through a NOR gate 1804 to apply a more negative potential to the lower input of a NAND gate 1800. The other input to this gate is supplied with the signal RDER which is positive when the ticket reader 180 is conditioned for reader operation. Thus, the output of the NAND gate 1800 rises to a more positive potential which is effective through an inverter 1802 to provide a more negative signal GDCMP/. This latter signal indicates that the character number control has been satisfied.

The counter 1810 is cleared by the signal WCRS incident to each ticket message through the system 200 to the tape deck 214. In this manner the counter 1810 compares the number of characters received in each message with the preset number established by a selected one of the programmed units 1900, 1930, and 1940.

The character control circuit 210 also includes means for permitting a variable number of characters to be expected from each message to be set into the circuit 210. This control is provided by a manual digital selector 1830 that can, for instance, comprise thumb wheel switches for setting the values of units and tens digits into the system. One such switch is shown schematically as a switch 1832. The switches 1832 are set in accordance with the values of the tens and units digits to supply more negative signals to the inputs of selected ones of a plurality of inverters 1834. Those of the inverters 1834 that are connected to closed switches 1832 provide more positive signals to the B input terminals of a pair of four or an eight bit magnitude comparator 1820. The inputs to the inverters 1834 are normally held at a more positive potential by a positive biasing network 1838, and each of these individual lines extending to the inverters 1834 is also connected to one input of a NAND gate 1836. Therefore, whenever one of the switches 1832 is closed, a low level signal is applied to the input of the NAND gate 1836, and its output signal DISD/ rises to a more positive potential. This more positive potential is applied to the equality input terminal of the comparator 1820. The signal DISD/ is also applied to one input of the NOR gate 1922 to hold the signal SPRG at a low level and thus prevent the establishment of a stop condition in the mechanism control circuit 300.

Accordingly, when the counter 1810 arrives at a setting corresponding to the value set into the comparator 1820, an equality output signal CPRD becomes more positive. The inverted signal CPRD/ is applied as one input to the gate 1806 and provides a more negative signal GDCMP/ which indicates to the control circuit 200 that the expected number of characters in the message established by the manual digital selector 1830 has, in fact, been received. When all of the switches 1832 in the selector 1830 are opened, the signal DISD/ drops to a low level, and the comparator 1820 is not effective.

The character control circuit 210 can also be placed in a substantially inoperative mode so that any number of characters on a ticket 184 can be accepted. To do this, the manual digital selector 1830 is set to a setting representing ninety-nine copies. The output signals provided in this setting complete the enabling of a NAND gate 1832 so that a more negative signal DC99/ is provided. This signal is supplied to one input of a NOR gate 1808 and partially enables this gate. Further, all of the switches corresponding to the switch 1910 are closed so that the gate 1920 is fully enabled. This drives the signal PSOF/ to a low level, and this signal is applied to the other input of the NOR gate 1808. Thus, the output of this gate rises to a more positive potential which is effective through the gates 1804 and 1800 and the inverter 1802 to provide a more negative signal GDCMP/. Accordingly, this signal remains at a low level throughout the ticket reading operation continuously indicate that the character number criteria has been established. A continuous signal GDCMP/ is set in keyboard entries by the signal RDER.

It should be noted that even though the signal PSOF/ is at a low level at one input to the NOR gate 1922, the signal DISD/ is at a high level because of the actuation of the manual digital selector 1830. This means that the level SPRG stays at a low level, and the condition for stopping the reader 180 when a character number selection has not been made is not established. However, it should be noted that if all of the switches corresponding to the switch 1910 are closed, indicating that none of the units 1900, 1930, and 1940 has been selected, the signal PSOF/ will be at a low level. If all of the switches 1832 in the manual digital selector 1830 are opened, the signal DISD/ is also at a low level. This fully enables the gate 1922 so that a more positive signal SPRG and a more negative signal SPRG/ are provided. This establishes the improper operating condition that controls the mechanism control circuit 300 to introduce a stop condition that arrests further operation of the ticket reader 180.

Keyboard Unit 212

The keyboard unit 212 (FIG. 20) is provided for introducing manual data entries into the control circuit 200 for storage on the output unit or magnetic tape deck 214. When the keyboard unit 212 is placed in operation, the control circuit 200 is transferred from its reader mode in which the reader heads 202-205 are effective to a keyboard mode in which a keyboard in the keyboard unit 212 is rendered effective to control the entry of data. This keyboard includes, in addition to keys of digital significance, four control keys for effecting control functions. The four control keys include a read key which places the circuit 200 in a reader mode, a keyboard key which places the control circuit 200 in a mode for keyboard data entry, a clear key for clearing the system 200, and a record key for effecting the recording of data transferred into the buffer 232 from the keyboard unit 212. In FIG. 20 of the drawings, all of the function keys and the data entry key are indicated by the reference number 2002. The four function keys 2002 include an additional output lead providing four functional control signals READ/, KEY*/, CLR/, and REC/ corresponding to the read, keyboard, clear, and record functions, respectively.

A D type flip-flop 2230 is provided in the keyboard unit 212 to provide a signal indicating whether the circuit 200 is in a keyboard mode or a reader mode. The flip-flop 2230 is normally primed to a set condition by the reset signal PWRES/ to provide a more positive output signal RDER which normally conditions the control circuit 200 for reader operation. When the batch reader 180 is to be conditioned for keyboard entry, the operator closes the key 2002 to provide a more negative signal KEY*/ in the manner described below. This signal is applied to one input of a NOR gate 2034, the other input of which is dropped to a negative level by a strobe signal STRB/ generated in the manner described below. When both of the inputs to the gate 2034 drop to a low level, the high level output from this gate is applied to one input of a NAND gate 2028, the output of which is coupled to the clear input of the flip-flop 2230. The other input to the gate 2028 is held at a more positive potential by an inverter 2026. Thus, the signal from the gate 2034 enables the gate 2028 so that the flip-flop 2230 is reset. This removes the more positive signal RDER representing that the circuit 200 is conditioned for reader operation and provides a more positive keyboard signal KBRD indicating that the system is now conditioned for keyboard entry of data.

To provide the more negative keyboard signal KEY*/ referred to above, the keyboard unit 212 includes a five stage binary counter 2006 providing five decoded output signals KCTA - KCTE. The counting input to the counter 2006 is supplied from the output of a NOR gate 2004, one input of which is provided with a normally negative hold signal HOLD. The other input to the gate 2004 is supplied with a keyboard clock signal KBCK/. Since the keyboard unit 212 relies on the manual entry of data, the clock signal KBCK for controlling and synchronizing manual data entry is substantially slower than the master clock signal CLK used throughout the control circuit 200. Accordingly, the keyboard clock signal KBCK is developed at the output of a divide by 100 counter 2012, the counting input of which is supplied by a system clock signal CLK. In this manner, the keyboard clock signal KBCK is effective through the NOR gate 2004 to continually advance the counter 2006 to its various settings providing different patterns of output signals KCTA-KCTE.

These signals provide an input to a keyboard translator 2000. This translator is a decoder that is selectively addressed by the signals KCTA-KCTE to provide for each distinct pattern of input signals, a low level or ground signal on a selected one and one only of the output leads from the translator 2000 which extend to the manual switches 2002. The other sides of the switches 2002 are connected in common to a source of positive potential through a holdup resistor so that a signal BUSS/ is normally held at a high level. Thus, when one of the switches 2002 is closed and the counter 2006 arrives at the setting individual to the closed switch, the signal BUSS/ drops to a low level to indicate that the counter 2006 is in the setting corresponding to the closed one of the switches 2002.

The low level signal BUSS/ enables one input to a NOR gate 2016, and the center input to this gate is enabled by the low level verify signal VERFY. On the next keyboard clock signal, the signal KBCK completes the enabling of the gate 2016 so that it provides a more positive output to the J input terminal of a reset flip-flop 2014 and is effective through an inverter 2024 to operate a latch circuit 2008. The latch circuit 2008 receives and stores the pattern of signals KCTA-KCTE and provides corresponding output signals KBA-KBE. The same clock signal KBCK sets the flip-flop 2014 to provide a more positive signal VERFY, thus disabling the gate 2016 until such time as the flip-flop 2014 is next reset.

The counter 2006 now operates through an additional cycle of operation during which an attempt is made to determine whether or not the operated key 2002 previously detected remains closed. If the key is closed when the setting of the counter 2006 individual to the closed key 2002 is next reached, it is assumed that the key has been intentionally operated and that the prior detected closure was not an inadvertent momentary closure.

More specifically, the keyboard unit 212 includes a five bit weight comparator 2010, the A inputs of which are supplied with the counter output signals KCTA-KCTE and the B input terminals of which are supplied with the output signals KBA-KBE from the latch circuit 2008. The comparator 2010 has an equality output signal COMP which becomes more positive when the signals KCTA-KCTE and KBA-KBE are identical.

Accordingly, when the counter 2006 arrives at the setting representing the operated one of the keys 2002 assumed, for example, to be the key 2002 providing the signal KEY*/, the comparator 2010 provides a more positive signal COMP. The inverted signal COMP/ enables one input to a NOR gate 2018. The upper input to this gate is enabled by the set flip-flop 2014. If the key 2002 representing the key-board function remains depressed at this time, the signal BUSS/ is at a low level, and the gate 2018 is fully enabled to provide a more positive hold signal HOLD. This signal inhibits the gate 2004 so that the counter 2006 cannot be advanced. Since the counter cannot be advanced, the signal COMP/ will remain low to continue the provision of the more positive signal HOLD so long as the key 2002 remains depressed.

The signal HOLD also triggers the generation of the strobe signal STRB so that the character represented by the setting of the counter 2006 can be supplied to the channel selector 230 for storage in the buffer 232. More specifically, a flip-flop 2040 is in a reset condition so that the upper input to a NAND gate 2042 is enabled. The lower input to this gate is enabled by the signal HOLD. On the next following keyboard clock signal KBCK, the gate 2040 is fully enabled to provide a more negative output which is forwarded through an inverter 2044 to provide the strobe signal STRB. The inverted signal STRB/ strobes four gates 2032, 2034, 2036, and 2038 to read any closed one of the four function or control keys. As described above, when the assumed keyboard select key 2002 is depressed, the gate 2034 produces the resetting of the flip-flop 2230 to provide the more positive signal KBRD which conditions the control signal 200 for keyboard operation. The signal STRB/ is effective through the gate 2036 to provide the signal CLER when the clear key is actuated and through the gate 2038 to provide the signal RECD when the record key is operated.

The more negative signal at the output of the NAND gate 2042 is also applied to one input of a NOR gate 2046. If a data character has been entered by the keyboard unit 2012, the other input to the NOR gate 2046 is held at a low level, and the gate 2046 provides a valid character signal VALDCH which is used to effect the entry of the character represented by the other signals KBA-KBE in the buffer 232. If, on the other hand, the control function is represented by the actuated one of the keys 2002 such as the select keyboard key in the example assumed above, the signal KEY*/ is at a low level, and the output of a NAND gate 2048 is at a high level. This inhibits the NOR gate 2046 so that the character entering control signal VALDCH is inhibited.

The strobe signal STRB provided at the output of the inverter 2044 is also used to set the flip-flop 2040. More specifically, on the trailing edge of the keyboard clock signal KBCK with the J input to this flip-flop held positive by the signal STRB, the flip-flop 2040 is set, and the Q/ output of this flip-flop inhibits the gate 2042 to insure that only a single valid character signal VALDCH can be generated.

The keyboard unit 212 remains in this condition until the operated key is released. In the status of the keyboard unit 212 described above, the actuation of a second key 2002 will not result in the entry of data or in the entry of incorrect data. Thus, when the actuated key 2002 is released, the signal BUSS/ rises to a more positive level and completes the enabling of a NAND gate 2020. The low level output from this gate partially enables a NOR gate 2222, the lower input of which is enabled by the signal COMP/. On the following clock signal KBCK/, the gate 2222 is fully enabled to generate a more positive signal LDSRCH. This signial is applied to the K inputs of the flip-flops 2014 and 2040. On the trailing edge of the next following keyboard clock signal KBCK, both of the flip-flops 2014 and 2040 are reset. The resetting of the flip-flop 2014 disables the gates 2018 and 2020 and partially enables the gate 2016. The resetting of the flip-flop 2040 applies one enabling potential to the NAND gate 2042, but the signal HOLD is at a low level at this time because of the resetting of the flip-flop 2014. The disappearance of the signal HOLD also releases the NOR gate 2004 so that the counter 2006 can advance looking for the next actuated key 2002.

When the next actuated key 2002 is encountered, the circuit 212 performs in the same manner described above. However, if a function key is not operated, the NAND gate 2048 provides a low level enabling signal to the connected input of the NOR gate 2046, and the valid character signal VALDCH is generated coincident with each strobe signal STRB. After the operator has provided the digital information desired, the record key is actuated to provide the signal REC/ which in turn is effective through the gate 2038 to provide the record signal RECD. If the operator desires to clear information, he operates the clear key to provide the signal CLR/ which is effective through the gate 2036 to provide the clear signal CLER. After the data entered through the keyboard unit 212 has been transferred to the output unit or tape deck 214 and the operator desires to return the control circuit 200 to its reader mode, the read key is actuated to provide a low level read signal READ/ so that the gate 2032 is completely enabled on the strobe signal STRB/. The more positive output from the gate 2032 is applied through the clock input of the D flip-flop 2230 to set this flip-flop. This provides a more positive reader signal RDER and a low level keyboard signal KBRD.

Buffer and Buffer Control Circuit 232

A buffer and buffer control circuit 232 (FIGS. 12-14) receives data from the channel selector 230 from one of the two demodulating channels or from the keyboard unit 212. If the controls imposed by the character control circuit 210 and the header-trailer control circuit 234 are satisfied, the data stored in the buffer in the circuit 232 is transferred to the output device or tape deck 214. The buffer and buffer control circuit 232 also include visual display means by which the data supplied by the keyboard unit 212 can be checked prior to transfer to the tape deck 214 and for displaying the last message read into the tape deck 214.

To provide means for separating data reading and data writing operations in the control circuit 232, the system clock signal CLK is divided by two to provide a register clock signal REGCK and a write clock signal WRCK. More specifically, the system clock signal CLK is forwarded through an inverter 1340 to one input of each of a pair of NAND gates 1342 and 1344 in the clock input of a JK flip-flop 1338. Thus, on alternate clock signals CLK, the register clock signal REGCK/ and the write clock signal WRCK/ are generated.

The basic flow of data through the control circuit 232 is illustrated at the upper portion of FIG. 12 of the drawings. Data signals DTBA-DTBE from the channel selector 230 are supplied to the input of a six channel latching circuit 1202, the output of which is connected to a 5X32 circulating shift register. Data is circulated through the shift register or buffer register 1204 by the register clock REGCK/. When the signal supplied to the shift register 1204 from the Q/terminal of a JK flip-flop 1216 is at a high level, data is internally circulated through the register 1204 by the clock signal REGCK/. On the other hand, when the input voltage is at a low level, circulation is inhibited, and the input of the shift register 1204 reads or receives the output of the latch circuit 1202.

The output of the circulating register 1204 in the form of five output signals RCBA-RCBE is supplied to the record input of a data utilization device or tape deck 214. The recording of this data is controlled by an enabling signal OPDCK supplied to the tape deck 214 from the circuit 232. If desired, the signals RCBA-RCBE can be encoded in any desired form for use by the tape deck 214 merely by the provision of, for example, an encoder or a read only memory.

The sequence of transferring data into the buffer is controlled by a program control unit 1303 including a pair of JK flip-flops 1308 and 1310 and a variety of connected NAND input gates and NOR output gates. The reset signal WCRS/ normally resets both of the flip-flops 1308 and 1310 so that a low level enabling potential is applied to both inputs of only a NOR gate 1312. This provides a more positive signal WAIT indicating that the buffer control circuit 232 is awaiting data. The flip-flops 1308 and 1310 are primed to different combinations of set and reset states by the input NAND gates in different sequences to control the transfer of data read in a forward direction and in a backward direction into the buffer 1204.

The control over the positioning of each character of data in the buffer 1204 as it is transferred from the latching circuit 1202 is controlled by three units 1218, 1220, and 1346. The unit 1218 is a five stage binary counter advanced or clocked by the register clock signal REGCK/ in synchronism with the circulation of data through the shift register or buffer 1204. The counter 1218 provides five binary ordered output signals REGA-REGE which are coupled to the A inputs of a five bit magnitude comparator 1220. The unit 1346 is a five stage binary up-down counter 1346 advanced by a signal INCTR/ applied to its clock terminal. The counter 1346 counts up when a signal BWD representing data read in a backward direction is at a low level, i.e., the data has been read in a forward direction. The counter 1346 counts down when the signal BWD is at a high level. The counter 1346 is reset to a zero state by the clearing signal WCRS/. The counter 1346 provides five binary ordered output signals WRA-WRE which are applied to the B input terminals of the comparator 1220. This comparator supplies a more positive signal REQW from its equality output terminal when the binary values supplied by the counters 1218 and 1346 are the same. The comparator 1220 provides a more positive signal RLTW whenever the value supplied by the counter 1218 is either not greater than or not equal to the value supplied by the up-down counter 1346.

In the normal state of the control circuit 232, a JK flip-flop 1360 is reset by the resetting signal WCRS/ ro that a signal BFF/ is at a more positive level. This signifies that the buffer 1204 is not filled and is in condition to receive data through the channel selector 230.

Assuming that a ticket 184 has been read in a forward direction and that a character of data is available at the output of the channel selector 230, this character is presented to the latch 1202 by the input signal DTBA-DTBE. A data present signal DATP/ is also provided at the input of a NOR gate 1200, the other input of which is enabled by the more negative signal BFF. Thus, the output of the gate 1200 provides a more positive signal LDTA which clocks the input signal into the latching circuit 1202 and also provides on its sixth channel a more positive signal DPRS indicating that data is present in the latch 1202. As soon as the signal DPRS is provided, the control circuit 232 is advised that data is present to be transferred into the shift register 1204.

The signal DPRS completes the enabling of a NAND gate 1304. More specifically, one input to this gate is enabled by the signal WAIT which is generated in the manner described above in the normal state of the program control 1303. A signal BWD/ enables the lower input to the gate 1304 because the circuit 232 has been advised that the data being supplied through the channel selector 230 is read or otherwise provided in a forward direction. When the gate 1304 is fully enabled, a more negative signal FWDPRS/ is provided which is effective through a NAND gate 1306 to provide a more positive potential to the J input terminal of the flip-flop 1308. on the trailing edge of the next register clock signal REGCK, the flip-flop 1308 is set to terminate the signal WAIT and to complete the enabling of a NAND gate 1314. This gate provides a more positive signal BFGO provided in the second step of the program for receiving data read in a forward direction. The signal BFGO partially enables a NAND gate 1328, a second input of which is enabled by the more positive signal BWD/. The third input to this gate is the signal REQW.

The counter 1218 in the shift register 1204 synchronized with the counter 1218 can be in any position when the data present signal DPRS is received to generate the signal BFGO. The up-down counter 1346 is in its zero setting. Accordingly, when the counter 1218 reaches its zero setting, the signal REQW at the output of the comparator 1220 becomes more positive, and the gate 1328 is fully enabled to provide a more negative forward write signal FWDWR/. This signal drives the output of a NAND gate 1302 more positive to provide the signal WRT. This signal is applied to the J input terminal of the flip-flop 1216. On the next trailing edge of the next following write clock signal WRCK, the flip-flop 1216 is set, and the signal applied from the Q/terminal of this flip-flop to the shift register 1204 drops to a low level to enable the input of the shift register 1204 to receive the data entry stored in the latch 1202. Thus, the first character received from the channel selector 230 is now stored in the shift register 1204, and the time slot is marked by the zero setting of the up-down counter 1346.

The signal FWDWR/ is also effective through a NAND gate 1330 to apply a more positive potential to the J input terminal of the flip-flop 1310. Thus, on the trailing edge of the register clock signal REGCK, the flip-flop 1310 is set to terminate the signal BFGO. When this signal disappears, the signal WRT is removed, and its inverted signal WRT/ becomes more positive. Thus, the next write clock signal WRCK resets the flip-flop 1216 so that the input to the shift register 1204 is no longer enabled, and the data contained in the register 1204 is circulated.

When the flip-flop 1310 is set to terminate the signal BFGO, both inputs to a NOR gate 1318 are enabled to provide a more positive signal STEP. This signal enables one input to a NAND gate 1362. Another input to this gate is held enabled by the signal BFF/. On the register clock signal REGCK, the gate 1362 is fully enabled to provide a low level signal INCTR/ which advances the up-down counter 1346 a single step in an up or forward direction because of the low level control signal BWD. Thus, the counter 1346 now stands in a setting representing its first advanced position. Accordingly, the signal REQW will now appear when the counter 1218 is in its first setting, and the corresponding time slot of the shift register 1204 is presented to the output of the latch circuit 1202. In addition, the signal RLTW becomes positive during the time slot defining the zero or reset position of the up-down counter 1346 because during this interval, the setting of the counter 1346 is not less than or equal to the setting of the counter 1218. Thus, the signal RLTW frames the time slot in the shift register 1204 in which data is present.

During the register clock signal REGCK referred to above, a gate 1326 is also fully enabled inasmuch as the other two signals STEP and BWD/ are also positive. This provides a more negative signal FWDSTP/ which is effective through a NAND gate 1324 to provide a more positive potential to the K input terminal of the flip-flop 1308. Thus, at the trailing edge of this clock signal REGCK, the flip-flop 1308 is reset to terminate the signal STEP so that only one signal INCTR/ for advancing the counter 1346 can be generated. The signal FWDSTP/ is also effective through a NAND gate 1334 to apply a more positive potential to the K input terminal of the flip-flop 1310. Thus, on the trailing edge of the same register clock signal REGCK, the flip-flop 1310 is reset. With both of the flip-flops 1308 and 1310 reset, the NOR gate 1312 is fully enabled to provide the more positive signal WAIT. This resetting also terminates the enabling conditions for generating the signal FWDSTP/.

During the persistence of the signal FWDSTP/, a gate 1300 provides a more positive signal CLDTL. The inverted signal CLDTL/ is applied to the clear terminate of the latch 1202 to remove the character stored therein which has now been transferred to the indicated time slot in the circulating buffer or memory 1204.

This operation continues in the same manner as described above using the program control unit 1303 for so long as additional characters are presented to the latching circuit 1202 for storage in the shift register 1204. On each operation the counter 1346 is incremented so that each character supplied to the latching circuit 1202 is stored in the time slot marked by the setting of the counter 1346, and after storage therein the counter 1346 is advanced to its next setting designating the next time slot to receive the next character supplied from the channel selector 230. Further, as each additional character is stored in the counter 1204, the counter 1346 controls the comparator 1220 so that the signal RLTW becomes positive for a longer period of time embracing all of the time slots of the shift register 1204 in which characters have been stored.

When the end of the keyboard generated or reader generated message is reached, the control circuits associated with the prebuffers 226, 228 and the channel selector 230 provide the signal DUMP signifying that the data stored in the buffer 1204 is to be transferred to the output device or tape deck 214. The more positive signal DUMP is applied to the J input terminal of a flip-flop 1400 which is normally reset by the power reset signal PWRES/. On the coincident system, clock signal CLK, the flip-flop 1400 is set so that its Q/ output partially enables a NOR gate 1402. The other input to the gate 1402 is supplied by a signal DCD31/. This signal is supplied by a NAND gate 1348 at a low level in the thirty-first or last setting of the counter 1218. When this signal is supplied, the gate 1402 is fully enabled to supply a more positive signal to the J input terminal of a flip-flop 1404. When the next register clock signal REGCK is supplied and on the trailing edge thereof, the counter 1218 advances to its zero setting representing the first time slot in the shift register 1204 containing the first stored character. At the same time, the flip-flop 1404 is set to partially enable a NAND gate 1422.

If data is present in the buffer 1204, the signal RLTW is at a more positive state during the time slots containing digits as set forth above. If the data has been read or supplied in a forward direction, the signal BWD/ is at a low level. Thus, a NAND gate 1416 is fully enabled to supply a low level signal to one input of a NAND gate 1420. This drives the output of this gate to a more positive potential to enable another input to the NAND gate 1422. The third input to the gate 1422 is provided by the write clock signal WRCK. Accordingly, the gate 1422 will provide the signal OPDCK/ which is the write clock signal for the tape deck 214. Thus, the write clock signal WRCK will clock characters into the tape deck 214 from the shift register 1204 from the first or zero time slot of the register 1204 through all of the time slots containing characters, as signified by the continued positive level of the signal RLTW. When the last character has been transferred, the signal RLTW drops to a low level to inhibit the gate 1416 and to prevent the generation of further clock signals OPDCK/ for transferring data from the shift register 1204 into the tape deck 214. These character transferring operations from the shift register 1204 to the tape deck 214 occur within a single cycle of revolution of the counter 1218.

Further, when the last time slot in the register 1204 containing a character is reached, the settings of the counters 1218 and 1346 are the same, and the inverted equality signal REQW/ drops to a low level to complete the enabling of a NOR gate 1408. The upper input to this gate is enabled by the set flip-flop 1404, and the lower input is enabled by the low level signal BWD because the data being transferred was read in a forward direction. The high level output from the date 1408 is forwarded through a NOR gate 1410 to provide a low level signal to one input of a NOR gate 1412. On the next following register clock signal REGCK/, the gate 1412 is fully enabled to provide a more positive end dump signal ENDMP. This signal is used to advise the control circuit 216 that data originating from the keyboard unit 212 has been transferred. The signal ENDMP is also returned to the K input terminals of the flip-flops 1400 and 1404. Thus, on the coincident clock signal CLK, the flip-flop 1400 is reset, and on the same register clock signal REGCK the flip-flop 1404 is reset. This prevents generation of further signals OPDCK/ for transferring data from the buffer 1204 to the tape deck 214 a second time during the next cycle of operation of the counter 1218. Further, incident to the reading of the next ticket 184, the signal WCRS/ is generated to clear the up-down counter 1346 so that it returns to its zero state to await characters from the next message.

Assuming that the next ticket 184 read by the reader 180 is read in a reverse or backward direction, the signal BWD is at a high level to enable a different set of gates in the program control 1304. The more positive signal BWD also conditions the up-down counter 1346 to count from its zero or initial setting in a backward direction, i.e., the first signal INCTR/ decrements the counter 1346 to its last setting.

Accordingly, when the first character from the ticket 184 read in a reverse direction is presented to the latching circuit 1202 by the input signals DTBA-DTBE, the data present signal DPRS again becomes positive. This completes the enabling of a NAND gate 1320 inasmuch as the signals WAIT representing the normal state of the program control 1303 and the signal BWD representing backward reading are both at a positive level. The gate 1320 provides a low level signal BWDPRS/ which is effective through the NAND gate 1306 to provide a more positive potential to the J input terminal of the flip-flop 1308. This signal is also effective through the NAND gate 1330 to provide a more positive potential to the J input terminal of the flip-flop 1310. Thus, on the trailing edge of the next register clock signal REGCK, both of the flip-flops 1308 and 1310 are set.

When both of these flip-flops are set, the signal WAIT disappears, and the NOR gate 1318 is enabled to provide the more positive signal STEP. This signal completes the enabling of the gate 1362 to provide the more negative signal INCTR/ which decrements the counter 1346 since the up-down control signal BWD is now at a positive level. Accordingly, the counter 1346 is now advanced to its last setting or the setting representing the last position reached in a forward counting sequence. Since the signals STEP and BWD are both at a positive level, a NAND gate 1332 is enabled to provide a low level backward step signal BWDSTP/. This signal is effective through the NAND gate 1334 to apply a more positive potential to the K input terminal of the flip-flop 1310. Accordingly, on the trailing edge of the next register clock signal REGCK, the flip-flop 1310 is reset. This terminates the more positive signal STEP. This completes the enabling of the gate 1314 to provide the more positive signal BFGO. With the signal BFGO and BWD at a more positive level, two of the inputs to a NAND gate 1322 are enabled. When the counter 1218 reaches its last setting in its normal counting sequence and since the up-down counter 1346 is in this setting, the unit 1220 provides a more positive signal REQW which completes the enabling of the gate 1322 to provide a low level backward write signal BWDWR/. This signal is effective through the NAND gate 1302 to provide the more positive signal WRT. As described above, this signal controls the flip-flop 1216 to enable the shift register 1204 to receive the first character of the reverse read message now stored in the latching circuit 1202 in the last time slot in the shift register 1204 defined by the counter 1218.

The low level signal BWDWR/ is also effective through the NAND gate 1330 to apply a more positive potential to the J input terminal of the flip-flop 1310 and through the NAND gate 1324 to provide a more positive input to the K input terminal of the flip-flop 1308. Thus, on the trailing edge of the next register clock signal REGCK, the flip-flop 1308 is reset, and the flip-flop 1310 is set. In this condition, the gate 1314 is inhibited to terminate the signal BFGO. The termination of this signal terminates the backward write signal BWDWR/ and thus the write signal WRT.

The resetting of the flip-flop 1308 and the setting of the flip-flop 1310 also completes the enabling of a NOR gate 1316 to provide a more positive signal BWDCLR which in turn enables one input to a NAND gate 1136. On the next following register clock signal REGCK, the gate 1336 is enabled to provide a low level backward end signal BWDEND/. This signal is effective through the NAND gate 1300 to provide a more positive signal CLDTL which clears the latching circuit 1202. The signal BWDEND/ also is effective through the NAND gate 1334 to provide a more positive input to the K input terminal of the flip-flop 1310. Thus, the trailing edge of the next clock REGCK resets the flip-flop 1310 to remove the signal BWDCLR and to provide the more positive signal WAIT indicating that the program control 1303 is awaiting the next character from the channel selector 230.

This operation continues during the transfer of the remaining digits of the message read in a reverse direction from the channel selector 230 to the shift register or buffer 1202. As each character is transferred into the buffer 1204, the up-down counter 1346 is decremented a single step prior to data entry so that successive digits are read into time slots in the register 1204 represented by the higher valued binary settings of the counter 1218 in a descending order. Because of this, the signal RLTW remains at a low level in the interval embracing the time slots occupied by the characters in the shift register 1204 and is at a positive level during those time slots that are not occupied by characters of the message read in a reverse direction.

The transfer of the reverse read message from the buffer 1204 to the tape deck 214 is initiated in the same manner described above by the provision of the signal DUMP. This signal sets the flip-flop 1400 and controls the setting of the flip-flop 1404 when the counter 1218 reaches its zero position so that one input to the NAND gate 1422 is enabled. However, the gate 1416 used to enable the center input of the gate 1422 when a message read in a forward direction is stored in the buffer 1204 is inhibited because of the low level signal BWD/ applied to the gate 1416. The gate 1418 controls through the gate 1420 the completion of the enabling of the gate 1422 when messages read in a reverse direction are stored in the buffer 1204.

More specifically, the gate 1418 is partially enabled by the more positive signal BWD because the message has been read in a reverse direction. The lower input to this gate is enabled by a flip-flop 1414 which is set on the trailing edge of the system clock signal CLK whenever the signal LDTA goes positive. This signal goes positive each time that a data bit is clocked into the latching circuit 1202 and is normally used to provide an inhibit for the gate 1418 when no data is present in the buffer 1204. The signal RLTW/ will now be positive during the interval embracing the time slots of the buffer 1204 in which are stored characters of the message read in a reverse direction. Accordingly, the gate 1418 will be fully enabled during this interval to provide a low level signal which is effective through the NAND gate 1420 to complete the enabling of the gate 1422. Thus, the clock signals OPDCK/ following the write clock signals WRCK are provided to the input of the tape deck 214 and transfer data from the shift register 1204 to the input of the tape deck 214. Further, since the signals OPDCK/ are presented to the tape deck in ascending counting order of the counter 1218, i.e., from the lowest binary value to the highest binary value, the digits are read out of the shift register 1204 in the reverse order in which they were read into this shift register. Since the characters were read into the register 1204 in a reverse order because the message was read in a reverse direction, the message is now read in a forward direction out of the register 1204 into the tape deck 214.

When the last position in the counting sequence of the counter 1218 is reached, i.e., the position in which the last digit of the message is always stored, the signal RLTW/ inhibits the gate 1418 to prevent the further generation of the writing signals OPDCK/ for the tape deck 214. In addition, the signal DCD31/ again drops to a low level indicating that the last counting position has been reached. This completes the enabling of a NOR gate 1406, the upper input to which is enabled by the set flip-flop 1404. The high level output from the gate 1406 is effective through the NOR gate 1410 and the gate 1412 to again generate the end dump signal ENDMP and to reset the flip-flops 1400 and 1404 in the manner described above. The flip-flop 1414 is reset by the clear signal WCRS/. These resetting operations prepare the circuit 232 for receiving the next message.

As noted above, the flip-flop 1360 provides a means for monitoring the filled or empty status of the shift register or buffer 1204. The flip-flop 1360 remains in a reset state so long as additional storage capacity remains in the buffer 1204. However, when data from a message read in a forward direction is being recorded and the counter 1218 reaches its last counting position designating the last available tim slot in the repetitive time frame of the circulating buffer 1204, the gate 1348 is fully enabled to provide the low level signal DCD31/ which enables one input to a NOR gate 1352. When the program control 1303 reaches its forward write setting incident to the recording of a character in this last available time slot, the signal FWDWR/ becomes more negative as described above. This completes the enabling of the gate 1352 so that a more positive signal is forwarded through a NOR gate 1356 to one input to a NOR gate 1358.

The other input to this NOR gate is supplied with the signal REQW/. This signal will drop to a low level as soon as the counters 1218 and 1346 are in the same setting indicating that a digit has been recorded in the last available time slot. The more negative signal REQW/ completes the enabling of the NOR gate 1358 so that a more positive potential is applied to the J input terminal to the flip-flop 1360. On the trailing edge of the next following register clock REGCK, the flip-flop 1360 is set to provide a more positive signal BFF. The more positive signal BFF indicates that the buffer 1204 is filled and cannot acept additional characters.

The more positive signal BFF applies an inhibit to the NOR gate 1200 so that further data from the channel selector 230 cannot be gated into the latching circuit 1202. This means that the signal DPRS cannot be generated and that the program control 1303 cannot be advanced out of the reset state in which the signal WAIT is generated.

The low level BFF/ applies an inhibit to one input to the NAND gate 1362 so that the signal INCTR/ for changing the setting of the counter 1346 cannot be generated. The low level signal BFF/ is also applied to one input of the NAND gate 1420 to provide a continuous partial enabling for the gate 1422 in place of the enabling through the gate 1420 normally supplied by the gates 1416 and 1418. This permits the gate 1422 to provide the write clock signal OPDCK/ to the tape deck 214 as soon as a dump signal is received for transferring data from the buffer 1204 to the tape deck 214. This condition remains until such time as the reset signal WCRS/ is generated to restore the flip-flop 1360 to its normal reset state.

The buffer 1360 is also set to indicate a filled buffer 1204 when the data stored in this buffer is derived from a message read in a reverse direction. This control is effected by a NOR gate 1354. More specifically, the control circuit 232 includes a NAND gate 1350 provided with the inverted outputs from all of the stages of the counter 1218. The signals REGA/-REGE/ hold the output of the NAND gate 1350 at a high level whenever the counter 1218 is in any setting other than the zero or reset setting. At this time, an output signal DCDO/ from the gate 1350 drops to a low level. This signal is applied to one input to the NOR gate 1354 and partially enables this gate.

When the program control 1303 reaches the setting in which the backward write signal BWDWR/ is generated, this low level signal completes the enabling of the gate 1354 so that this gate provides a high level signal which is effective through the gate 1356 to partially enable one input to the NOR gate 1358. This signal appears during the writing of a digit in the reset or zero time slot of the shift register 1204 since dat read in a reverse direction is stored in the time slots of the buffer 1204 in a descending binary sequence. This time slot represents the last available time slot for information read in a reverse direction. When the counters 1218 and 1346 reach the same setting, the character is written in this last available slot, and the comparator 1220 provides a low level signal REQW/ which completes the enabling of the gate 1358. The flip-flop 1360 is then set to provide a more positive signal BFF in the same manner as described above. The signal produces the same control effects as described above. The circuit 232 is restored to a normal state on the clear signal WCRS/ which resets the flip-flop 1360 after the message information has been discharged from the buffer 1204 to the tape deck 214. In this connection, it should be noted that the circulating memory or buffer storage unit 1204 does not include means for clearing data from the various time slots therein. The technique used in the buffer 1204 is to write new data entries over old data entries to avoid the necessity for wasting a cycle for clearing operations.

The buffer and buffer control circuit 232 also includes a lamp display means 1224 for displaying the contents of the shift register or buffer 1204. This lamp display means 1224 is used primarily for verification of manual entries from the keyboard unit 212 to determine their accuracy before transferring data from the buffer 1204 into the tape deck 214. However, the lamp display means 1224 does display each message stored in the buffer 1204, but this may not be of appreciable value to the operator in view of the speed at which the tickets 184 are read by the ticket reader 180. The lamp display 1224 does however retain a display of the contents of the last ticket read in the interval between batches or groups of tickets.

The lamp display 1224 icludes thirty-two, seven segment or anode LED display devices, each having a cathode. To provide means for selectively enabling the cathodes of the thirty-two devices in sequence, the control circuit 232 includes a five bit to one of thirty-two output decoder 1222. The thirty-two outputs from the decoder 1222 are each connected to one of the cathodes of the LED devices. The input to the decoder 1222 comprises the signals REGA-REGE derived from the output of the counter 1218. Thus, as the counter 1218 is advanced through each cycle of revolution corresponding to the repetitive time frame of the circulating buffer 1204, each of the LED devices is enabled in a single time slot corresponding to one of the time slots in the buffer 1204.

To provide means for selectively energizing or illuminating the seven segment anodes of the LED devices, there is provided an encoder 1226 with seven output leads wired in common to the anodes of all of the LED devices. The encoder 1226 receives five input signals RCBA-RCBE derived from the output of the circulating memory 1204. The encoder 1226, which can, for example, comprise a read only memory, selects a combination of the seven output leads or the seven anodes corresponding to the configuration of the digit or character represented by the pattern of input signals RCBA-RCBE. The encoder 1226 includes an enabling or gate input coupled to the output of a NAND gate 1228. When the gate 1228 provides a low level input to the encoder 1226, the encoder supplies an output dependent on the input signals RCBA-RCBE.

The NAND gate 1228 is enabled to provide a gating signal for the encoder 1226 only during those time slots of the repetitive time frame of the buffer 1204 in which characters or digits are stored. The lower input of the gate 1228 is connected to the Q output of a D flip-flop 1230 which is reset on the master reset signal WCRS/. When the first digit is written into the buffer 1204, the positive-going edge of the write signal WRT/ sets the flip-flop 1230 so that a more positive signal is supplied to the connected input of the gate 1228. The other input to the gate 1228 is provided by a signal OPVD. This signal brackets the time slots in the time frame of the circulating memory 1204 in which are stored characters.

The signal OPVD is derived from the output of the NAND gate 1420 and is driven to a high level during the time slots containing digits under the control of the gates 1416 and 1418 when the ticket data is read in a forward and backward direction, respectively. The signal BFF/ also provides a high level signal OPVD when the buffer is filled in the manner described above.

Thus, the gate 1228 is enabled during those time slots in the repetitive time frame of the circulating buffer 1204 that contain stored digits. Thus, the encoder 1226 supplies seven segment selection data in common to all of the LED devices in the lamp display means 1224 as each character appears at the output of the circulating memory 1204. The decoder 1222 controlled by the counter 1218 selects the one LED device corresponding to the time slot in which the digits are presented. Further, it should be noted that since the counter 1218 always counts in a forward direction and the enabling signal OPVD is dependent on the output of the gates 1416 and 1418, the digits will be displayed by the lamp display 1224 in correct sequence or order independent of whether the message data has been entered in forward or reverse direction. When the reset signal WCRS/ is generated either by the keyboard unit 212 or by the sensing of a new ticket 184, the flip-flop 1230 is reset to terminate the enabling of the encoder 1226 and thus the visual display by the lamp display means 1224.

Although the present invention has been described with reference to a single illustrative embodiment thereof, it should be understood that numerous other modifications and embodiments can be devised by those skilled in the art that will fall within the spirit and scope of the principles of the present invention.

What is claimed and desired to be secured by Letters Patent of the United States is:

1. A record reading apparatus for reading records encoded with a message on one side of the record in a position displaced from the center of the record so that the message can be disposed in one of four different positions relative to a path of movement of the record, said apparatus comprising
- four record sensing means for sensing an encoded message on a record, two of said means being disposed on each side of the path of movement with the heads on opposite sides displaced from each other in a direction parallel to the record path of movement and with the heads on the same side displaced from each other in a direction transverse to the path of movement of the record,
- first selecting means coupled to the four sensing means for selectively selecting the two sensing heads which are adjacent the record at any given moment,
- two message translating means each coupled to a pair of sensing means including one sensing means on each of the opposite sides of the path of movement for providing signals representing an encoded message,
- a message utilizing means, and
- second selecting means coupled to the two message translating means for selecting one of the two translating means to supply signals representing an intelligible message to the message utilizing means.

2. The record reading apparatus set forth in claim 1 in which
- the first selecting means includes means responsive to signals derived from the sensing means for controlling the operation of the first selecting means.

3. A record reading apparatus for reading groups of data records each preceded by a distinctive header record, said records being sequentially moved along a sensing path, which apparatus comprises
- sensing means along said path for sensing the records and for providing output signals,
- first control means responsive to said output signals for determining whether correct or incorrect data is derived from the data records,
- a first record receiver,
- second record receiver,
- means controlled by the first control means for directing sensed data records from which correct data was derived into the first record receiver and for directing sensed data records from which incorrect data was derived into the second record receiver, and
- second control means controlled by the output signals for directing the header record into the second record receiver to segregate the data records directed into the second record receiver.

4. The record reading apparatus set forth in claim 3 wherein each group of records is followed by a distinctive trailer record and
- the second control means includes means for directing trailer records into the second record receiver.

5. A method of segregating and identifying those data records yielding incorrect data when groups of data records are read in sequence by a reader which comprises the steps of
- providing a header record preceding each group of data records,
- reading the records in sequence,
- checking the data records for correct and incorrect data,
- directing data records yielding correct data into a first place,
- directing data records yielding incorrect data into a second place, and
- directing the header record into the second place preceding any data records.

6. The method set forth in claim 5 including the steps of
- providing a trailer record following each group of data records, and
- directing the trailer record into the second place following the last data records in a group.

7. A record reading apparatus for reading a group of data bearing records preceded by a distinctive header record comprising
- record sensing means,
- means for feeding the records in sequence past the record sensing means,
- data detecting means controlled by the sensing means for providing data representing signals,
- output means coupled to the data detecting means for receiving the data representing signals,
- header detecting means controlled by the record sensing means for detecting the presence of a header record, and
- a control circuit controlled by the header detecting means for inhibiting the transfer of data representing signals to the output means when a header record does not precede a data record.

8. A record reading apparatus for reading a group of data bearing records preceded by a distinctive header record and followed by a distinctive trailer record, which apparatus comprises
- record sensing means for sensing the records in sequence,
- data detecting means coupled to and controlled by the record sensing means for providing data representing signals,
- data receiving means,
- data transfer means coupled between the data detecting means and the data receiving means for transferring data from the data detecting means to the data receiving means, said transfer means having an operable state for effecting said transfer of data and an inoperable state for preventing the transfer of data,
- header detecting means controlled by the record sensing means and coupled to the data transfer means for operating the transfer means to its operable state, and
- trailer detecting means controlled by the record sensing means and coupled to the transfer means for operating the transfer means to its inoperable state.

9. The record reading apparatus set forth in claim 8 in which
- the header detecting means includes control means for providing an indication when a data bearing record is sensed prior to a header record.

10. A record reading apparatus for use with records having data entries recorded in a serial arrangement comprising
- record reading means for reading the records in opposite directions to provide data entries in forward and backward orders, a circulating register for storing a data entry from a record, said register defining a plurality of time slots in a repetitive time frame for storing a data entry, counting means continuously operable in said repetitive time frame in synchronism with said register and providing signals representing said time slots, a bidirectional counter providing static signal representations of said time slots, a comparator coupled to said counting means and said bidirectional counter and operable to provide an input enabling signal when the time slot representing signals from the counting means and the bidirectional counter represent the same time slot, input means coupled between the circulating register and the record reading means and controlled by said input enabling signal to enter a data entry into the circulating register, and means for operating the bidirectional counter in one direction when the data entry is in forward order and for operating the bidirectional counter in an opposite direction when the data entry is in a backward order.

11. The record reading apparatus set forth in claim 10 including a data entry receiving means coupled to the circulating register, and means controlled by the counting means and coupled to the data entry receiving means for transferring a data entry to the receiving means in successive time slots in the order in which the time slot representing signals are provided by the counting means.

12. The record reading appratus set forth in claim 10 including a data utilizing means coupled to the circulating register, means in the comparator means providing an output enabling signal when the bidirectional counter and the counting means provide signals representing different time slots, and means controlled by the output enabling signal for transferring a data entry from the circulating register to the data utilizing means.

13. An apparatus for decoding a data reprsenting event in plural bit coded form comprising a plurality of data representing means having alternate conductive states, counting means operable through an operating cycle of different settings, selecting means coupled to the counting means and the data representing means for selecting different data representing means at different settings of the counting means, detecting means for detecting the change in the conductive state of one of the data representing means, storage means controlled by the detecting means for storing the setting of the counting means when a change in a conductive state is detected during one operating cycle, and control means controlled by the storage means and the counting means for supplying a plural bit data representing code when the same data representing means has a changed conductive state on a second operating cycle of the counting means.

14. A data handling apparatus for providing a plural bit code representing an operated device comprising a plurality of devices each identified by a plural bit code and each capable of independent operation at a random time relative to the other devices, a counting means operable through an operating cycle of different settings, selecting means coupled to the counting means and the devices for selecting different devices in different settings of the counting means, detecting means coupled to the devices for detecting an operated device, and a control circuit coupled to the detector for supplying a plural bit code when the detecting means detects the same device in an operated state on two operating cycles of the counting means.

15. The data handling apparatus set forth in claim 14 including storage means in the control circuit for storing the setting of the counting means when the detecting means first detects an operated device, and comparing means in the control circuit coupled to the storage means and the counting means for indicating the identity of the operated device on two operating cycles of the counting means.

16. The data handling apparatus set forth in claim 14 in which the control circuit includes means for arresting operation of the counting means when the detecting means detects the same operated device on two operating cycles of the counting means, and means for starting the counting means when the operated device is released.

17. A record reading apparatus for reading a group of data bearing records preceded by a distinctive header record and followed by a distinctive trailer record, which apparatus comprises record sensing means for sensing the records in sequence, data detecting means coupled to and controlled by the record sensing means for providing data representing signals;

data receiving means to which said data representing signals are suplied for receiving the data, header and trailer detecting means to which said data representing signals are supplied for detecting when a header or trailer record has been scanned and for generating a header or trailer signal at such times, means for recording whether the most recent signal generated by said detecting means was a header or trailer signal, and error detection means coupled to said detecting means signals and to said recording means for comparing each new signal generated by said detecting means to the signal most recently given off by the detecting means as indicated by the means for recording and for initiating an error action if either the header or the trailer signal is generated twice in sequence.

18. A record reading apparatus for use with records having data entries recorded in a serial arrangement such that the data may be scanned in either of two directions comprising record reading means for reading the records in either the forward or backward direction, direction sensing means connected to said record reading means for determining whether each record is read in the forward or backward direction, a recirculating data storage device, first loading means responsive to said direction sensing means indicating a record is scanned in a first direction for transferring record data serially and directly from said record reading means into said recirculating data storage device and for advancing the data within said recirculating data storage device by one data position between successive data transfers, second loading means responsive to said direction sensing means indicating a record is scanned in a second direction for transferring record data serially and directly from sid record reading means into said recirculating data storage device and for advancing the data within said recirculating data storage device by a number of data positions equal to the total number of positions within the device minus one between successive data transfers, and unloading means for transferring data out of said recirculating data storage device after a complete record has been scanned.

19. An apparatus for scanning records using at least two scanning heads, said records bearing a series of bar-encoded data characters preceeded and followed by control characters and each of which data characters includes redundant information that may be used in error checking, said apparatus comprising means for producing relative movement between a record and the scanning heads such that the scanning heads generate signals indicating by their fluctuations the passage of bars and spaces beneath the associated scanning heads, demodulator means associated with each scanning head and receiving as an input the signal from each scanning head for demodulating said signals and converting the signals into binary codes, a memory associated with each demodulator means in which at least N binary codes from each scanning head may be temporarily stored, where N is an integer greater than zero, data detection means connecting to the binary code output of each demodulator for detecting when a sequence of characters including a control character followed by N valid data characters have been demodulated by the respective demodulator means, data utilization means, and selector means placed into operation by said error detection means for transferring data from the associated memory and demodulator to the data utilization means after a sequence including a control characer followed by N valid data characters has been detected by said data detection means.

20. An apparatus in accordance with claim 19 wherein said data detection means includes a counter capable of counting up to at least N, means for advancing said counter each time a valid data character is encountered, means for inhibiting counter advancement unti a valid control character is encountered, means for resetting said counter whenever an erroneously-encoded data character is encountered, and means for placing said selector means into operation when said counter reaches a count of N.

21. A record reading apparatus for reading batches of records encoded with a message, said apparatus comprising:

a conveying system which conveys records serially along a path of movement, a receptacle containing records which are to be read and connecting to the conveying system, at least one record collection receptacle connecting to the conveying system and into which the conveying system may deposit records which have been read, two record sensing means for sensing an encoded message on a record disposed along the path of movement defined by said conveying system and displaced from each other in a direction parallel to the record path of movement, selecting means coupled to the two sensing means for selectively selecting a sensing means which is adjacent the record at any given moment, message translating means coupled to the sensing means for providing signals representing an encoded message, and a message utilizing means coupled to the message translating means for recording or otherwise utilizing the signals provided by said message translating means.

22. The record reading apparatus set forth in claim 21 in which the selecting means includes means responsive to signals derived from the sensing means for controlling the operation of the selecting means.

23. A record reading apparatus for reading batches of records encoded with a message on one side of each record and which is able to accept the records oriented either face up or face down, said apparatus comprising a conveying system which conveys records serially along a path of movement, a receptacle containing records which are to be read and connecting to the conveying system, at least one record collection receptacle connecting to the conveying system and into which the conveying system may deposit records which have been read, two record sensing means for sensing an encoded message on a record, one of said means being disposed on each side of the path of movement defined by said conveying system with the record sensing means displaced from each other in a direction parallel to the record path of movement, selecting means coupled to the two sensing means for selectively selecting a sensing means which is adjacent the record at any given moment, message translating means coupled to the sensing means for providing signals representing an encoded message, and a message utilizing means coupled to the message translating means for recording or otherwise utilizing the signals provided by said message translating means.

24. A record reading apparatus for sensing a message encoded on a record to be positioned in one of four different positions during movement along a record sensing path, which apparatus comprises four sensing means each positioned to sense the encoded message when the record is in a different one of the four positions and to provide output signals, two coded message translating channels each coupled to and controlled by the output signals from two of said sensing means and each generating at least one signal indicative of whether the corresponding translating channel is translating meaningful data, first selecting means controlled by the output signals for selecting different pairs of the four sensing means in sequence, a message receiving means, second selecting means controlled by the output signals of the translating channels for rendering one of the translating channels effective to control the message receiving means, manual message entry means, and control means coupled to the second selecting means for rendering the manual message entry means effective to control the message receiving means and for inhibiting control of the message receiving means by either of the two translating channels.

25. A record reading apparatus for reading records having different predetermined numbers of characters thereon comprising record sensing means for reading a series of records in sequence and for providing character representing signals from each record, character receiving means, transfer means coupled to the record sensing means for supplying character data to the character receiving means, counting means for counting the number of characters on each record, comparator means coupled to the counting means, a plurality of different character number representing circuits providing representations of different numbers of characters, selecting means for rendering one of the different number representing circuits effective to control the comparator means so that the comparator means provides an output signal when the counting means counts a number of characters corresponding to the character number represented by the selected number representing circuit, means controlled by said output signal from the comparator means for controlling the transfer means, and means controlled by the selecting means for inhibiting operation of the record reading apparatus when the selecting means is not operated to select one of the number representing circuits.

26. A record reading apparatus for reading records having different predetermined numbers of characters thereon wherein a group of records is preceded by a distinctive header record, comprising record sensing means for reading a series of records in sequence and for providing character representing signals from each record, character receiving means, transfer means coupled to the record sensing means for supplying character data to the character receiving means, counting means for counting the number of characters on each record, comparator means coupled to the counting means, a plurality of different character number representing circuits providing representations of different numbers of characters, selecting means for rendering one of the different number representing circuits effective to control the comparator means so that the comparator means provides an output signal when the counting means counts a number of characters corresponding to the character number represented by the selected number representing circuit, means controlled by said output signal from the comparator means for controlling the transfer means, header detection means controlled by the record sensing means for detecting the sensing of a header record by the record sensing means, and means coupling the header detecting means to the transfer means for controlling the transfer means.

* * * * *

UNITED STATES PATENT OFFICE

CERTIFICATE OF CORRECTION

Patent No. 3,912,909 Dated October 14, 1975

Inventor(s) Richard A. Harrison

It is certified that error appears in the above-identified patent and that said Letters Patent are hereby corrected as shown below:

Column 2, line 61, change "spaced" to --spaces--
Column 3, line 13, change "184B" to --184D--
Column 6, line 44, change "185" to --186--
line 64, change "814" to --184--
Column 7, line 28, change "1" to --"1"--
Column 10, line 29, change "322" to --332-- line 60, change "poiive" to --positive--
Column 11, line 49, change "from" to --form--
line 52, after "two" insert --read--
Column 13, line 63, change "TICS" to --TICS/-- line 67, change "BLK1" to --410--

Column 19, line 60, change "1" to --"1"--
line 64, change "1" to --"1"--
line 66, change "0" to --"0"--
Column 20, line 6, change "1" to --"1"--
line 7, change "0" to --"0"--
line 12, change "1" to --"1"--
change "0" to --"0"--
line 16, change "0" to --"0"--

Column 30, line 39, change "of" to -- or --.
line 57, change "of" to -- or --.

UNITED STATES PATENT OFFICE

CERTIFICATE OF CORRECTION

Patent No. 3,912,909 Dated October 14, 1975

Inventor(s) Richard A. Harrison

It is certified that error appears in the above-identified patent and that said Letters Patent are hereby corrected as shown below:

Column 31, line 1, change "pulses" to --pulse--
line 63, change "inn" to --in--
Column 33, line 36, change "a" (first occurrence) to --an--
Column 35, line 1, change "acepting" to --accepting--

Column 36, line 40, change "with" to --which--
Column 37, line 3, change "8" to --"8"--
line 5, change "9" to --"9"--
line 10, change "9" to --"9"--
Column 38, line 3, change "8" to --"8"--
line 8, change "1" to --"1"--
line 9, change "1" to --"1"--
line 13, change "8" to --"8"--
line 14, change "1" to --"1"--
line 20, change "8" to --"8"--
line 35, change "8's" to --"8"s--
line 37, change "9" to --"9"--
line 43, change "8 or 9" to --"8" or "9"--
line 45, change "NOr" to --NOR--
line 47, change "9" to --"9"--
change "8's and 9's" to --"8"s and "9"s--
line 53, change "9" to --"9"--
line 54, change "8" to --"8"-- (both occurrences)
line 56, change "9" to --"9"--
Column 39, line 6, change "8" to --"8"--
line 9, change "8" to --"8"--
line 14, change "NOr" to --NOR--
Column 40, line 28, change "9" to --"9"--
line 32, change "9" to --"9"--
line 34, change "1" to --"1"--
line 36, change "1" to --"1"--
line 41, change "9" to --"9"--

UNITED STATES PATENT OFFICE

CERTIFICATE OF CORRECTION

Patent No. 3,912,909 Dated October 14, 1975

Inventor(s) Richard A. Harrison

It is certified that error appears in the above-identified patent and that said Letters Patent are hereby corrected as shown below:

Column 41, line 56, change "fo" to --of-- line 63, change "cicuit" to --circuit--
Column 48, line 13, change "signal" to --circuit--
line 24, change "other" to --output--
line 51, change "signial" to --signal--
Column 50, line 46, change "ro" to --so--
Column 52, line 27, change "terminate" to --terminal--
Column 53, line 22, change "signials" to --signals--
Column 54, line 61, change "1136" to --1336--
Column 56, line 21, change "tim" to --time--
line 43, change "acept" to --accept--
Column 57, line 18, change "dat" to --data--

Column 61, line 34, change "appratus" to --apparatus--
Column 62, line 42, change "suplied" to --supplied--
Column 63, line 13, change "sid" to --said--
line 53, change "characer" to --character--
line 60, change "unti" to --until--

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*